(12) United States Patent
Ayan et al.

(10) Patent No.: US 7,725,302 B2
(45) Date of Patent: May 25, 2010

(54) METHOD AND SYSTEM AND PROGRAM STORAGE DEVICE FOR GENERATING AN SWPM-MDT WORKFLOW IN RESPONSE TO A USER OBJECTIVE AND EXECUTING THE WORKFLOW TO PRODUCE A RESERVOIR RESPONSE MODEL

(75) Inventors: Cosan Ayan, Houston, TX (US); Raj Banerjee, Abingdon (GB); Omer Gurpinar, Denver, CO (US)

(73) Assignee: Schlumberger Technology Corporation, Houston, TX (US)

( * ) Notice: Subject to any disclaimer, the term of this patent is extended or adjusted under 35 U.S.C. 154(b) by 1061 days.

(21) Appl. No.: 11/007,764

(22) Filed: Dec. 8, 2004

(65) Prior Publication Data
US 2005/0119911 A1  Jun. 2, 2005

Related U.S. Application Data

(63) Continuation-in-part of application No. 10/726,288, filed on Dec. 2, 2003.
(60) Provisional application No. 60/578,053, filed on Jun. 8, 2004.

(51) Int. Cl.
G06G 7/48 (2006.01)
G01N 15/08 (2006.01)
(52) U.S. Cl. .......................................... 703/10; 702/12
(58) Field of Classification Search .................... 703/10; 702/12
See application file for complete search history.

(56) References Cited

U.S. PATENT DOCUMENTS 4,333,144 A   6/1982  Whiteside et al.

4,969,130 A * 11/1990  Wason et al. ................... 367/73

(Continued)

FOREIGN PATENT DOCUMENTS

EP      0491367 A2    6/1992

(Continued)

OTHER PUBLICATIONS

"Validating Reservoir Models to Improve Recovery" by Bouska et al in Summer 1999 pp. 21-35.*

(Continued)

*Primary Examiner*—Kamini S Shah
*Assistant Examiner*—Akash Saxena
(74) *Attorney, Agent, or Firm*—Osha Liang LLP

(57) ABSTRACT

A method for performing an oilfield operation on a reservoir, including: obtaining a user objective identifying the oilfield operation; obtaining a set of input data; selecting a workflow in response to the user objective, where the workflow comprises a build model module and a tune model module; generating a 1D model of the reservoir using the build module, where the 1D model includes multiple per unit of depth properties; generating a 3D model of the reservoir by distributing the plurality of per unit of depth properties in 3D; calibrating the 3D model using the tune model module, modular dynamic tester transient test data, and a historical response of the reservoir; forecasting a response of the reservoir to the set of input data by applying the first set of input data to the 3D model; and using the response to perform the oilfield operation.

20 Claims, 34 Drawing Sheets

U.S. PATENT DOCUMENTS

| | | | | |
|---|---|---|---|---|
| 5,214,613 | A * | 5/1993 | Esmersoy | 367/31 |
| 5,379,216 | A * | 1/1995 | Head | 702/12 |
| 5,586,082 | A * | 12/1996 | Anderson et al. | 367/73 |
| 5,710,726 | A * | 1/1998 | Rowney et al. | 703/10 |
| 6,230,101 | B1 * | 5/2001 | Wallis | 702/16 |
| 6,317,654 | B1 | 11/2001 | Gleeson et al. | |
| 6,412,577 | B1 | 7/2002 | Chen | |
| 6,434,435 | B1 * | 8/2002 | Tubel et al. | 700/30 |
| 6,549,879 | B1 * | 4/2003 | Cullick et al. | 703/10 |
| 6,662,109 | B2 * | 12/2003 | Roggero et al. | 702/6 |
| 6,746,332 | B1 * | 6/2004 | Ing et al. | 463/42 |
| 6,853,921 | B2 * | 2/2005 | Thomas et al. | 702/14 |
| 7,062,420 | B2 * | 6/2006 | Poe, Jr. | 703/10 |
| 7,249,009 | B2 * | 7/2007 | Ferworn et al. | 703/10 |
| 7,512,543 | B2 * | 3/2009 | Raghuraman et al. | 703/10 |
| 7,657,494 | B2 * | 2/2010 | Wilkinson et al. | 703/10 |
| 2002/0055868 | A1 * | 5/2002 | Dusevic et al. | 705/9 |
| 2002/0067373 | A1 * | 6/2002 | Roe et al. | 345/762 |
| 2003/0028325 | A1 * | 2/2003 | Roggero et al. | 702/11 |
| 2003/0112235 | A1 * | 6/2003 | Grace | 345/419 |
| 2003/0182061 | A1 * | 9/2003 | Ferworn et al. | 702/12 |
| 2003/0220739 | A1 * | 11/2003 | Feldman et al. | 702/2 |
| 2005/0119911 | A1 * | 6/2005 | Ayan et al. | 705/1 |
| 2006/0015310 | A1 * | 1/2006 | Husen et al. | 703/10 |
| 2006/0020438 | A1 * | 1/2006 | Huh et al. | 703/10 |
| 2007/0132451 | A1 * | 6/2007 | Ramakrishnan | 324/303 |
| 2009/0070086 | A1 * | 3/2009 | Le Ravalec et al. | 703/10 |
| 2009/0292516 | A1 * | 11/2009 | Searles et al. | 703/10 |

FOREIGN PATENT DOCUMENTS

| | | |
|---|---|---|
| RU | 2208153 C2 | 7/2003 |
| RU | 2216043 C2 | 11/2003 |

OTHER PUBLICATIONS

SPE 89993 "Simultaneous Analysis of Multiple Formation Tester Transients and Well Tests With an Integrated Well Model", Sep. 26-29, 2004 , pp. 1-14.

Eurasian Search Report for related EA Application No. 200600036 mailed Jun. 29, 2008, 2 pages.

* cited by examiner

FIG.25

|        | THICKNESS(ft) | Kh(md) | Kv(md) | So(frac) | Sw(frac) | POROSITY(frac) |
|--------|---------------|--------|--------|----------|----------|----------------|
| LAYER 1 | 40           | 93     | 27     | 0.7      | 0.3      | 0.2            |
| LAYER 2 | 40           | 8      | 03     | 0.7      | 0.3      | 0.2            |

FIG.26

| VISCOSITY | 0.5797cp |
| COMPRESSIBILITY | 1.1703E-05/psi |
| OIL DENSITY | 35 API |
| FVF | 1.3628 |

FIG.27

|  | ACTUAL VALUE | PERTURBED VALUE | MATCH VALUE |
|---|---|---|---|
| LAYER 1 - $K_{horizontal}$ | 93 | 85 | 98.9 |
| LAYER 1 - $K_{vertical}$ | 27 | 15 | 28.9 |
| LAYER 2 - $K_{horizontal}$ | 8 | 12 | 8.5 |
| LAYER 2 - $K_{vertical}$ | 0.3 | 0.1 | 0.3 |

|  | ACTUAL VALUE | PERTURBED VALUE | MATCH VALUE |
|---|---|---|---|
| LAYER 1-$K_{horizontal}$ | 93 | 85 | 118.3 |
| LAYER 1-$K_{vertical}$ | 27 | 15 | 5.5 |
| LAYER 2-$K_{horizontal}$ | 8 | 12 | 8.5 |
| LAYER 2-$K_{vertical}$ | 0.3 | 0.1 | 0.3 |

FIG.28

|  | ACTUAL VALUE | PERTURBED VALUE | MATCH VALUE |
|---|---|---|---|
| LAYER 1-$K_{horizontal}$ | 93 | 85 | 91.8 |
| LAYER 1-$K_{vertical}$ | 27 | 15 | 30.8 |
| LAYER 2-$K_{horizontal}$ | 8 | 12 | 8.7 |
| LAYER 2-$K_{vertical}$ | 0.3 | 0.1 | 0.2 |

|  | THICKNESS(ft) | Kh(md) | Kv(md) | POROSITY(frac) |
|---|---|---|---|---|
| LAYER 1 | 10 | 5 | 0.5 | 0.2 |
| LAYER 2 | 4 | 100 | 1 | 0.2 |
| LAYER 3 | 30 | 1 | 0.1 | 0.2 |
| LAYER 4 | 6 | 150 | 1.5 | 0.2 |
| LAYER 5 | 20 | 2 | 0.2 | 0.2 |

FIG.31

|  | ACTUAL VALUE | PERTURBED VALUE | MATCH VALUE |
|---|---|---|---|
| LAYER 1 | 5 | 10 | 5.9 |
| LAYER 2 | 100 | 80 | 101.1 |
| LAYER 3 | 1 | 3 | 1.0 |
| LAYER 4 | 150 | 100 | 147.9 |
| LAYER 5 | 2 | 8 | 2.0 |

METHOD AND SYSTEM AND PROGRAM STORAGE DEVICE FOR GENERATING AN SWPM-MDT WORKFLOW IN RESPONSE TO A USER OBJECTIVE AND EXECUTING THE WORKFLOW TO PRODUCE A RESERVOIR RESPONSE MODEL

CROSS REFERENCE TO RELATED APPLICATIONS

This application is a continuation-in-part of prior application Ser. No. 10/726,288, filed Dec. 2, 2003, and, in addition, this application is a Utility application of prior pending provisional application 60/578,053 filed Jun. 8, 2004.

BACKGROUND

The subject matter of the embodiment(s) described in this specification pertains to a Single Well Predictive Model (SWPM)/Modular Dynamics Tester (MDT) complex analysis workflow and, in particular, to an SWPM-MDT Workflow which will function to perform simultaneous analysis of multiple formation tester transients and well tests with an integrated well model.

Generally speaking, during the execution of software in a processor of a computer system for the purpose of generating a final desired product, it is often necessary to execute a first software module in the processor of the computer system to produce a first product and then, separately and independently, execute a second software module in the processor in response to the first product to produce a second product, and then, separately and independently, execute a third software module in the processor in response to the second product to produce the final desired product. In order to produce the final desired product, it may be necessary to separately and independently execute in the processor of the computer system a multitude of software modules in order to produce the final desired product. The aforementioned execution of the multitude of software modules, in a separate and independent fashion, is very time consuming and is a very laborious task. Accordingly, there exists a need for a 'software based computer system' (hereinafter called the 'Single Well Predictive Model' or 'SWPM') that will: (1) automatically produce a first specific workflow comprised of a first plurality of software modules in response to a first set of user objectives and automatically execute the first specific workflow in response to a first set of input data to produce a first desired product, and (2) automatically produce a second specific workflow comprised of a second plurality of software modules in response to a second set of user objectives and automatically execute the second specific workflow in response to a second set of input data to produce a second desired product. When the SWPM software based computer system is utilized, there would no longer be any need to separately and independently execute the first plurality of software modules of the first workflow in order to produce the first desired product, and there would no longer be any need to separately and independently execute the second plurality of software modules of the second workflow in order to produce the second desired product. As a result, a considerable amount of processor execution time would be saved and, in addition, there would no longer be any need to perform the aforementioned laborious task of separately and independently executing a plurality of software modules in order to produce a final desired product. The aforementioned 'software based computer system', known as the 'Single Well Predictive Model' or 'SWPM', is adapted for use in the oil industry. In the oil industry, ideally, all production activities performed in connection with a well should utilize any knowledge concerning the reservoir (e.g., timely pressure interference and rock heterogeneity) adjacent to the well being drilled. However, as a result of the absence of a common three-dimensional (3D) predictive model that can be used not only by reservoir engineers but also by production/drilling/well services engineers, the gap between the reservoir knowledge and day-to-day well decisions remains one of the most significant sources of inefficiency in field management and in field operations. Due to a similar gap between reservoir modeling and production modeling, it is our understanding that clients rarely utilize much of the data that has been acquired—they certainly don't maximize what can be interpreted from that data. Furthermore, most of the reservoirs do not have a realistic reservoir predictive model. It is estimated that only 20% of producing reservoir fields have a reservoir model. This indicates that most of the reservoir fields are operated on the basis of knowledge about individual wells. There are a number of reasons for this, chief among them being: the need for necessary experienced personnel, the need for 'fit-for-purpose' software, the sheer size of the reservoir models, and the time required.

Accordingly, there exists a need for a 'Single Well Predictive Model' or 'SWPM' software based computer system that will enable a company's staff to get closer to well operations while empowering them with fast interpretation tools utilizing all available data and 3D reservoir models built around a specific well thus enhancing the quality of decisions in field management. The 'SWPM' software based computer system represents an opportunity for a company to differentiate itself in the market by 'adding value', where such value is added by introducing a new interpretation service (i.e., the SWPM software) to the company's current and future data acquisition tools and services. In addition, the 'real-time capability' associated with the 'Single Well Predictive Model (SWPM)' software based computer system will be appreciated and utilized significantly in the oil industry because the oil industry as a whole is rapidly progressing toward an 'on-time' and 'data-to-decision' work environment. Finally, the attributes of the 'SWPM' software based computer system, including integration and interactiveness and intuitiveness, will be considered when the next generation of 'field predictive models' is created. In addition, there exists a need for an interactive and intuitive flow simulation based 'Single Well Predictive Model (SWPM)' which is used for the purpose of integrating static and dynamic measurements with completion data that can be used by non-reservoir simulation experts. The SWPM will enable the building of 3-D comparative prediction models starting from 1-D information (i.e. from the well). The SWPM will read the formation information of the subject well and create a reservoir flow model for the selected drainage area of the well. From 1 D to 3D, property creation will be done stochastically and then fine-tuned with respect to the available dynamic data of the well. Once the most likely reservoir properties are estimated, SWPM can be used to investigate various predictive scenarios, such as customizing completion strategy, investigating drilling strategy, predicting well performance considering the impact on the reservoir, demonstrating the value of additional data on decision making, and demonstrating the value of new technologies. SWPM will be built around optimized workflows including, petrophysical property estimation, static model construction, model tuning, drilling, completion, production, or intervention. Ease of use and intuitiveness are of utmost importance. SWPM will be used either sequentially in elapsed time mode, or in fully automatic real-time mode.

In addition, Interval Pressure Transient Testing (IPTT) along the wellbore using multi-probe or packer-probe formation testers is increasingly used as a means of formation evaluation. These tests usually have durations on the order of hours and they investigate volumes within "tens of feet" radially and vertically along the well. Multiple transient tests with overlapping volumes of influence are common in a well. Currently, each of these transient tests is analyzed independent of each other using mainly analytical multi-layer models. When their volumes of influence overlap, it then becomes an iterative procedure. The whole interpretation process then takes considerable time and effort. Analysis of interval pressure transient tests using numerical simulation has also been pursued. Numerical modeling can be well suited for complex geometries (i.e. fractures intersecting packer zones) and multiphase flow but usually such numerical modeling is more complex to set-up. Following Interval Pressure Transient Testing, the well may later be Drill Stem Tested (DST) and/or may have an Extended Well Test (EWT). Combined interpretation of interval pressures transient tests and conventional well tests is not common and poses another difficulty since conventional tests have extended radius of investigation. The reservoir model must honor the increased vertical resolution near the wellbore defined by IPTT's and deeper lateral information inherent in long-term transient well tests. It is also common to acquire pressure vs depth data in open and cased hole with formation testers. In developed reservoirs, such data gives valuable information on differential depletion, compartmentalization and vertical communication. Incorporation of pressure vs depth profiles within the analysis impose a third level of difficulty (and scale) since pressure variations along a well usually reflects depletion of various zones combined with wider scale connectivity information. In this specification, an embodiment is presented that pertains to a 'Single Well Predictive Model (SWPM)/Modular Dynamics Tester (MDT) Workflow' (hereinafter, the 'SWPM-MDT Workflow'), wherein multiple Interval Pressure Transient Tests (IPTT's), conventional well tests [e.g., Drill Stem Tests (DST) and Extended Well Tests (EWTs)], and Pressure vs Depth profiles are analyzed simultaneously using a numerical 'reservoir response model' that is generated by the Workflow when the Workflow is fully executed by a processor of a computer. A starting point of the 'SWPM-MDT Workflow' is responsive to a set of 'interpretation results' which are generated when a reservoir petrophysics analysis is performed along the borehole. This is reduced to a series of flow units with average petrophysical properties. These flow units, with average properties, are used to populate a numerical three-dimensional model. This starting model is updated to honor all transient (IPTT, DST, EWT) data as well as pressure vs depth profiles simultaneously. An End Result, which is generated or constructed when the aforementioned SWPM-MDT Workflow is fully executed by a processor of a computer, is a 'reservoir response simulator' (or a 'reservoir response model' or a 'single-well reservoir model') which: will honor dynamic data, will reflect and honor all measured data at different scales, and can be used to study alternative completion and production scenarios. The analysis method described in the embodiments set forth herein which are associated with the below described 'SWPM-MDT Workflow' will: reduce the time and effort that is required to analyze multiple Interval Pressure Transient Tests (IPTT) and provide a means of integrating both long term tests and pressure vs depth data.

SUMMARY

One aspect of the present invention involves a method of determining a desired product corresponding to a user objective, comprising the steps of: (a) providing a first user objective; (b) providing a first set of input data; (c) automatically generating a first workflow in response to the first user objective; (d) automatically selecting one or more software modules in response to the first workflow, the one or more software modules including a build model software module adapted for building a simulator model in response to a set of other data and a tune model software module adapted for calibrating the simulator model in response to one or more of a set of transient test data and well test data and pressure gradient data; (e) executing the one or more software modules in a processor in response to the first set of input data; and (f) determining the desired product in response to the executing step (e), the desired product including a 3D representative reservoir model.

A further aspect of the present invention involves a program storage device readable by a machine tangibly embodying a set of instructions executable by the machine to perform method steps for determining a desired product corresponding to a user objective, the method steps comprising: (a) providing a first user objective; (b) providing a first set of input data; (c) automatically generating a first workflow in response to the first user objective; (d) automatically selecting one or more software modules in response to the first workflow, the one or more software modules including a build model software module adapted for building a simulator model in response to a set of other data and a tune model software module adapted for calibrating the simulator model in response to one or more of a set of transient test data and well test data and pressure gradient data; (e) executing the one or more software modules in a processor in response to the first set of input data; and (f) determining the desired product in response to the executing step (e), the desired product including a 3D representative reservoir model.

A further aspect of the present invention involves a system responsive to a set of input data and a user objective adapted for generating a desired product corresponding to the user objective, comprising: first apparatus adapted for receiving a first user objective and a first set of input data; second apparatus adapted for automatically generating a first workflow in response to the first user objective; third apparatus adapted for automatically selecting one or more software modules in response to the first workflow, the one or more software modules including a build model software module adapted for building a simulator model in response to a set of other data and a tune model software module adapted for calibrating the simulator model in response to one or more of a set of transient test data and well test data and pressure gradient data; and processor apparatus adapted for automatically executing the one or more software modules in response to the first set of input data and generating the desired product in response to the execution of the one or more software modules, the desired product including a 3D representative reservoir model.

A further aspect of the present invention involves a method for determining a final product in response to a user objective, comprising the steps of: (a) providing the user objective and providing input data; (b) generating a specific workflow corresponding to the user objective; (c) selecting a plurality of software modules in response to the specific workflow, the plurality of software modules having a predetermined sequence, the software modules including a build model software module adapted for building a simulator model in response to a set of other data and a tune model software module adapted for calibrating the simulator model in response to one or more of a set of transient test data and well test data and pressure gradient data; (d) executing the plurality of software modules in the predetermined sequence in response to the input data; and (e) generating the final product when the execution of the plurality of software modules in the predetermined sequence is complete, the final product including a 3D representative reservoir model.

A further aspect of the present invention involves a program storage device readable by a machine tangibly embodying a set of instructions executable by the machine to perform method steps for determining a final product in response to a user objective, the method steps comprising: (a) providing the user objective and providing input data; (b) generating a specific workflow corresponding to the user objective; (c) selecting a plurality of software modules in response to the specific workflow, the plurality of software modules having a predetermined sequence, the software modules including a build model software module adapted for building a simulator model in response to a set of other data and a tune model software module adapted for calibrating the simulator model in response to one or more of a set of transient test data and well test data and pressure gradient data; (d) executing the plurality of software modules in the predetermined sequence in response to the input data; and (e) generating the final product when the execution of the plurality of software modules in the predetermined sequence is complete, the final product including a 3D representative reservoir model.

A further aspect of the present invention involves a system adapted for determining a final product in response to a user objective, comprising: first apparatus adapted for receiving the user objective and receiving input data; second apparatus adapted for generating a specific workflow corresponding to the user objective; third apparatus adapted for selecting a plurality of software modules in response to the specific workflow, the plurality of software modules having a predetermined sequence, the software modules including a build model software module adapted for building a simulator model in response to a set of other data and a tune model software module adapted for calibrating the simulator model in response to one or more of a set of transient test data and well test data and pressure gradient data; and fourth apparatus adapted for executing the plurality of software modules in the predetermined sequence in response to the input data; and fifth apparatus adapted for generating the final product when the execution of the plurality of software modules in the predetermined sequence is complete, the final product including a 3D representative reservoir model.

A further aspect of the present invention involves a method of generating a 3D representative reservoir model, comprising the steps of: (a) providing a user objective and providing input data; (b) generating a workflow corresponding to the user objective; (c) selecting a plurality of software modules in response to the generation of the workflow, the plurality of software modules having a predetermined sequence, the software modules including a build model software module adapted for building a simulator model in response to a set of other data and a tune model software module adapted for calibrating the simulator model; (d) executing the plurality of software modules in the predetermined sequence in response to the input data; and (e) generating the 3D representative reservoir model final product when the execution of the tune model software module of the plurality of software modules is complete.

A further aspect of the present invention involves a method of predicting a new response from a new oil or gas reservoir in response to a set of recently measured or observed data from the new oil or gas reservoir, a set of known measured or observed data from a known oil or gas reservoir corresponding to a known response from the known oil or gas reservoir, comprising the steps of: building a simulator model using a set of petrophysical data and a set of geological data; calibrating the simulator model, the calibrating step including, interrogating the simulator model with the known measured or observed data thereby generating a particular response from the simulator model, the known measured or observed data including one or more of a set of transient test data and a set of well test data and a set of pressure gradient data, comparing the particular response from the simulator model with the known response from the known oil or gas reservoir, and calibrating the simulator model until the particular response is substantially the same as the known response thereby generating a tuned simulator model; and predicting the new response from the new oil or gas reservoir by interrogating the tuned simulator model with the set of recently measured or observed data, the recently measured or observed data including one or more of a set of transient test data and a set of well test data and a set of pressure gradient data.

A further aspect of the present invention involves a program storage device readable by a machine tangibly embodying a program of instructions executable by the machine to perform method steps for predicting a new response from a new oil or gas reservoir in response to a set of recently measured or observed data from the new oil or gas reservoir, a set of known measured or observed data from a known oil or gas reservoir corresponding to a known response from the known oil or gas reservoir, the method steps comprising: building a simulator model using a set of petrophysical data and a set of geological data; calibrating the simulator model, the calibrating step including, interrogating the simulator model with the known measured or observed data thereby generating a particular response from the simulator model, the known measured or observed data including one or more of a set of transient test data and a set of well test data and a set of pressure gradient data, comparing the particular response from the simulator model with the known response from the known oil or gas reservoir, and calibrating the simulator model until the particular response is substantially the same as the known response thereby generating a tuned simulator model; and predicting the new response from the new oil or gas reservoir by interrogating the tuned simulator model with the set of recently measured or observed data, the recently measured or observed data including one or more of a set of transient test data and a set of well test data and a set of pressure gradient data.

Further scope of applicability of the embodiments described herein, pertaining to a 'SWPM-MDT complex analysis workflow', will become apparent from the detailed description presented hereinafter. It should be understood, however, that the detailed description and the specific examples, while representing a 'preferred' embodiment, are given by way of illustration only, since various changes and modifications within the spirit and scope of such embodiments described herein will become obvious to one skilled in the art from a reading of the following detailed description.

BRIEF DESCRIPTION OF THE DRAWINGS

A full understanding of the embodiments described herein will be obtained from the detailed description presented hereinbelow, and the accompanying drawings, which are given by way of illustration only and are not intended to be limitative of such embodiments, and wherein:

FIG. 25 illustrates a Table 1 representing Reservoir Properties used for the synthetic case;

FIG. 26 illustrates a Table 2 representing Fluid properties used for the synthetic case;

FIG. 27 illustrates a Table 3 representing Actual, perturbed and final values, regressing on two MDT IPTT packer and probe data;

FIG. 28 illustrates a Table 4 representing Actual, perturbed and final values, regressing on two IPTT packer pressures without considering probe and the extended well test data;

FIG. 29 illustrates a Table 5 representing Actual, perturbed and final values, regressing only on all IPTT packer, probe and extended well test data;

FIG. 30 illustrates a Table 6 representing Reservoir data used to model pressure vs depth data;

FIG. 31 illustrates a Table 7 representing Actual, perturbed and final values, regressing only on pressure vs depth data;

DETAILED DESCRIPTION

Figure 1:
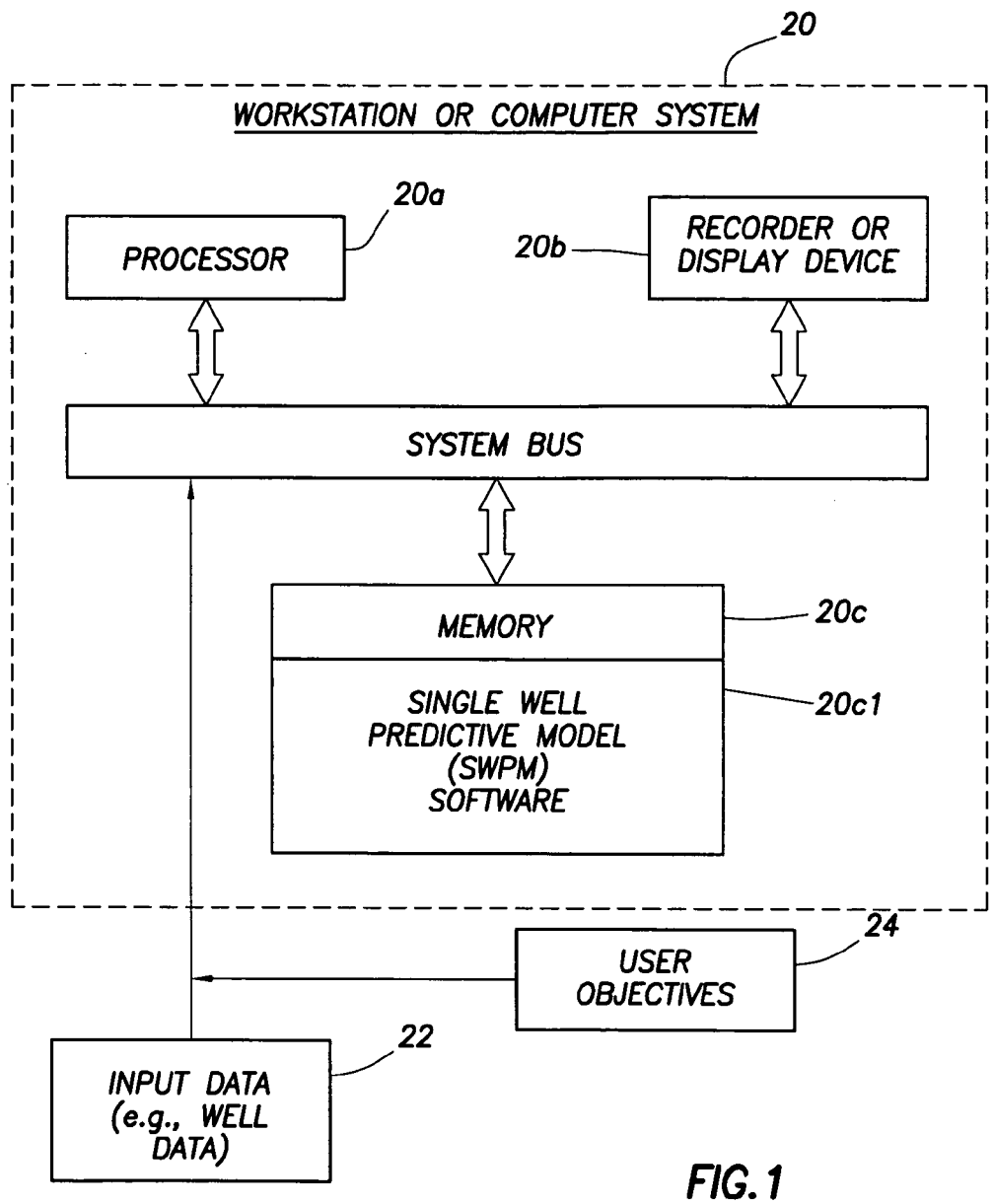
FIG. 1 illustrates a workstation or other computer system representing the Single Well Predictive Model (SWPM) software based computer system.

The Single Well Predictive Model (SWPM) software based computer system, which stores the Single Well Predictive Model (SWPM) software will: (1) automatically produce a first specific workflow comprised of a first plurality of software modules in response to a first set of user objectives and automatically execute the first specific workflow in response to a first set of input data to produce a first desired product, and (2) automatically produce a second specific workflow comprised of a second plurality of software modules in response to a second set of user objectives and automatically execute the second specific workflow in response to a second set of input data to produce a second desired product. As a result, there is no longer any need to separately and independently execute the first plurality of software modules of the first workflow in order to produce the first desired product, and there is no longer any need to separately and independently execute the second plurality of software modules of the second workflow in order to produce the second desired product. As a result, a considerable amount of processor execution time is saved and, in addition, there is no longer any need to perform the aforementioned laborious task of separately and independently executing a plurality of software modules in order to produce a final desired product. One example of a 'desired product' is a '3D Representative Reservoir Model', such as the '3D Representative Reservoir Model' 112 shown in FIG. 24.

In addition, the Single Well Predictive Model (SWPM) software based computer system, which stores the Single Well Predictive Model (SWPM) software, will provide a workflow for the less specialized engineer for the purpose of building a model intuitively which can subsequently be used to predict production performance. The SWPM software includes four modules: (1) a Data Entry module used for the purpose of introducing 'input data', (2) a Model Creation module used for the purpose of generating a 'Specific Workflow', (3) a Model Calibration module used as a 'Data Conditioner', and (4) a Solutions module used as a 'Decision Tool'. Those modules are supported by a Workflow Storage database which includes a background knowledge database and processes guidance system. According to the 'execution type' (e.g., sequential or real-time) and a chosen 'User-objective' which is provided by a user (e.g., Completion Optimization, Stimulation Optimization, Data Valuation, Test Design, Well Reserve & Recovery Estimator, etc), the user will provide 'input data' guided by a 'specific workflow' representing the selected solution workflow. Data Entry (which provides the 'input data') will provide options to the user, including knowledge base and constant property values. When the 'input data' is introduced by the user into the Data Entry module and when the 'User-objective' is provided by the user, a 'specific workflow' will be generated in the Model Creation module wherein a reservoir model around the subject well will be built automatically. The user, as an option, can guide the reservoir model building. Based on the ranges of input data, possible realizations of the reservoir model will be built and provided to the user for selection. The SWPM software will offer a selection methodology or alternatively, the user may choose to retain all realizations. When the 'specific workflow' model is generated in the Model Creation module, a 'Data Conditioner' will be provided wherein validation of the model (represented by the 'specific workflow') to observed transient and/or production data will be available in the Model Calibration module. When the representative reservoir flow model is in place (i.e., the 'Data Conditioner' has completed its function), the simulator can now be used to achieve the original objective selected at the beginning of the session. Alternatively, the user can choose to investigate other optimization scenarios in the Solutions module, also known as the 'Decision Tool'. A set of results are generated by the 'Decision Tool' in the Solutions module. The set of results generated by the 'Decision Tool' in the Solutions module include a series of predictions which are based on the operations and/or completion scenarios that were provided by the user. The 'real-time' version of the Single Well Predictive Model (SWPM) will be able to build consecutive predictive models for specified intervals during the drilling process. The intervals can either be manually chosen or triggered by a geological/petrophysical (rock-fluid) property. Predictive models built during a drilling operation will be saved and be accessible for comparative analysis. A Single Well Predictive Model (SWPM) is an integrated and intuitive software tool that will be enable the user to build the following for an oil/gas well: (1) starting from well logs and other tests, determining storage and conductivity properties in the reservoir around the well bore, (2) constructing a 3D reservoir model around the well bore, and (3) forecasting the performance of the well under various completion and production scenarios (each of these three activities can be done manually with the help of many different software tools). When this stage is reached, the model can then be used for numerous forecasts that can lead to useful decisions, such as (1) where to complete the well for optimizing production, (2) selection of well completion tubular for ensuring the planned production, (3) Modular Dynamic Tester (MDT) and Pressure Transient Test interpretations, (4) Production and pressure test design, and (5) Estimating the reserve around the well bore while drilling (this list can be expanded). The Single Well Predictive Model (SWPM) is an interactive and special guide system that will lead the user from a 'data end' to a 'decision end'. During this interactive journey, the SWPM will have access to numerous software tools in the background. The Single Well Predictive Model (SWPM) software includes: (1) a Data Conditioner, (2) a Decision Tool and (3) a Workflow Harness. The relationships between the Data Conditioner and the Decision Tool and the Workflow Harness will be discussed in the following sections of this specification.

Figure 2:
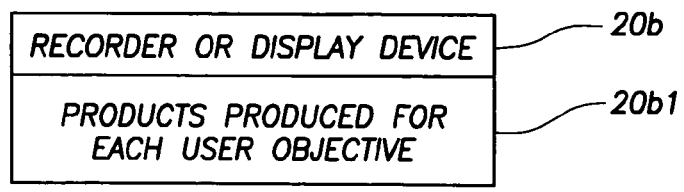
FIG. 2 illustrates the products generated by the recorder or display device of the computer system of FIG. 1.

Referring to FIGS. 1 and 2, a workstation or other computer system 20 is illustrated in FIG. 1. In FIG. 1, the workstation or other computer system 20 includes a processor 20a connected to a system bus, a recorder or display device 20b connected to the system bus, and a program storage device 20c, such as a memory 20c, connected to the system bus. The program storage device/memory 20c stores a software package therein known as the 'Single Well Predictive Model (SWPM)' software 20c1. The system bus will receive 'Input Data' 22, such as wellbore data, and the system bus will also receive a set of 'User Objectives' 24. A 'User Objective' 24, which will cause the generation of the SWPM-MDT Workflow 80 of FIGS. 18 and 24A-24C, includes the following: (1) To simultaneously analyze the following 'dynamic data': 'multiple Modular Dynamic Tester (MDT) Interval Pressure Transient Test' data (i.e., recorded pressure and rate data) and 'conventional well test' data (i.e., Drill Stem Test, well test, and extended well test) and 'formation tester pressure vs. depth profile' data, and (2) By achieving the objective set forth in item (1) above, to create a '3D Representative Reservoir Model' which has been calibrated by using the above referenced 'dynamic data' at different scales, and to use other such 'dynamic data' to further study the future performance of a well using alternative completion and production scenarios. In FIG. 2, the recorder or display device 20b of FIG. 1 will ultimately generate, produce, or display 'one or more products produced for each User Objective' 20b1. One example of the 'one or more products produced for each User Objective' 20b1 is the '3D Representative Reservoir Model' 112 of FIG. 24C. In operation, with reference to FIGS. 1 and 2, a user will enter the following information into the workstation/computer system 20 of FIG. 1: the 'Input Data' 22 and the 'User Objectives' 24. When the user provides both the 'Input Data' 22 and the set of 'User Objectives' 24, the processor 20a of the workstation/computer system 20 will execute the 'Single Well Predictive Model' software 20c1 (hereinafter, the SWPM software 20c1) and, when that execution is complete, the recorder to display device 20b of FIGS. 1 and 2 will generate, produce, or display the 'products produced for each User Objective' 20b1. That is, a unique 'product' 20b1 of FIG. 2 will be generated by the recorder or display device 20b corresponding to each 'User Objective' 24. The workstation or computer system 20 of FIG. 1 may be a personal computer (PC), a workstation, or a mainframe. Examples of possible workstations include a Silicon Graphics Indigo 2 workstation or a Sun SPARC workstation or a Sun ULTRA workstation or a Sun BLADE workstation. The program storage device 20c/memory 20c is a computer readable medium or a program storage device which is readable by a machine, such as the processor 20a. The processor 20a may be, for example, a microprocessor, microcontroller, or a mainframe or workstation processor. The memory 20c, which stores the SWPM software 20c1, may be, for example, a hard disk, a ROM, a CD-ROM, a DRAM, or other RAM, a flash memory, a magnetic storage, an optical storage, registers, or other volatile and/or non-volatile memory.

Figure 3:
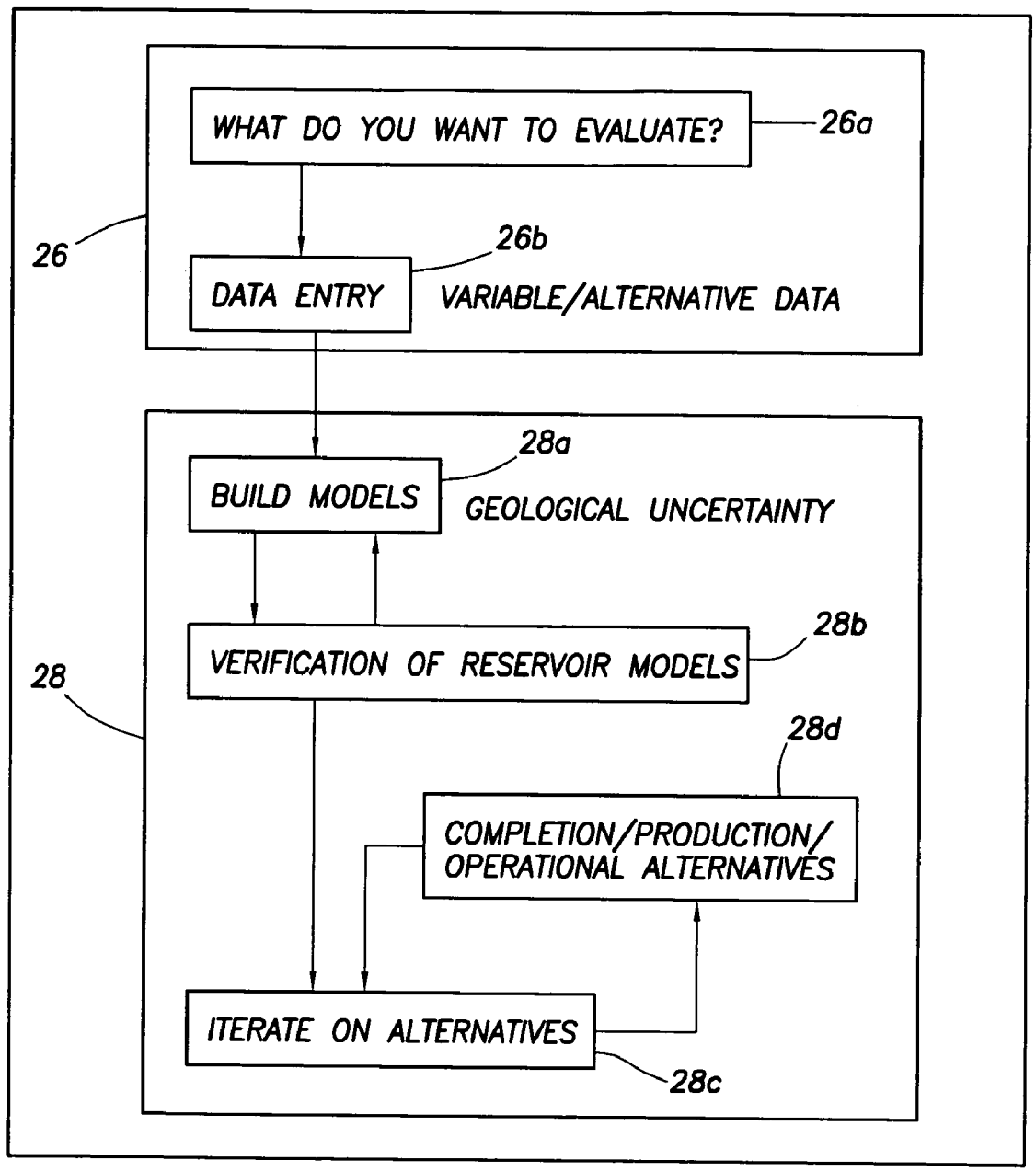
FIG. 3 illustrates a simple example of model building and its ultimate purpose which is utilized by the SWPM software based computer system of FIG. 1.

Referring to FIG. 3, a simple example of model building and its ultimate use or purpose, which is utilized by the SWPM software 20c1 stored in the software based computer system 20 of FIG. 1, is illustrated. In FIG. 3, the simple example of computer model building and its use includes a plurality of steps. In a first step 26 entitled 'variable/alternative data' 26, one must first decide 'what do you want to evaluate', step 26a. For example, what reservoir field do you want to evaluate? Then, in step 26b, the 'data entry' phase 26b will begin, the data being entered via the 'data entry' step 26b (into the computer system of FIG. 1) corresponding to the entity which one has decided, in step 26a, to evaluate. In a second step 28 entitled 'geological uncertainty', when the 'data entry' step 26b is complete, one must first 'build models' in step 28a. In step 28a, your computer models must first be constructed, and, in step 28b 'verification of reservoir models', your computer model must be verified to ensure that it will produce accurate results. Upon completion of steps 28a and 28b, a 'verified model' has been constructed and tested. The next steps 28c and 28d involve a real-time use of your 'verified model', and that real-time use of your 'verified model' will include the following activity: iterating on various completion or production or operational alternatives.

Figure 4:
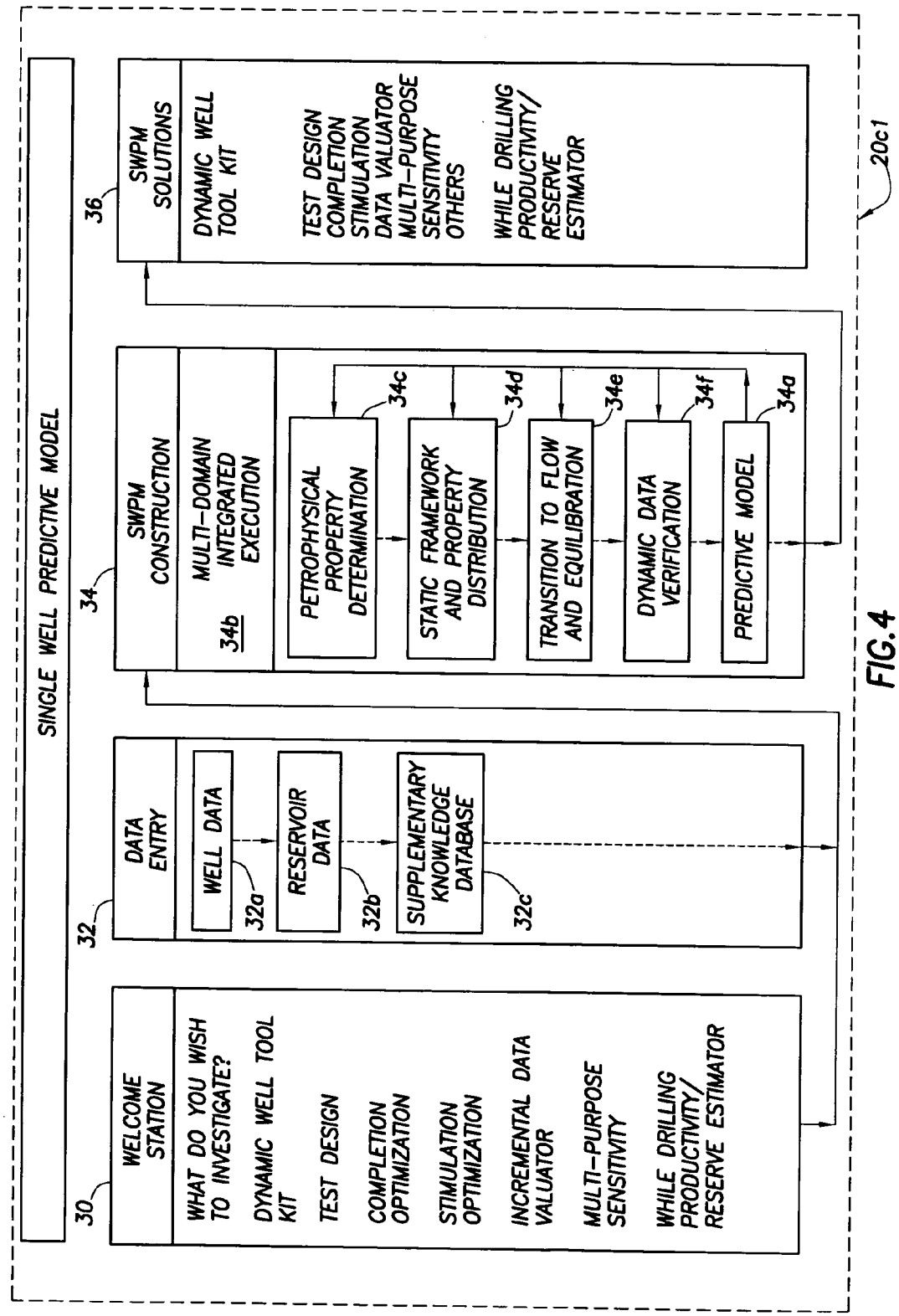
FIG. 4 illustrates a simple example of the construction and the functional operation of the SWPM software based computer system which stores the SWPM software illustrated in FIG. 1.

Referring to FIG. 4, a simple example of one aspect of the construction and the functional operation of the SWPM software based computer system 20 which stores the SWPM software 20c1 of FIG. 1 is illustrated. In FIG. 4, the Single Well Predictive Model software 20c1 of FIG. 1 includes four basic steps: (1) a welcome station 30, (2) a Data Entry step 32, (3) a single well predictive model construction and execution step 34, and (4) a solutions step 36 involving a presentation of generated 'solutions'. In the welcome station step 30 in FIG. 4, the user must decide 'what do you wish to investigate?'. The SWPM software 20c1 is a dynamic well tool kit which will enable a user to perform: test design, completion optimization, and stimulation optimization. The SWPM 20c1 is an incremental data valuator having multi-purpose sensitivity and it can be a productivity/reserve estimator 'while drilling'. In the data entry step 32 of FIG. 4, when the user decides to investigate a 'particular entity' (such as a reservoir field) during the welcome station step 30, a plurality of 'input data' is entered into the computer system 20 of FIG. 1 corresponding to that 'particular entity', such as 'well data' 32a and 'reservoir data' 32b, thereby creating and storing a 'supplementary knowledge database' 32c. When the 'supplementary knowledge database' 32c is created during the data entry step 32 in response to a set of 'input data' provided by a user (including the aforementioned 'well data' 32a and 'reservoir data' 32b), the next step 34 involves 'model building' and using the recently-built model to perform 'multi-domain integrated execution' 34b. In the Single Well Predictive Model (SWPM) construction step 34 of FIG. 4 (also called the 'model construction and execution' step 34), a 'predictive model' 34a is constructed. When the 'predictive model' 34a is constructed, the 'input data' of step 32 (i.e., the 'well data' 32a and the 'reservoir data' 32b and other data stored in the 'supplementary knowledge database' 32c) is used to 'interrogate' the 'predictive model' 34a during the 'multi-domain integrated execution' step 34b. That is, the 'well data' 32a and the 'reservoir data' 32b stored in the 'supplementary knowledge database' 32c of step 32 are used to 'interrogate' the 'predictive model' 34a to produce a set of results, where the set of results may include: 'petrophysical property determination' 34c or 'static framework and property distribution' 34d or 'transition to Flow and Equilibration' 34e, or 'Dynamic Data Verification' 34f. The results of that 'interrogation' of the 'predictive model' 34a (including the results generated during steps 34c, 34d, 34e, and 34f) will be presented to the user during the following 'solutions' step 36. In the SWPM 'solutions' step 36, the results of the 'interrogation' of the 'predictive model' 34a, which was performed during 'model construction and execution' step 34, are presented to a user during this 'solutions' step 36. Possible 'solutions' presented during this step 36 may include test design, completion, stimulation, data valuation, sensitivity, productivity/reserve estimator while drilling, etc. However, later in this specification, it will be demonstrated that the 'predictive model' 34a will first be constructed in response to a set of 'User Objectives' and, when the 'predictive model' 34a is constructed, the 'well data' 32a and the 'reservoir data' 32b stored in the 'supplementary knowledge database' 32c of step 32 will then be used to 'interrogate' the newly constructed 'predictive model' 34a to produce the set of results. A more detailed construction of the 'Single Well Predictive Model (SWPM)' software 20c1 of FIGS. 1 and 4 will be set forth in the following paragraphs of this specification with reference to FIGS. 5 through 17 of the drawings.

Figure 5:
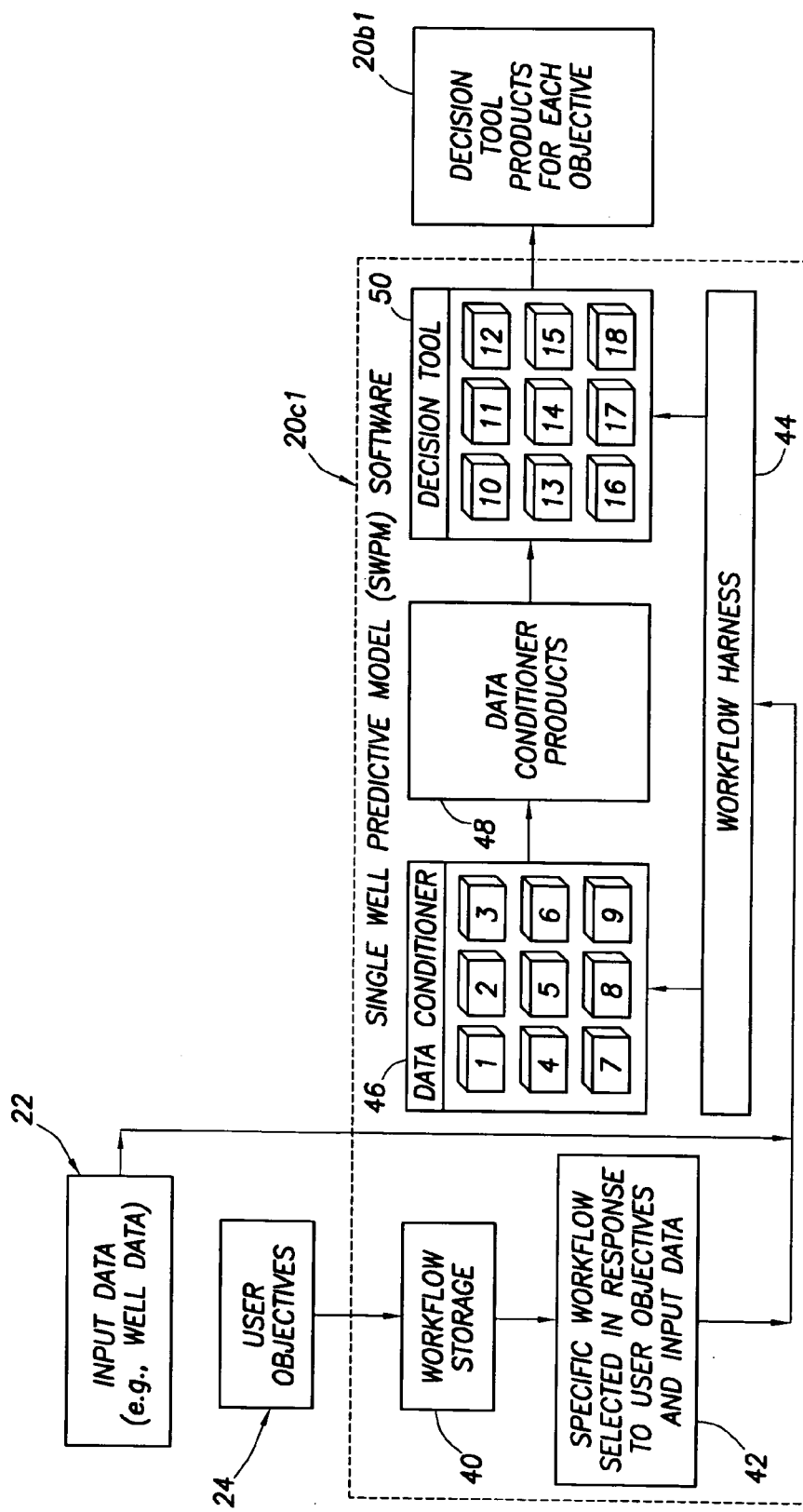
FIG. 5 illustrates a detailed construction of the SWPM software stored in the SWPM software based computer system of FIG. 1.

Referring to FIG. 5, a detailed construction of the SWPM software 20c1 of FIGS. 1 and 4 which is stored in the SWPM software based computer system 20 of FIG. 1 is illustrated. In FIG. 5, the Single Well Predictive Model (SWPM) software 20c1 includes a workflow storage 40 adapted for storing a plurality of different workflows (where the term 'workflow' will be defined below) and adapted for generating a 'specific workflow selected in response to User Objectives and input data' 42. The SWPM software 20c1 also includes a workflow harness 44 adapted for receiving the 'specific workflow' from step 42 and, responsive to that 'specific workflow' from step 42, selecting a plurality of different software modules from the Data Conditioner and the Decision Tool in response to and in accordance with that 'specific workflow' (to be discussed in greater detail in the paragraphs to follow). The SWPM software 20c1 further includes a Data Conditioner 46 which is adapted for storing therein a plurality of software modules, including the following nine software modules which are illustrated in FIG. 5 for purposes of discussion only since a multitude of software modules can be stored in the Data Conditioner 46: software module 1, software module 2, software module 3, software module 4, software module 5, software module 6, software module 7, software module 8, and software module 9. The software modules which are stored in the Data Conditioner 46 and are selected by the Workflow Harness 44 will 'condition' (e.g., calibrate) the 'Input Data' 22. When the 'Input Data' 22 is properly 'conditioned', the selected software modules stored in the Data Conditioner 46 will generate certain particular 'Data Conditioner Products' 48. The SWPM software 20c1 further includes a Decision Tool 50 which is adapted for receiving the 'Data Conditioner Products' 48 and storing therein a further plurality of software modules, including the following nine software modules which are illustrated in FIG. 5 for purposes of discussion only since a multitude of software modules can be stored in the Decision Tool 50: software module 10, software module 11, software module 12, software module 13, software module 14, software module 15, software module 16, software module 17, and software module 18. The Decision Tool 50 will ultimately generate 'Decision Tool Products for each Objective' 20b1 which represent the 'Products produced for each User Objective' 20b1 of FIG. 2. A complete description of the functional operation of the SWPM software 20c1 of FIG. 5 will be set forth in later sections of this specification with reference to FIGS. 12 through 17 of the drawings. However, the following paragraphs of this specification with reference to FIGS. 6 through 11 will provide further details with respect to the structure and the function of the SWPM software 20c1 of FIG. 5.

Figure 6:
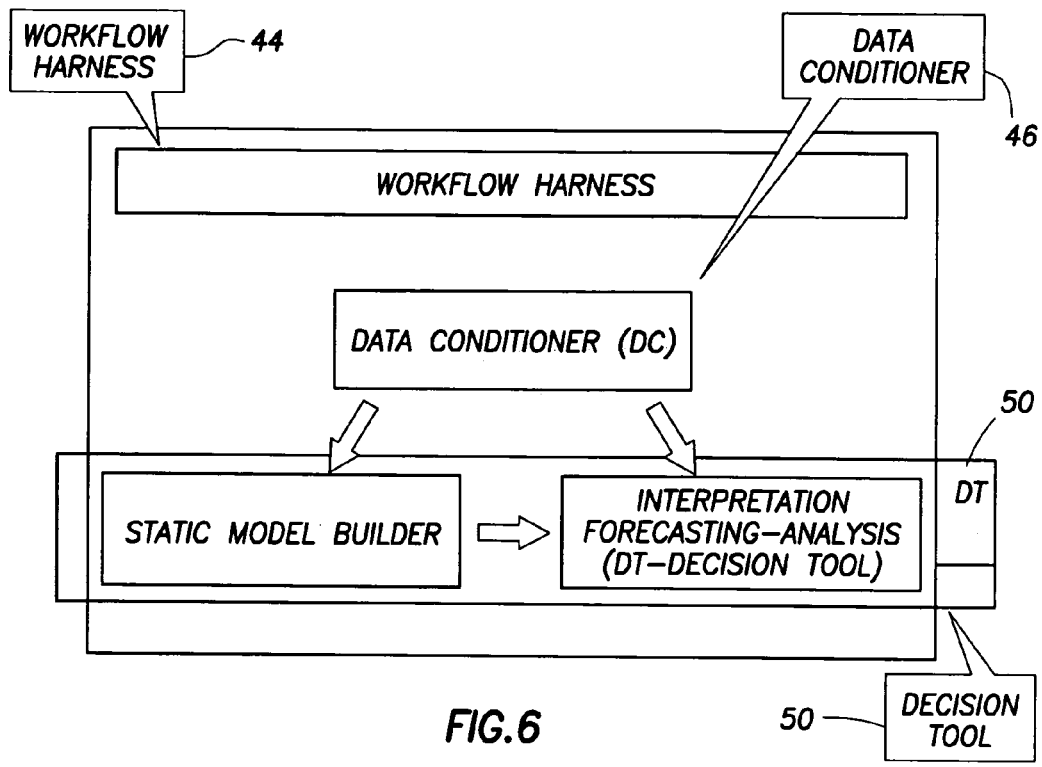
FIG. 6 illustrates the relationship between the Data Conditioner, the Decision Tool, and the Workflow Harness; this figure showing how the Data Conditioner and the Decision Tool are connected.
Figure 7:
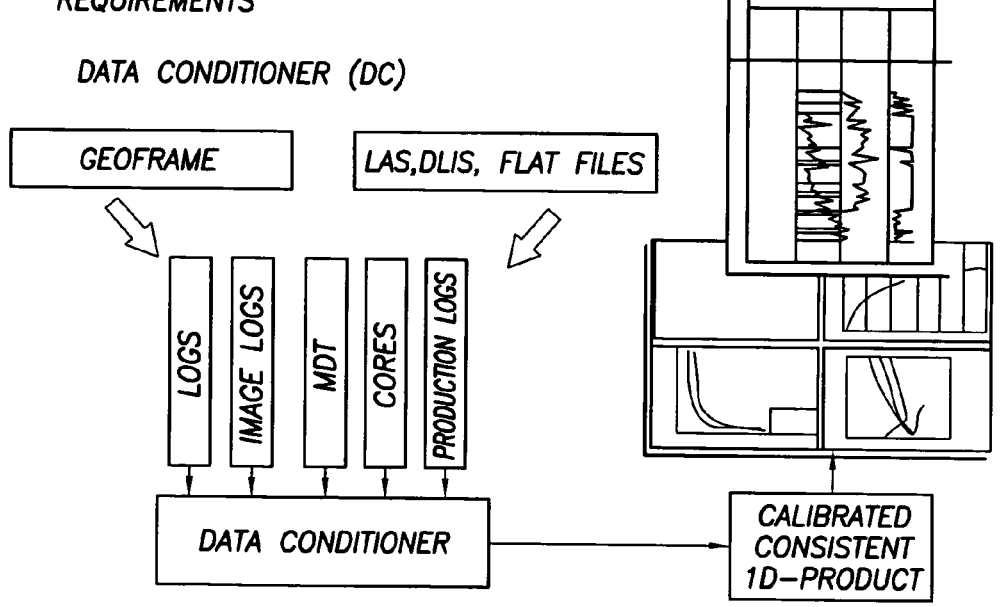
FIG. 7 illustrates a schematic diagram of the Data Conditioner; this figure illustrating how multi-domain data coming from various sources (logs, image logs, MDT measurement, cores and production logs) will be processed to create a 'calibrated consistent 1-D petrophysical static model'.
Figure 8:
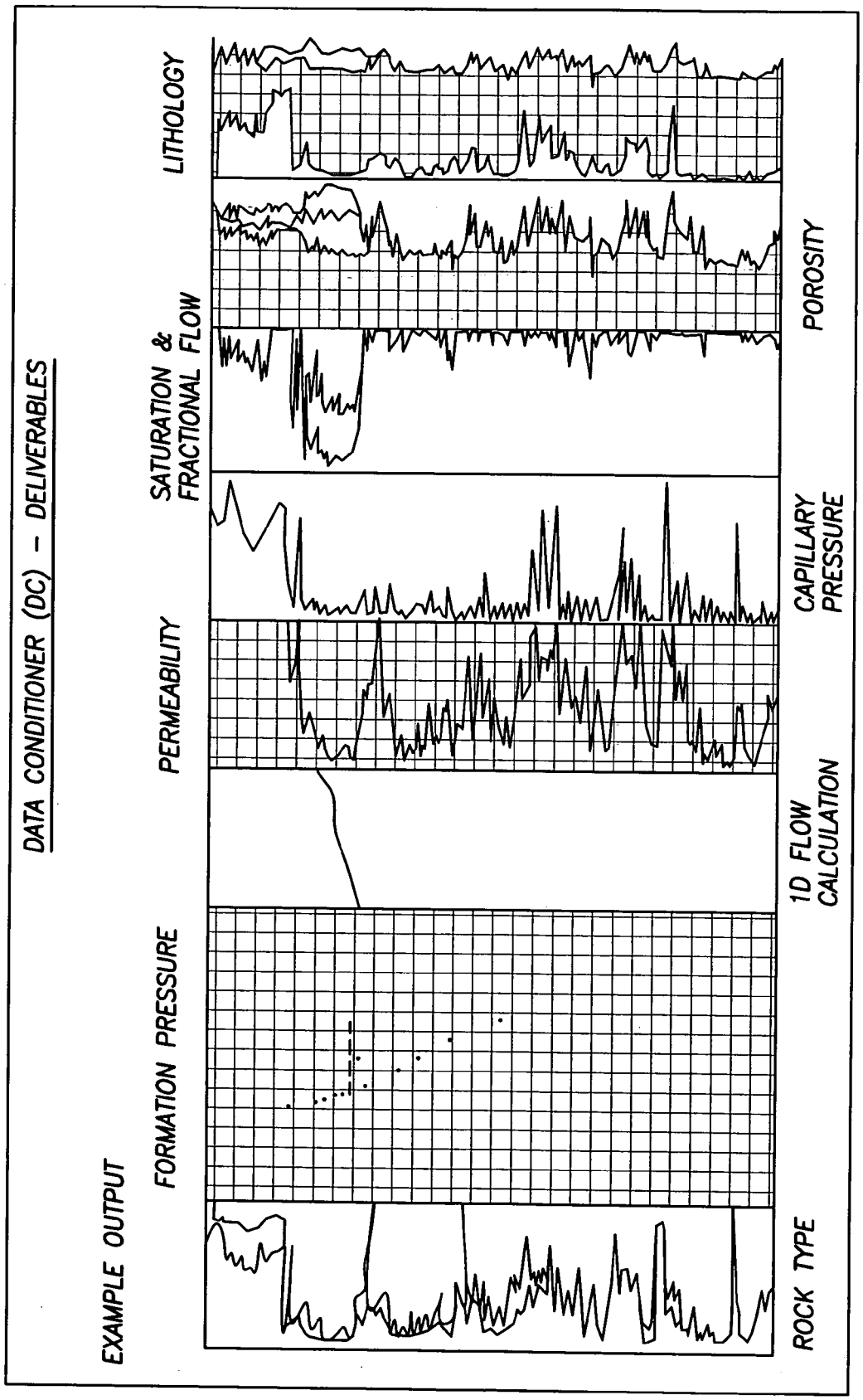
FIG. 8 illustrates the one-dimensional (1D) product of the Data Conditioner; this figure being a draft of how the Data Conditioner results are visualized.
Figure 9:
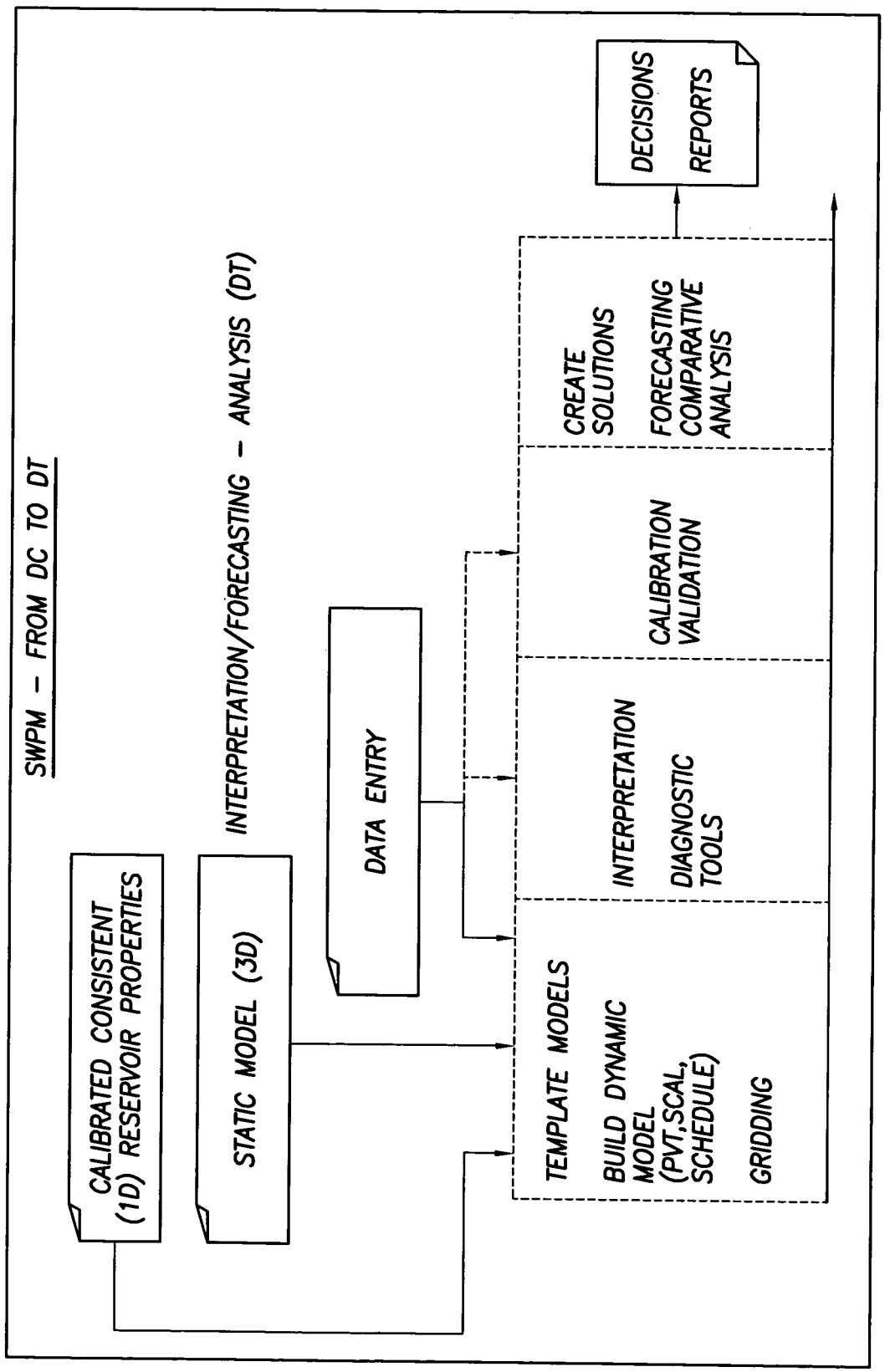
FIG. 9 illustrates the steps, within the Decision Tool, which are taken in response to the 1-D product output of the Data Conditioner shown in FIG. 8; this figure showing how the Data Conditioner and the Decision Tool are connected (a detailed version of FIG. 6); it shows the steps to be taken to create product 'decisions' out of the Decision Tool.

Referring to FIGS. 6, 7, 8, 9, and 9A, recalling that the SWPM software 20c1 of FIGS. 1, 4, and 5 include a Data Conditioner 46, a Decision Tool 50, and a Workflow Harness 44, FIG. 6 illustrates the relationships between the Data Conditioner 46, the Decision Tool 50, and the Workflow Harness 44, FIG. 6 showing how the Data Conditioner 46 and the Decision Tool 50 are connected. In FIG. 6, the Decision Tool 50 includes a Static Model Builder and an Interpretation, Forecasting, and Analysis tool. FIG. 7 illustrates how multi-domain data coming from various sources, (such as logs, image logs, Modular Dynamic Tester (MDT) measurements, cores, and production logs) will be processed to create a 'calibrated consistent 1-D petrophysical static model'. In FIG. 7, if we look at the key pieces in more detail, the Data Conditioner 46 will provide the 1D (one-dimensional) reservoir properties measured at the well bore. All data will be integrated and interpreted in the Data Conditioner 46 as the beginning of the SWPM execution. Schematically, the Data Conditioner 46 is illustrated in FIG. 7. In FIG. 8, the 1D product output of the Data Conditioner 46 is illustrated in FIG. 8. FIG. 8 shows how a 'set of results' generated by the Data Conditioner 46 will be visualized. FIG. 9 shows how the Data Conditioner 46 and the Decision Tool 50 are connected, FIG. 9 representing a detailed version of FIG. 6. In particular, FIG. 9 shows the steps to be taken to generate product 'decisions-reports' from the Decision Tool 50. In FIG. 9, the 1D product output of the Data Conditioner 46 shown in FIG. 8 will begin the execution of the Decision Tool 50. The steps within the Decision Tool 50, starting with the 1D product output of the Data Conditioner 46 of FIG. 8, is illustrated in FIG. 9.

Figure 9A:
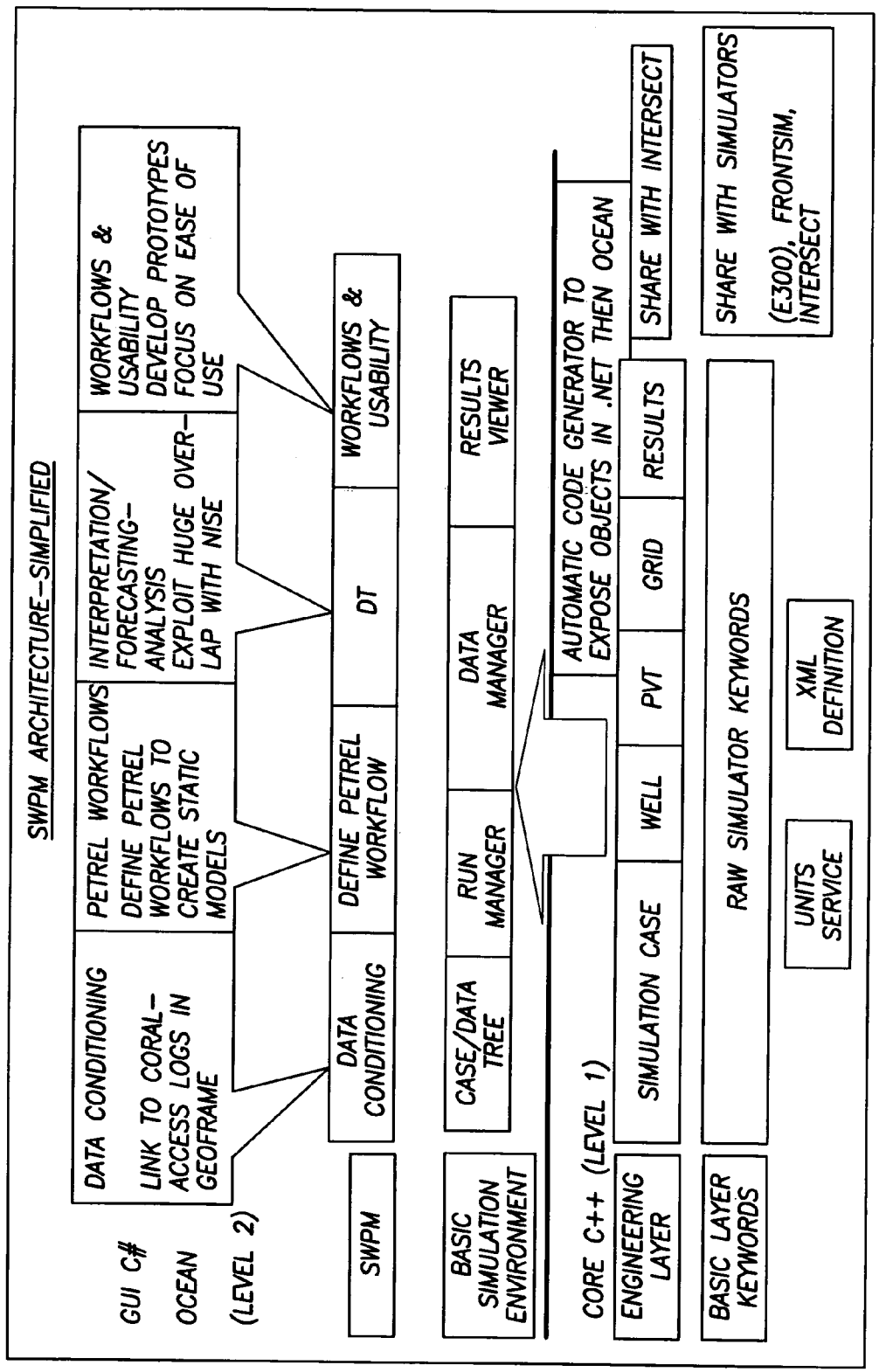
FIG. 9A illustrates the architecture of the SWPM software shown in FIGS. 1, 4-6; this figure showing how existing software and new software are organized (integrated) in a specific order to create the Single Well Predictive Model (SWPM); this basically shows the engines in the background; the SWPM will use the software in a specific order (which is set according to the Decision Tool) while executing.

The third module of the SWPM software 20c1 is the Workflow Harness 44. The Workflow Harness 44 will guide the user from the beginning of the session to the end. Once the user chooses the 'User Objective' from the list provided by the Workflow Harness 44, the Workflow Harness 44 will then call for an 'appropriate workflow' from within a database, and the execution of the SWPM software 20c1 will follow along that 'appropriate workflow'. The 'appropriate workflow' will call numerous application softwares in the right and optimum order. The input/output protocol from one application software to another will also be arranged by the Workflow Harness 44. FIG. 9A shows how a plurality of 'software modules' are organized or integrated together in a specific order or arrangement to thereby create a Single Well Predictive Model (SWPM). FIG. 9A basically shows the 'software modules' in the background. The SWPM will use the 'software modules' in a 'specific order' while executing. The 'specific order' is established by the Decision Tool. In FIG. 9A, from a software structure point of view, a simplified illustration of the architecture of the SWPM software 20c1 is illustrated. In FIG. 9A, the 'Basic Simulation Environment' including the 'Case/Data Tree', 'Run Manager', 'Data Manager', and 'Results Viewer' can be found in U.S. patent application Ser. No. 09/270,128 filed Mar. 16, 1999, entitled "Simulation System including a Simulator and a Case Manager adapted for Organizing Data Files for the Simulator in a Tree-Like Structure", the disclosure of which is incorporated by reference into the specification of this application. In FIG. 9A, the 'SWPM' is the 'Single Well Predictive Model' software 20c1 disclosed in this specification.

Figure 10:
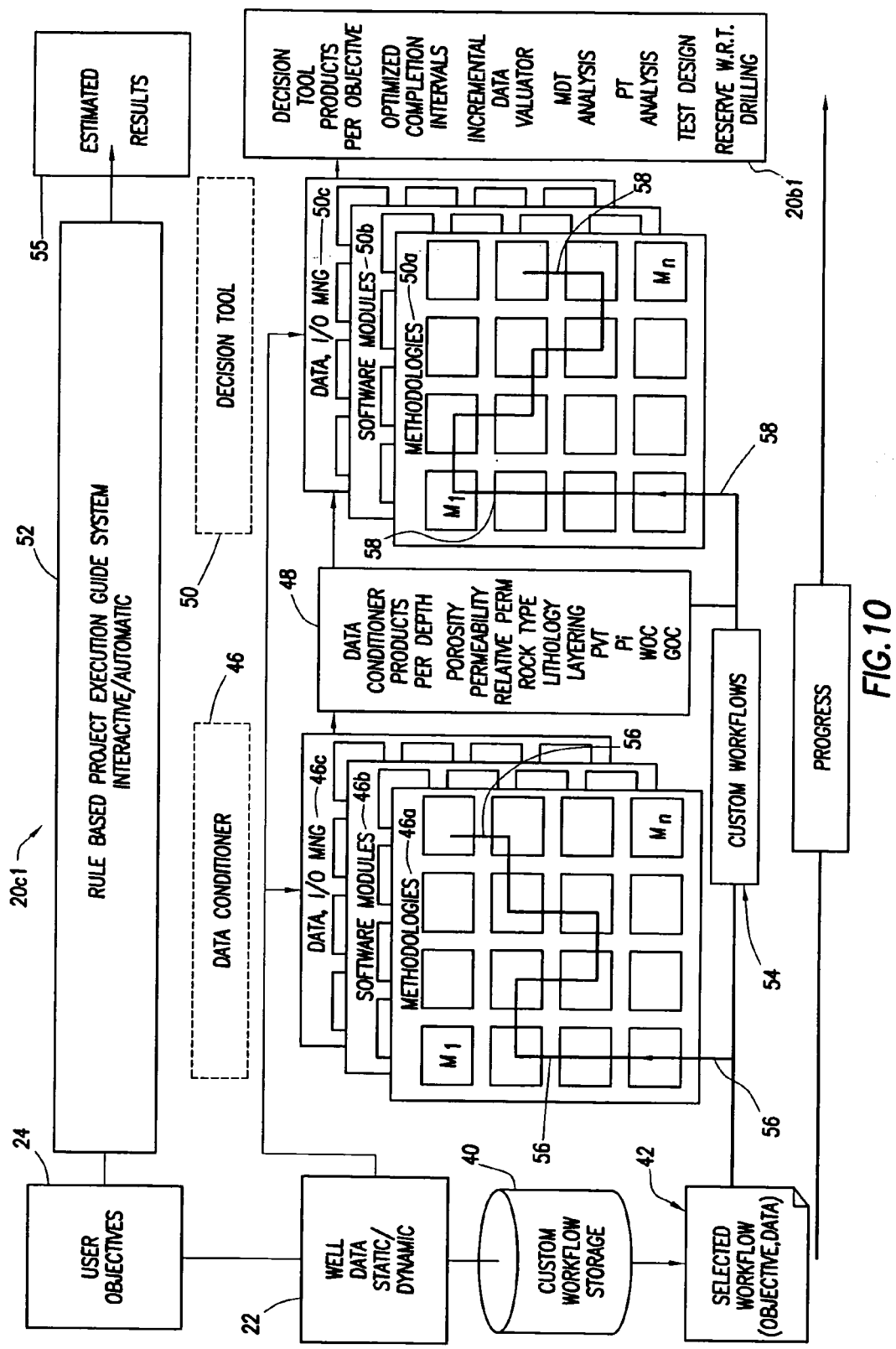
FIGS. 10 and 11 illustrate a more detailed construction and functional operation of the SWPM software stored in the SWPM software based computer system of FIG. 1.
Figure 11:
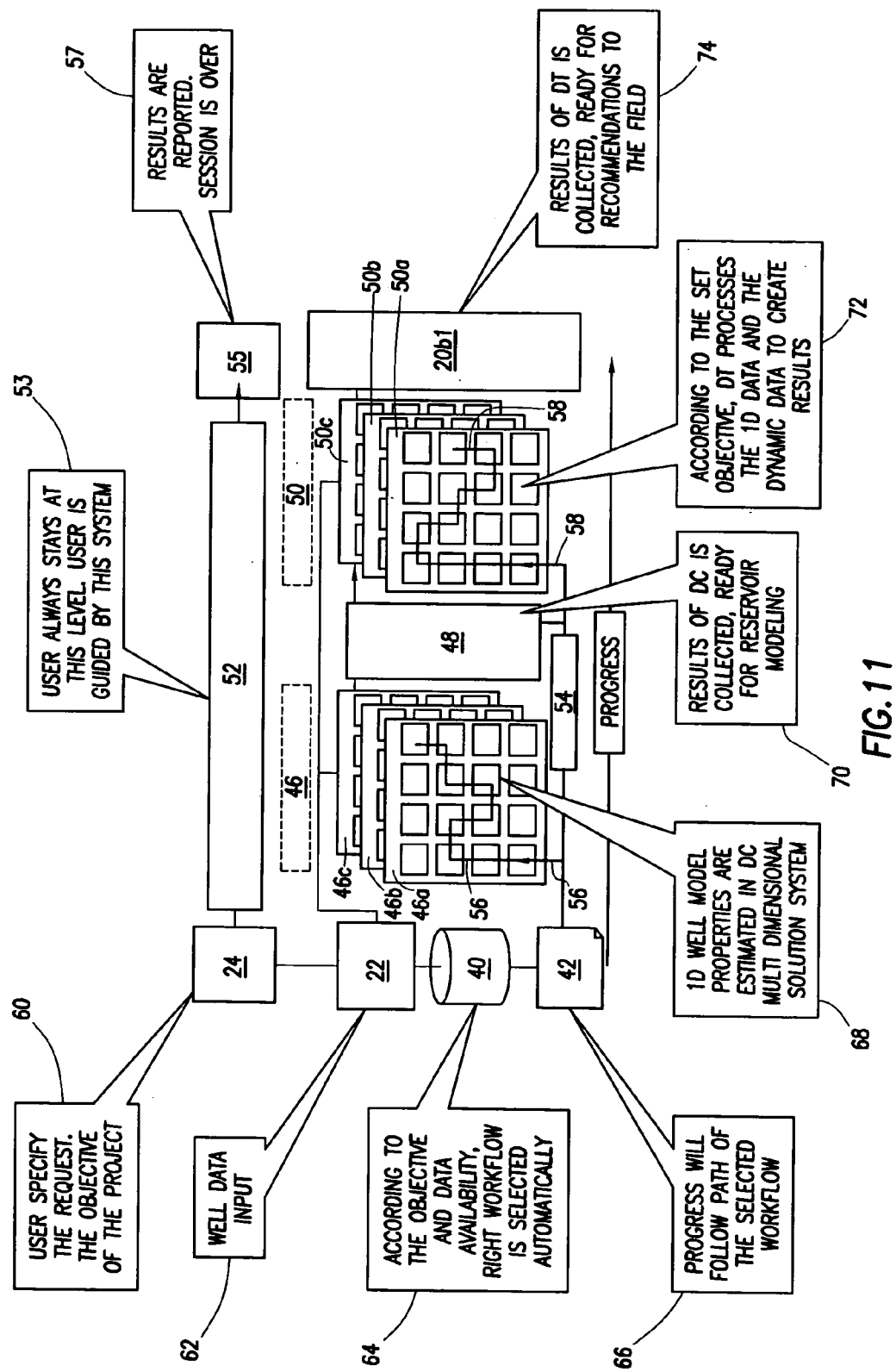

Referring to FIGS. 10 and 11, a more detailed construction of the structure and the functional operation of the SWPM software 20c1 stored in the SWPM software based computer system 20 of FIGS. 1 and 5 is illustrated. In FIG. 10, the SWPM software 20c1 includes the introduction, by a user, of a set of User Objectives 24.

In FIGS. 10 and 11, when the User Objectives 24 are input to the SWPM computer system 20 of FIG. 1, the user will interactively monitor the progress of the execution of the SWPM software 20c1 via the 'Rule Based Project Execution Guide System—Interactive/Automatic' 52. When the user interactively monitors the progress of execution of the SWPM software 20c1 via the 'Rule Based Project Execution Guide System' 52, the user always stays at that level, since the user is guided by the system, as indicated by step 53 of FIG. 11. Estimated results 55 are generated, as indicated by step 55 of FIGS. 10 and 11. The results 55 are reported, and the session is over, as indicated by step 57 in FIG. 11.

In FIGS. 10 and 11, in addition to the set of User Objectives 24, the user will also provide the 'input data' represented by the 'well data' step 22 in FIG. 10. In response to the User Objectives 24 and the 'well data' 22, a 'selected workflow' 42 will be chosen from a plurality of workflows stored in the 'custom workflow storage' 40, the 'selected workflow' 42 representing a 'custom workflow' 54. The 'custom workflow' 54 will execute a 'first plurality of selected software modules' which exist along a first path 56 in the Data Conditioner 46 thereby generating the Data Conditioner Products (per depth) 48, and the 'custom workflow' 54 will also execute a 'second plurality of selected software modules' which exist along a second path 58. The Data Conditioner Products 48, per unit of depth, include porosity, permeability, relative permeability, rock type, lithology, layering, PVT, Pi, WOC, GOC, etc. In FIG. 10, the Data Conditioner 46 includes: (1) methodologies 46a, (2) software modules 46b, and (3) Data and Input/Output 46c. The Decision Tool 50 also includes: (1) methodologies 50a, (2) software modules 50b, and (3) Data and Input/Output 50c. In response to the 'User Objective' 24 provided by the user and the 'Well Data' also provided by the user, and when the 'first plurality of software modules' along the first path 56 are executed by the processor 20a of FIG. 1, the 'second plurality of software modules' along the second path 58 will then be executed by the processor 20a of FIG. 1. When the 'second plurality of software modules' along the second path 58 is executed, a 'Decision Tool Product' 20b1 is generated which corresponds to the 'User Objective' 24 which is selected and provided by the user. In FIG. 11, the aforementioned functional operation of the SWPM software 20c1 discussed above with reference to FIG. 10 (whereby a 'User Objective' 24 and 'Input Data' in the form of 'Well Data' 22 are provided by the user and, responsive thereto, a corresponding 'custom workflow' 54 is generated from the workflow storage 40, the 'custom workflow' 54 being executed along two paths 56 and 58 in the Data Conditioner 46 and the Decision Tool 50 thereby generating 'Decision Tool Products' 20b1) is illustrated again in FIG. 11. In FIG. 11, a plurality of 'steps' associated with the functional operation of the SWPM software based computer system 20 of FIG. 1 which occurs when the SWPM software 20c1 is executed will be discussed below. In FIG. 11, step 60 in connection with the 'User Objectives' 24 indicates that the user must first introduce information corresponding to the 'request' where the term 'request' means the 'objective of the project' or the 'User Objective' 24. Step 62 indicates that 'input data' in the form of 'well data' 22 must then be introduced into the SWPM software based computer system 20 of FIG. 1. Step 64 indicates that, in response to the 'request' or 'User Objective' 24 and the 'input data' or the 'well data' 22 provided by the user and entered into the SWPM software based computer system 20 of FIG. 1, the appropriate 'workflow' is automatically selected from the 'workflow storage' 42. Step 66 indicates that 'progress' will follow the path of the 'selected workflow'; that is, a 'first plurality of software modules' will be selected from the Data Conditioner 46 and a 'second plurality of software modules' will be selected from the Decision Tool 50 in accordance with the 'selected workflow', the 'first plurality of software modules' and the 'second plurality of software modules' being executed in sequence by the processor 20a of the SWPM software based computer system 20 of FIG. 1. Step 68 indicates that, when the 'first plurality of software modules' of the Data Conditioner 46 are executed by the processor 20a of FIG. 1, one-dimensional (1D) well model properties are estimated in the Data Conditioner 46 'multi dimensional solution system'. Step 70 indicates that, when the 'first plurality of software modules' of the Data Conditioner 46 are executed by the processor 20a of FIG. 1 and when the resultant one-dimensional (1D) well model properties are estimated in the Data Conditioner 46 'multi dimensional solution system' in response to the completion of the execution of the 'first plurality of software modules' of the Data Conditioner 46, a 'set of results' which are produced by the Data Conditioner 46 are collected in the Data Conditioner Products 48, that 'set of results' being ready for use in connection with 'reservoir modeling'. Step 72 indicates that, in response to the 'set of results' which have been collected in the Data Conditioner Products 48, the 'second plurality of software modules' in the Decision Tool 50 (which were selected from among other software modules in the Decision Tool 50 in accordance with the 'selected workflow' 42) will be executed in sequence by the processor 20a of FIG. 1 in accordance with the established 'User Objective' 24, and, as a result, processing within the Decision Tool 50 of the one-dimensional (1D) data and other dynamic data will now begin. Step 74 indicates that, when the processing within the Decision Tool 50 of the one-dimensional (1D) data and other dynamic data is complete, a 'second set of results' is generated by the Decision Tool 50 is collected, the 'second set of results' being ready for use for the ultimate purpose of formulating one or more recommendations which can be made to field personnel.

Referring to FIGS. 12 through 17, a functional description of the operation of the Single Well Predictive Model (SWPM) software based computer system 20 of FIG. 1, including the Single Well Predictive Model (SWPM) software 20c1 of FIGS. 1 and 5 stored in the computer system 20, will be set forth in the following paragraphs with reference to FIGS. 12 through 17 of the drawings.

In FIGS. 12 through 17, the Single Well Predictive Model (SWPM) software 20c1 of FIGS. 1 and 5 is illustrated. The Single Well Predictive Model (SWPM) software based computer system 20 as shown in FIG. 1, which stores the Single Well Predictive Model (SWPM) software 20c1 will: (1) automatically produce a first specific workflow comprised of a first plurality of software modules in response to a first set of user objectives and automatically execute the first specific workflow in response to a first set of input data to produce a first desired product, and (2) automatically produce a second specific workflow comprised of a second plurality of software modules in response to a second set of user objectives and automatically execute the second specific workflow in response to a second set of input data to produce a second desired product. As a result, there is no longer any need to separately and independently execute the first plurality of software modules of the first workflow in order to produce the first desired product, and there is no longer any need to separately and independently execute the second plurality of software modules of the second workflow in order to produce the second desired product. As a result, a considerable amount of processor execution time is saved and, in addition, there is no longer any need to perform the aforementioned laborious task of separately and independently executing a plurality of software modules in order to produce a final desired product.

In FIGS. 12-17, recall that the Single Well Predictive Model (SWPM) software 20c1 of FIGS. 1, 5, and 12-17 includes a Data Conditioner 46 which generates Data Conditioner Products 48, a Decision Tool 50, and a Workflow Harness 44 operatively connected to the Data Conditioner 46 and the Decision Tool 50, the function of which will be discussed below.

Figure 12:
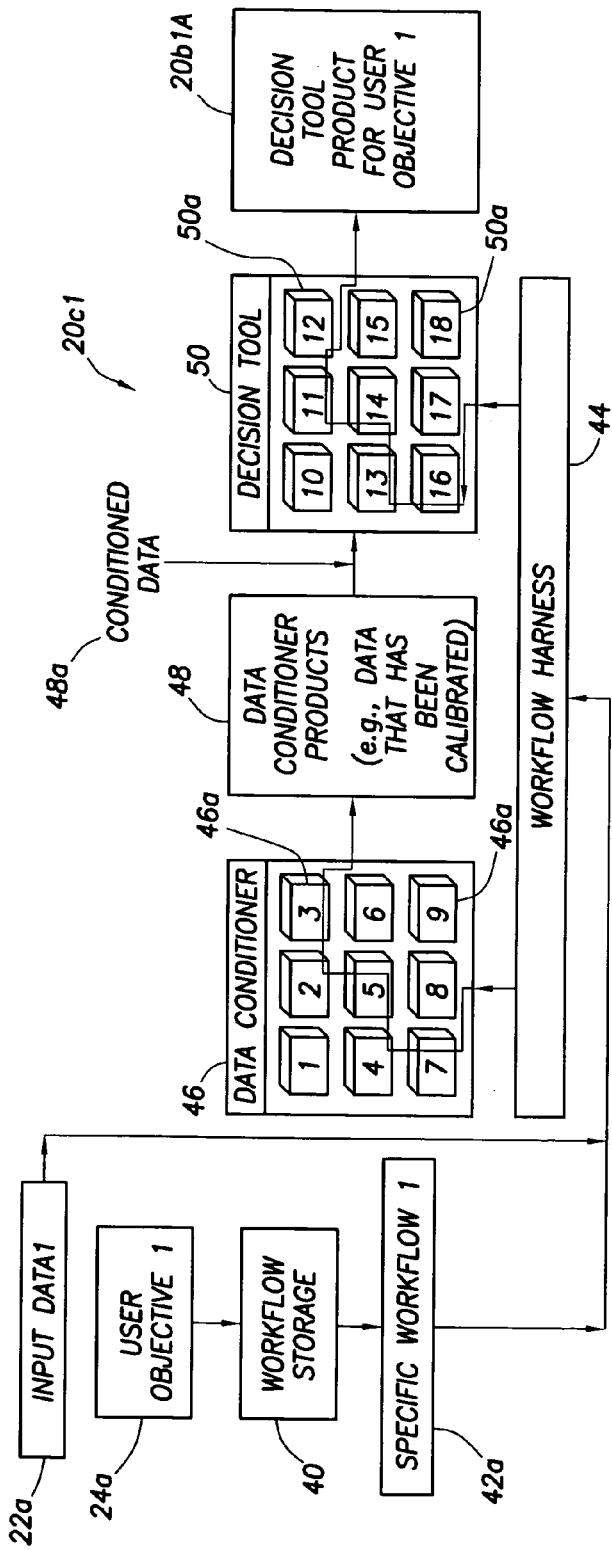
FIGS. 12 through 17 illustrate examples of the functional operation of the SWPM software based computer system of FIG. 1 which stores the SWPM software shown in FIGS. 5, 10, and 11.

In FIG. 12, assume that the user introduces, as input data, the following information into the Single Well Predictive Model (SWPM) software based computer system 20 of FIG. 1: (1) a first set of User Objectives (i.e., User Objective 1) 24a, and (2) a first set of Input Data (i.e., Input Data 1) 22a. The first set of Input Data 22a are input to the workflow harness 44. The first set of User Objectives 24a are input to the Workflow Storage 40, and, responsive thereto, a first specific workflow (specific workflow 1) 42a corresponding to the first set of User Objectives 24a is generated from the workflow storage 40, the first specific workflow 42a being input to the Workflow Harness 44. Recall that the Data Conditioner 46 includes a 'first plurality of software modules' 46a including the following software modules: software module 1, software module 2, software module 3, software module 4, software module 5, software module 6, software module 7, software module 8, and software module 9. Recall that the Decision Tool 50 includes a 'second plurality of software modules' 50a including the following software modules: software module 10, software module 11, software module 12, software module 13, software module 14, software module 15, software module 16, software module 17, and software module 18. In response to the first specific workflow 42a, the workflow harness 44 will choose 'certain selected ones of the first plurality of software modules' 7, 4, 5, 2, and 3 embodied within the Data Conditioner 46. In FIG. 12, the 'certain selected ones of the first plurality of software modules' 7, 4, 5, 2, and 3 consist of the following software modules: software module 7, software module 4, software module 5, software module 2, and software module 3. Then, in response to the first specific workflow 42a, the workflow harness 44 will also choose 'certain selected ones of the second plurality of software modules' 16, 13, 14, 11, and 12 embodied within the Decision Tool 50. The 'certain selected ones of the second plurality of software modules' 16, 13, 14, 11, and 12 consist of the following software modules: software module 16, software module 13, software module 14, software module 11, and software module 12. The 'certain selected ones of the first plurality of software modules' 7, 4, 5, 2, and 3 embodied within the Data Conditioner 46 will be executed first by the processor 20a of the computer system 20 of FIG. 1 in response to the 'Input Data 1' 22a thereby generating the Data Conditioner Products 48. The Data Conditioner Products 48 will include and will therefore generate a set of 'Conditioned Data' 48a (e.g., calibrated data). Then, in response to the 'Conditioned Data' 48a, the 'certain selected ones of the second plurality of software modules' 16, 13, 14, 11, and 12 embodied within the Decision Tool 50 will then be executed by the processor 20a of the computer system 20 of FIG. 1 (while using the Conditioned Data 48a) thereby generating the 'Decision Tool Product for User Objective 1' 20b1A.

Figure 13:
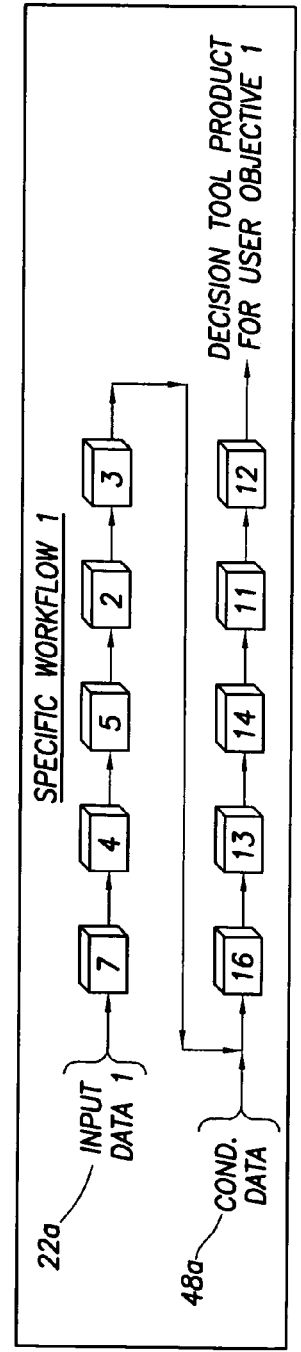

In FIG. 13, the 'specific workflow 1' 42a of FIG. 12, including the 'certain selected ones of the first plurality of software modules' 7, 4, 5, 2, and 3 and the 'certain selected ones of the second plurality of software modules' 16, 13, 14, 11, and 12 which are selected from the Data Conditioner 46 and the Decision Tool 50 by the workflow harness 44 and which are executed by the processor 20a of the computer system 20 of FIG. 1, is illustrated. In FIG. 13, in response to the 'Input Data 1' 22a, the 'certain selected ones of the first plurality of software modules' 7, 4, 5, 2, and 3 are executed in sequence by processor 20a; then, in response to the 'Conditioned Data' 48a, the 'certain selected ones of the second plurality of software modules' 16, 13, 14, 1, and 12 are executed in sequence thereby generating the 'Decision Tool Product for User Objective 1' 20b1A.

In FIGS. 12-13, the user introduced a first user objective (User Objective 1) and a first set of input data (Input Data 1) for the purpose of ultimately generating the 'Decision Tool Product for User Objective 1' 20b1A. In the following paragraphs, assume that the user introduces a second user objective (User Objective 2) and a second set of input data (Input Data 2) for the purpose of ultimately generating a 'Decision Tool Product for User Objective 2' 20b1B.

Figure 14:
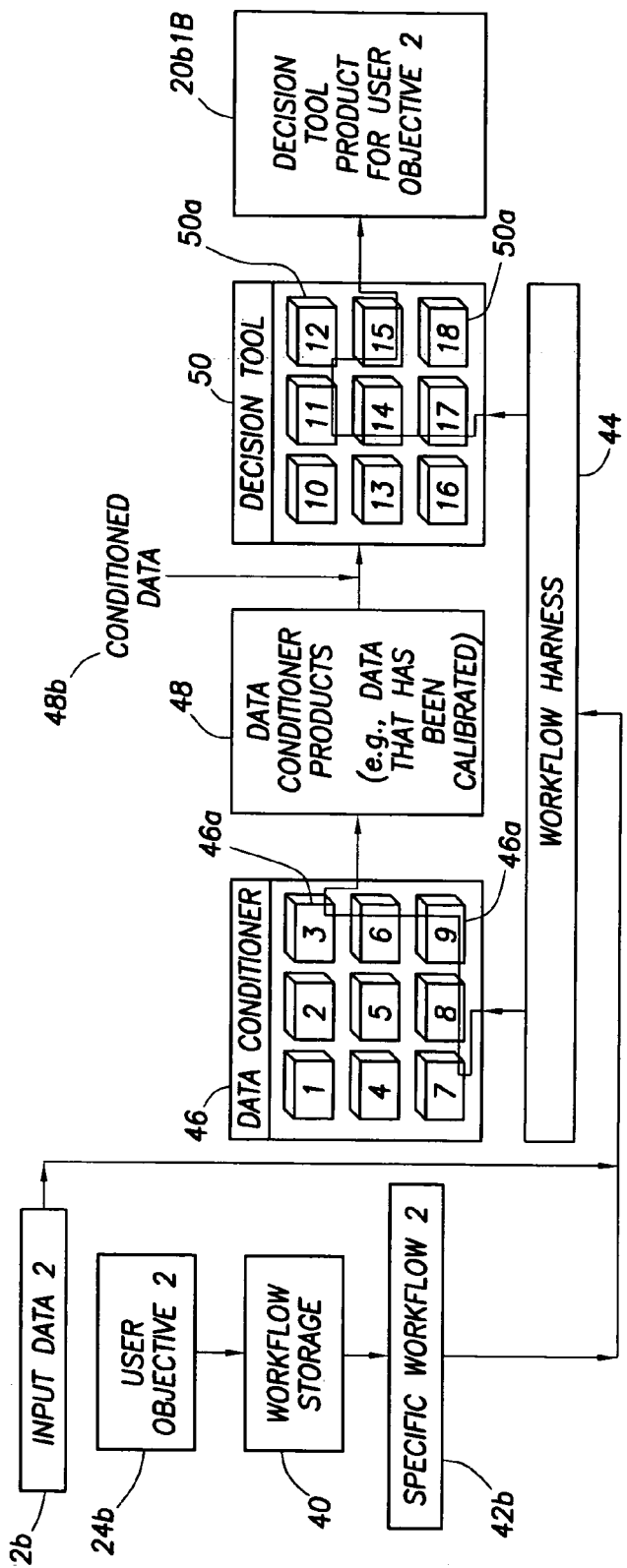

In FIG. 14, assume that the user introduces, as input data, the following information into the Single Well Predictive Model (SWPM) software based computer system 20 of FIG. 1: (1) a second set of User Objectives (i.e., User Objective 2) 24b, and (2) a second set of Input Data (i.e., Input Data 2) 22b. The second set of Input Data 22b are input to the workflow harness 44. The second set of User Objectives 24b are input to the Workflow Storage 40, and, responsive thereto, a second specific workflow (specific workflow 2) 42b corresponding to the second set of User Objectives 24b is generated from the workflow storage 40, the second specific workflow 42b being input to the Workflow Harness 44. Recall that the Data Conditioner 46 includes a 'first plurality of software modules' 46a including the following software modules: software module 1, software module 2, software module 3, software module 4, software module 5, software module 6, software module 7, software module 8, and software module 9. Recall that the Decision Tool 50 includes a 'second plurality of software modules' 50a including the following software modules: software module 10, software module 11, software module 12, software module 13, software module 14, software module 15, software module 16, software module 17, and software module 18. In response to the second specific workflow 42b, the workflow harness 44 will choose 'certain selected ones of the first plurality of software modules' 7, 8, 9, 6, and 3 embodied within the Data Conditioner 46. In FIG. 14, the 'certain selected ones of the first plurality of software modules' 7, 8, 9, 6, and 3 consist of the following software modules: software module 7, software module 8, software module 9, software module 6, and software module 3. Then, in response to the second specific workflow 42b, the workflow harness 44 will also choose 'certain selected ones of the second plurality of software modules' 17, 14, 11, 12, and 15 embodied within the Decision Tool 50. The 'certain selected ones of the second plurality of software modules' 17, 14, 11, 12, and 15 consist of the following software modules: software module 17, software module 14, software module 11, software module 12, and software module 15. The 'certain selected ones of the first plurality of software modules' 7, 8, 9, 6, and 3 embodied within the Data Conditioner 46 will be executed in sequence by the processor 20a of the computer system 20 of FIG. 1 in response to the 'Input Data 2' 22b thereby generating the Data Conditioner Products 48. The Data Conditioner Products 48 will include and will therefore generate a set of 'Conditioned Data' 48b (e.g., calibrated data). Then, in response to the 'Conditioned Data' 48b, the 'certain selected ones of the second plurality of software modules' 17, 14, 11, 12, and 15 embodied within the Decision Tool 50 will then be executed in sequence by the processor 20a of the computer system 20 of FIG. 1 (while using the Conditioned Data 48b) thereby generating the 'Decision Tool Product for User Objective 2' 20b1B.

Figure 15:
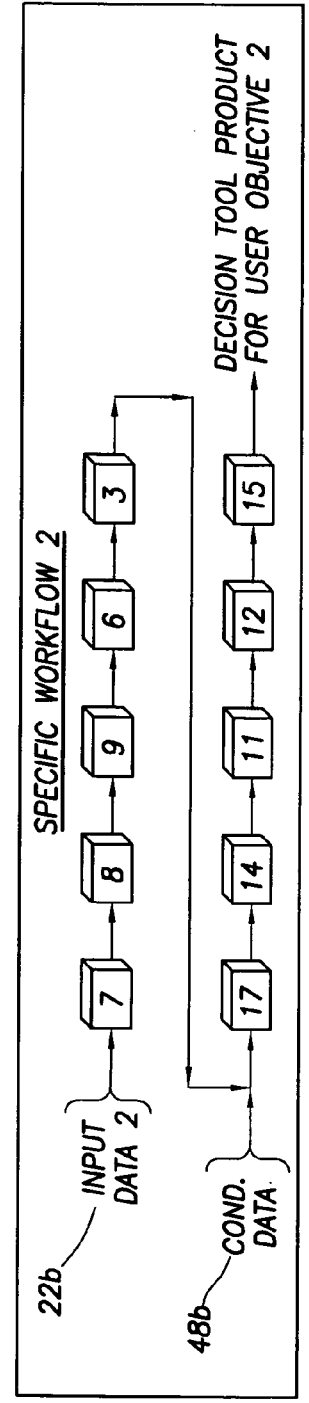

In FIG. 15, the 'specific workflow 2' 42b of FIG. 14, including the 'certain selected ones of the first plurality of software modules' 7, 8, 9, 6, and 3 and the 'certain selected ones of the second plurality of software modules' 17, 14, 11, 12, and 15 which are selected from the Data Conditioner 46 and the Decision Tool 50 by the workflow harness 44 and which are executed by the processor 20a of the computer system 20 of FIG. 1, is illustrated. In FIG. 15, in response to the 'Input Data 2' 22b, the 'certain selected ones of the first plurality of software modules' 7, 8, 9, 6, and 3 are executed in sequence by processor 20a; then, in response to the 'Conditioned Data' 48b, the 'certain selected ones of the second set of software modules' 17, 14, 11, 12, and 15 are executed in sequence thereby generating the 'Decision Tool Product for User Objective 2' 20b1B.

In FIGS. 14-15, the user introduced a second user objective (User Objective 2) and a second set of input data (Input Data 2) for the purpose of ultimately generating the 'Decision Tool Product for User Objective 2' 20b1B. In the following paragraphs, assume that the user introduces a third user objective (User Objective 3) and a third set of input data (Input Data 3) for the purpose of ultimately generating a 'Decision Tool Product for User Objective 3' 20b1C.

Figure 16:
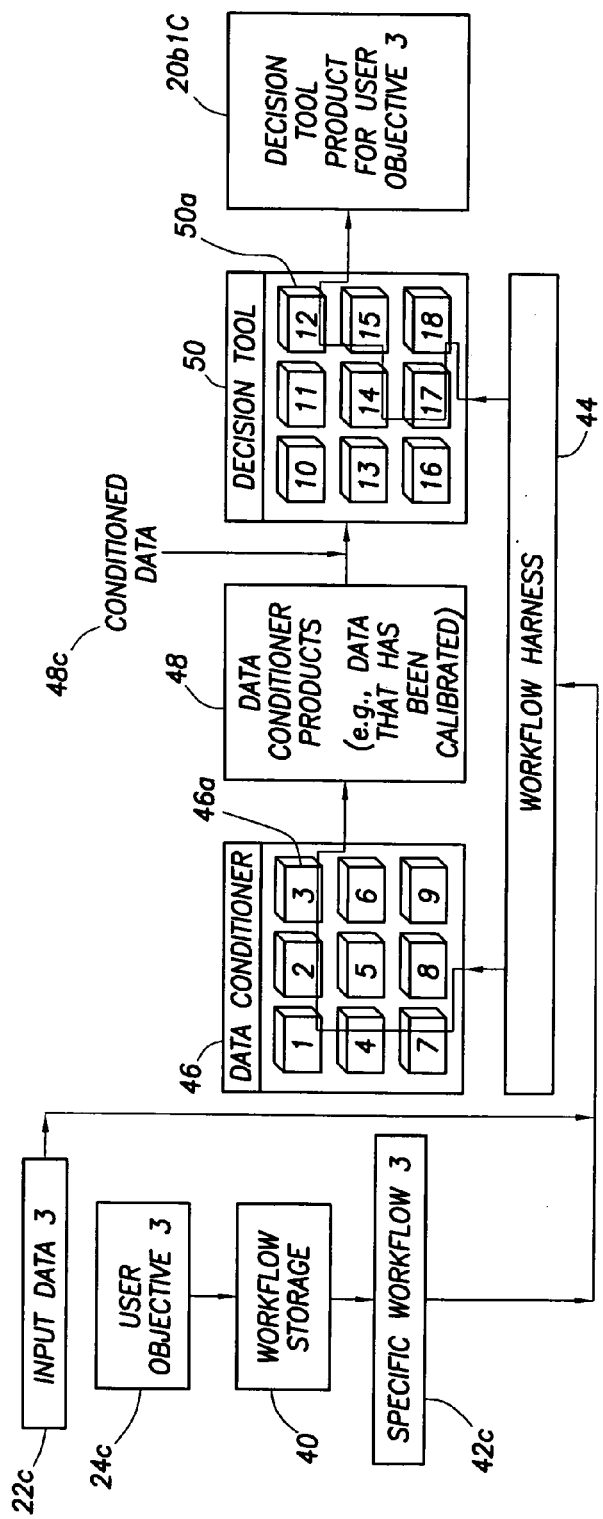

In FIG. 16, assume that the user introduces, as input data, the following information into the Single Well Predictive Model (SWPM) software based computer system 20 of FIG. 1: (1) a third set of User Objectives (i.e., User Objective 3) 24c, and (2) a third set of Input Data (i.e., Input Data 3) 22c. The third set of Input Data 22c are input to the workflow harness 44. The third set of User Objectives 24c are input to the Workflow Storage 40, and, responsive thereto, a third specific workflow (specific workflow 3) 42c corresponding to the third set of User Objectives 24c is generated from the workflow storage 40, the third specific workflow 42c being input to the Workflow Harness 44. Recall that the Data Conditioner 46 includes a 'first plurality of software modules' 46a including the following software modules: software module 1, software module 2, software module 3, software module 4, software module 5, software module 6, software module 7, software module 8, and software module 9. Recall that the Decision Tool 50 includes a 'second plurality of software modules' 50a including the following software modules: software module 10, software module 11, software module 12, software module 13, software module 14, software module 15, software module 16, software module 17, and software module 18. In response to the third specific workflow 42c, the workflow harness 44 will choose 'certain selected ones of the first plurality of software modules' 7, 4, 1, 2, and 3 embodied within the Data Conditioner 46. In FIG. 16, the 'certain selected ones of the first plurality of software modules' 7, 4, 1, 2, and 3 consist of the following software modules: software module 7, software module 4, software module 1, software module 2, and software module 3. Then, in response to the third specific workflow 42c, the workflow harness 44 will also choose 'certain selected ones of the second plurality of software modules' 18, 17, 14, 15, and 12 embodied within the Decision Tool 50. The 'certain selected ones of the second plurality of software modules' 18, 17, 14, 15, and 12 consist of the following software modules: software module 18, software module 17, software module 14, software module 15, and software module 12. The 'certain selected ones of the first plurality of software modules' 7, 4, 1, 2, and 3 embodied within the Data Conditioner 46 will be executed in sequence by the processor 20a of the computer system 20 of FIG. 1 in response to the 'Input Data 3' 22c thereby generating the Data Conditioner Products 48. The Data Conditioner Products 48 will include and will therefore generate a set of 'Conditioned Data' 48c (e.g., calibrated data). Then, in response to the 'Conditioned Data' 48c, the 'certain selected ones of the second plurality of software modules' 18, 17, 14, 15, and 12 embodied within the Decision Tool 50 will then be executed in sequence by the processor 20a of the computer system 20 of FIG. 1 (while using the Conditioned Data 48c) thereby generating the 'Decision Tool Product for User Objective 3' 20b1C.

Figure 17:
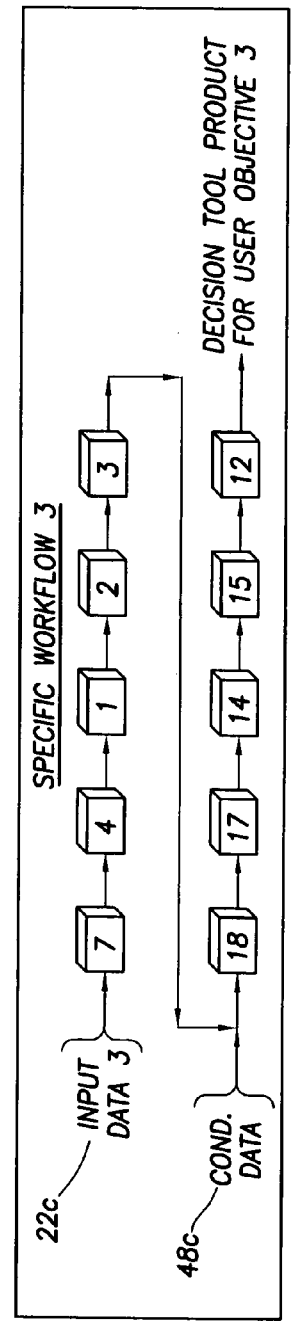

In FIG. 17, the 'specific workflow 3' 42c of FIG. 16, including the 'certain selected ones of the first plurality of software modules' 7, 4, 1, 2, and 3 and the 'certain selected ones of the second plurality of software modules' 18, 17, 14, 15, and 12 which are selected from the Data Conditioner 46 and the Decision Tool 50 by the workflow harness 44 and which are executed by the processor 20a of the computer system 20 of FIG. 1, is illustrated. In FIG. 17, in response to the 'Input Data 3' 22c, the 'certain selected ones of the first plurality of software modules' 7, 4, 1, 2, and 3 are executed in sequence by processor 20a; then, in response to the 'Conditioned Data' 48c, the 'certain selected ones of the second plurality of software modules' 18, 17, 14, 15, and 12 are executed in sequence thereby generating the 'Decision Tool Product for User Objective 3' 20b1C.

Single Well Predictive Model (SWPM)/Modular Dynamics Tester (MDT) Workflow

Figure 18:
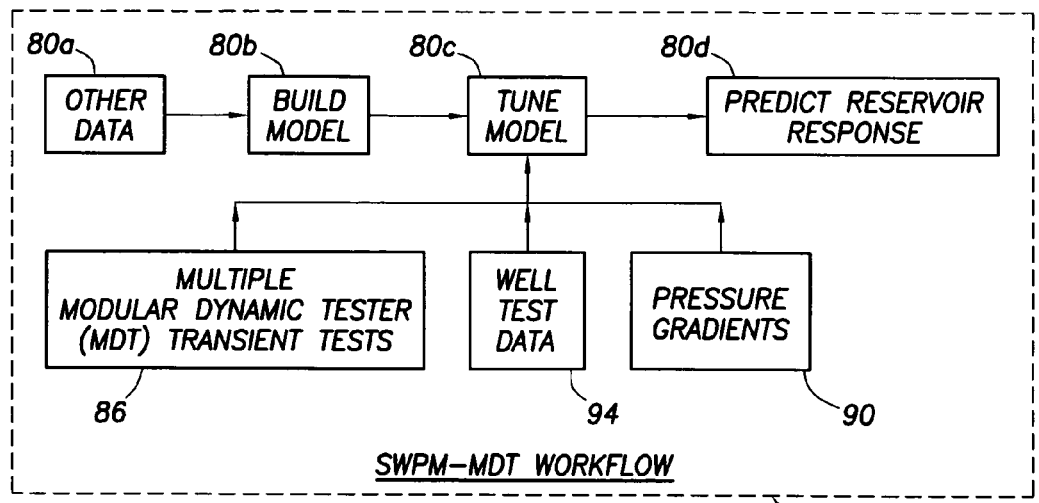
FIG. 18 illustrates a basic construction of a 'Single Well Predictive Model (SWPM)/Modular Dynamics Tester (MDT) Workflow' (hereinafter, the 'SWPM-MDT Workflow')

Referring to FIG. 18, a basic construction of the 'Single Well Predictive Model (SWPM)/Modular Dynamics Tester (MDT) Workflow' is illustrated. Hereinafter, the term 'Single Well Predictive Model (SWPM)/Modular Dynamics Tester (MDT) Workflow' will be abbreviated by using the term: 'SWPM-MDT Workflow'.

FIGS. 13, 15, and 17 illustrated examples of Workflows, such as 'Workflow 1' of FIG. 13, 'Workflow 2' of FIG. 15, and 'Workflow 3' of FIG. 17. However, FIGS. 18 and 24, along with supporting FIGS. 19-23, illustrate one specific example of a specific 'Workflow' which could easily be one of the Workflows ('Workflow 1' or 'Workflow 2' or 'Workflow 3') illustrated in FIGS. 13, 15, and 17, respectively. In particular, in FIGS. 18 and 24, a 'Workflow', known as the 'Single Well Predictive Model (SWPM)/Modular Dynamics Tester (MDT) Workflow' 80 (abbreviated in the form 'SWPM-MDT Workflow' 80), is illustrated. The SWPM-MDT Workflow 80 of FIG. 24 is a more detailed construction of the SWPM-MDT Workflow 80 of FIG. 18.

Figure 19:
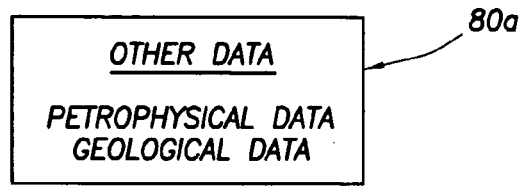
FIG. 19 illustrates a basic construction of the 'other data' step of the SWPM-MDT Workflow of FIG. 18.

Referring to FIGS. 18 and 19, referring initially to FIG. 18, a basic construction of the 'Single Well Predictive Model (SWPM)/Modular Dynamics Tester (MDT) Workflow' 80 (SWPM-MDT Workflow 80) is illustrated. In FIG. 18, the SWPM-MDT Workflow 80 includes an 'Other Data' step 80a. In FIG. 19, the 'Other Data' step 80a includes Petrophysical Data and Geological Data. The Petrophysical Data and the Geological Data which comprises the 'Other Data' in the 'Other Data' step 80a of FIG. 19 will be discussed in greater detail below with reference to FIG. 20. In FIG. 18, the SWPM-MDT Workflow 80 further includes a 'Build Model' step 80b. The 'Build Model' step 80b will be discussed in greater detail below with reference to FIG. 21. In FIG. 18, the SWPM-MDT Workflow 80 further includes a 'Tune Model' step 80c. The 'Tune Model' step 80c will be discussed in greater detail below with reference to FIG. 22. The 'Tune Model' step 80c is responsive to data set forth in blocks 86, 94, and 90, where the data in block 86 includes 'multiple Modular Dynamic Tester (MDT) transient test data', and the data in block 94 includes 'well test data' also known as 'production pressure test' data, and the data in block 90 includes 'pressure gradient data' also known as 'pretest survey'. The Modular Dynamic Tester (MDT) is a tool that is owned and operated by Schlumberger Technology Corporation, of Houston Tex. In FIG. 18, the SWPM-MDT Workflow 80 further includes a 'Predict Reservoir Response' step 80d.

The 'Predict Reservoir Response' step 80*d* will be discussed in greater detail below with reference to FIG. 23.

In FIG. 18, the operation of the SWPM-MDT Workflow 80 of FIG. 18 will now be discussed. In operation, referring to FIG. 18, the 'Other Data' 80*a* (and, in particular, the Petrophysical Data and the Geological Data set forth in FIG. 19) is used in the 'Build Model' step 80*b* of FIG. 18. In the 'Build Model' step 80*b*, a 'simulator model' is build or constructed by using the Petrophysical Data and the Geological Data of FIG. 19. The 'simulator model' is designed to predict a 'response' from a 'new oil or gas reservoir' in response to 'recently measured or observed data', the 'recently measured or observed data' being data that has been recently generated from measurement devices that have been placed in various locations within the 'new oil or gas reservoir'. The 'response' that is predicted by the 'simulator model' includes any oil and/or gas that is predicted to be produced from the 'new oil or gas reservoir'. In the 'Tune Model' step 80*c*, when the 'simulator model' is built or constructed in the 'Build Model' step 80*b*, the 'simulator model' must be 'tuned' or calibrated, that is, the 'simulator model' must be tested to be sure that it is 'operating properly'. If a 'known oil or gas reservoir' already has 'known measured or observed data' which corresponds to a 'known response', the 'simulator model' is 'operating properly' when the 'known measured or observed data' interrogates the 'simulator model' and, responsive thereto, a 'particular response' is generated from the 'simulator model', where the 'particular response' generated from the 'simulator model' is substantially the same as the 'known response' from the 'known oil or gas reservoir'. In FIG. 18, the 'known measured or observed data' includes the MDT Transient Test data 86, the Well Test Data 94, and the Pressure Gradient data 90.

In particular, in FIG. 18, a 'known reservoir' includes a set of 'known measured or observed data' (that was taken during measurements obtained from the 'known reservoir') and a 'known response' (that was generated by the 'known reservoir' in response to the 'known measured or observed data'). The 'known measured or observed data' includes the 'Multiple Modular Dynamic Tester (MDT) transient test' data of step 86 of FIG. 18, and/or the 'well test data' or 'production pressure test' of step 94 of FIG. 18, and/or the 'pressure gradient' or 'pretest survey' data of step 90 of FIG. 18. The term 'known response' can include the production of oil and/or gas from the reservoir. During the 'Tune Model' step 80*c*, the 'known measured or observed data' (i.e., MDT data 86, Well Test data 94, and Pressure Gradient data 90 in FIG. 18) is input to the 'simulator model' that was constructed during the 'Build Model' step 80*b*, and a 'particular response' is generated by the 'simulator model'. That 'particular response', which is generated from the 'simulator model' in response to the 'known measured or observed data', is compared to the above referenced 'known response' which was generated by the 'known reservoir'. If the 'particular response' is not substantially the same as the 'known response', the 'simulator model' must be 'tuned' or calibrated. In order to tune or calibrate the 'simulator model', 'various parameters' of the model must be altered or changed, including, by way of example, the 'horizontal permeability (Kh)' and/or the 'vertical permeability (Kv)' associated with the 'simulator model'. When the 'various parameters' of the model have been changed, the 'known measured or observed data' is re-input to the 'simulator model' that was constructed during the 'Build Model' step 80*b*, and a 'second particular response' is generated by the 'simulator model'. That 'second particular response' (generated from the 'simulator model' in response to the 'known measured or observed data' when the 'various parameters' of the model have been changed) is compared to the above referenced 'known response' of the 'known reservoir'. If the 'second particular response' is not substantially the same as the 'known response', the 'simulator model' must be 're-tuned' or re-calibrated once again. In order to re-tune or re-calibrate the 'simulator model', the 'various parameters' [e.g., horizontal permeability (Kh) or vertical permeability (Kv)] of the model must be re-altered or re-changed, and then the 'known measured or observed data' is re-input once again to the 'simulator model' that was constructed during the 'Build Model' step 80*b*, and a 'third particular response' is generated by the 'simulator model'. This process repeats until the 'third or subsequent particular response' is substantially the same as the 'known response'. If the 'particular response' is substantially the same as the 'known response', the 'simulator model' is 'tuned' (i.e., the 'simulator model' has been 'history matched' and therefore is 'operating properly'). At this point, we proceed to the next step associated with the SWPM-MDT Workflow 80, which is the 'Predict Reservoir Response' step 80*d*. In the 'Predict Reservoir Response' step 80*d*, now that the 'simulator model' has been 'tuned' and calibrated (meaning that the 'particular response' from the 'simulator model' in response to the 'known measured or observed data' is substantially the same as the 'known response' of the 'known reservoir'), the 'simulator model' can now be used to predict a 'new response' from a 'new oil or gas reservoir' in response to the new reservoir's corresponding 'recently measured or observed data' (and recall that the 'recently measured or observed data' represents data that has been recently generated by measurement devices that have been placed in various locations within the 'new oil or gas reservoir'). Since the 'known measured or observed data' included the MDT Transient Test data 86 (i.e., multiple formation tester transients), the Well Test data 94, and the Pressure Gradient data 90 of FIG. 18 (and FIG. 24), the new reservoir's corresponding 'recently measured or observed data' can also include the MDT Transient Test data 86 (i.e., multiple formation tester transients), the Well Test data 94, and the Pressure Gradient data 90 of FIG. 18. As a result, the SWPM-MDT Workflow 80 of FIGS. 18 and 24 will function to perform simultaneous analysis of multiple formation tester transients and well tests using an integrated well model.

Figure 22:
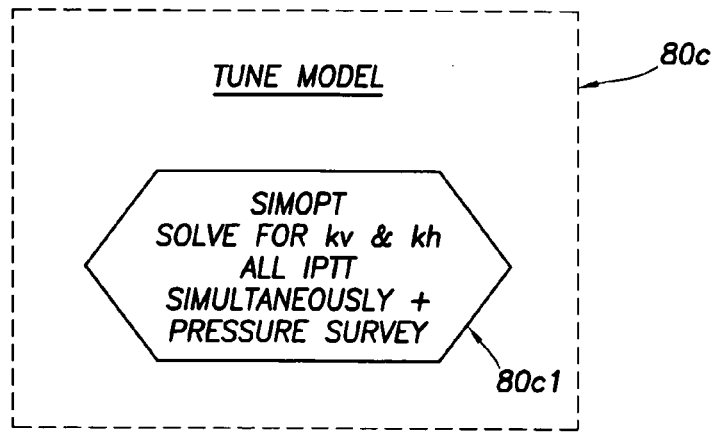
FIG. 22 illustrates a construction of the 'tune model' step of the SWPM-MDT Workflow of FIG. 18, the workflow of FIG. 22 forming a part of the Workflow of FIGS. 24A-24C.
Figure 23:
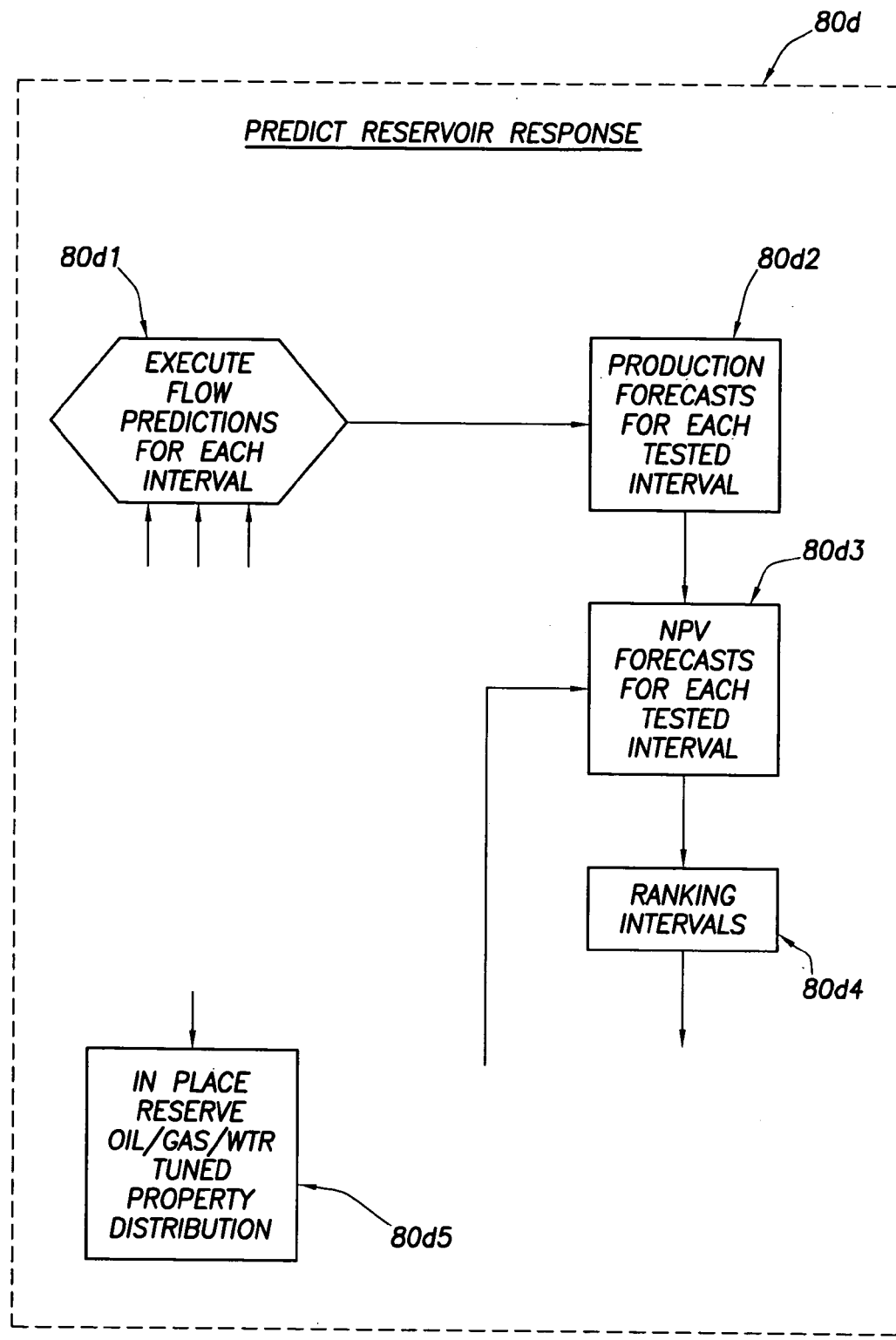
FIG. 23 illustrates a construction of the 'Predict Reservoir Response' step of the SWPM-MDT Workflow of FIG. 18, the workflow of FIG. 23 forming a part of the Workflow of FIGS. 24A-24C.
Figure 24A:
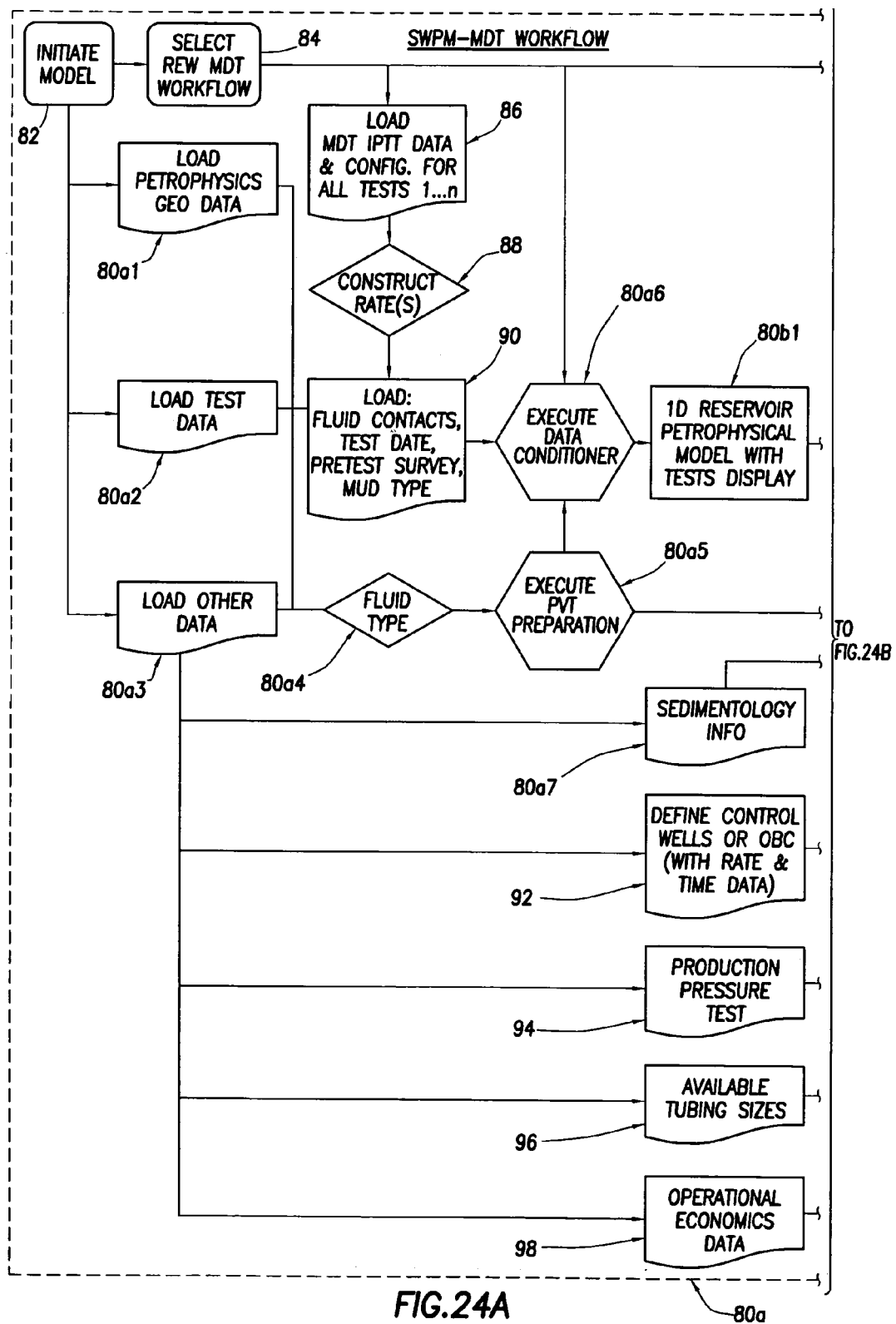
FIGS. 24A-24C illustrate a detailed block diagram of the SWPM-MDT Workflow of FIG. 18.
Figure 24B:
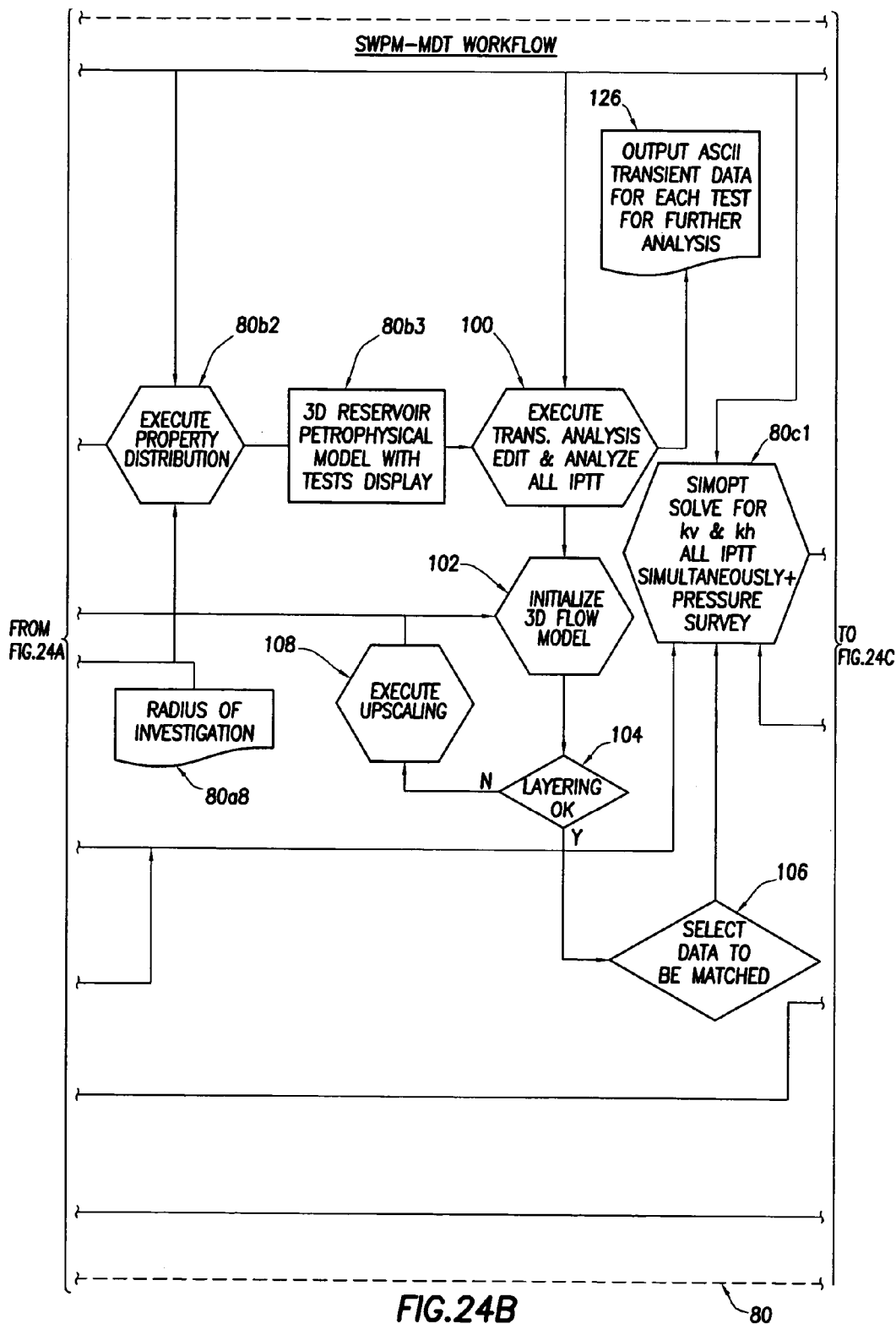
Figure 24C:
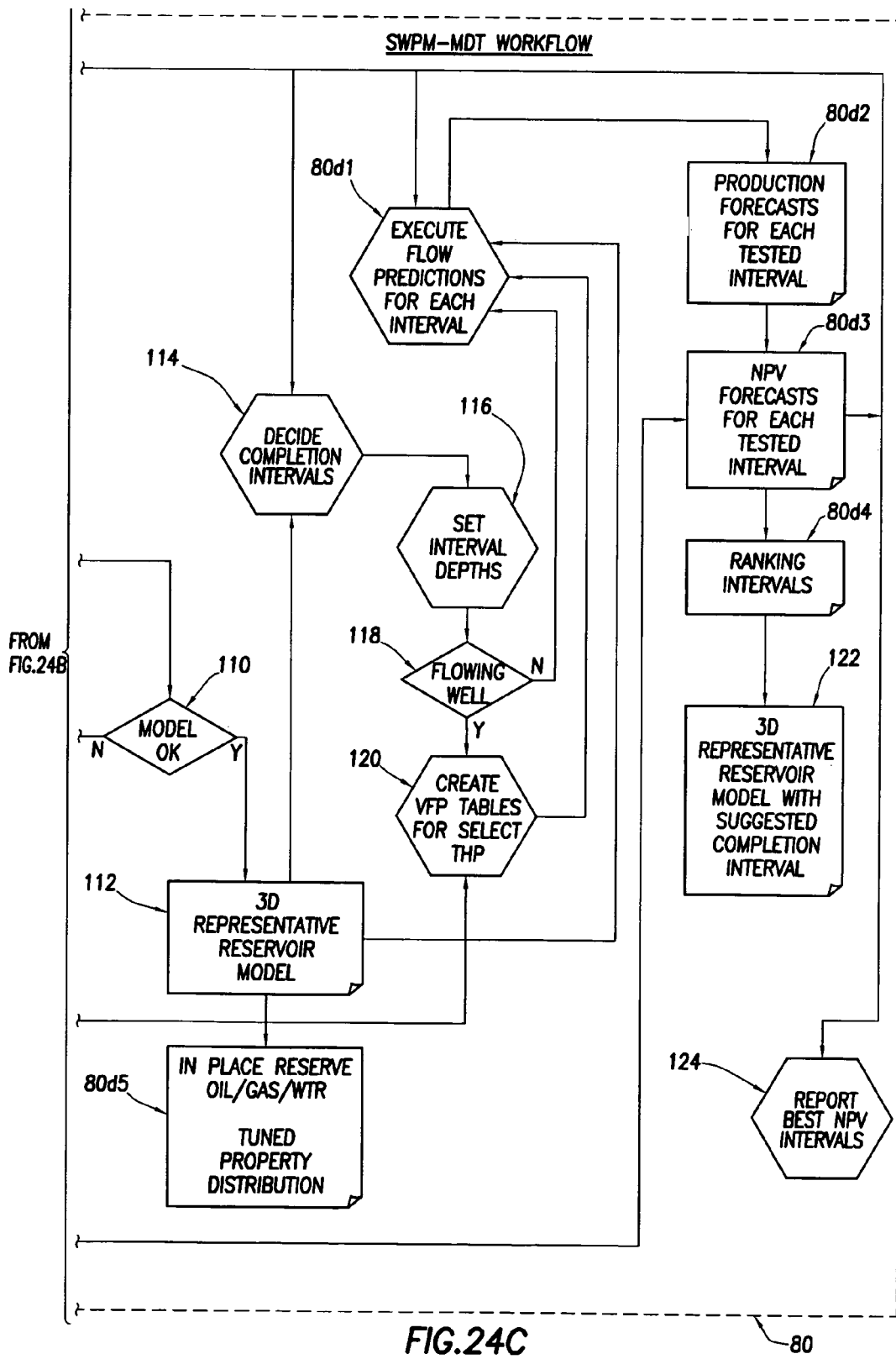

Before discussing 'supporting FIGS. 20, 21, 22, and 23', we will first introduce FIGS. 24A-24C which represents a detailed construction of the SWPM-MDT Workflow 80 of FIG. 18. When FIGS. 24A-24C has been introduced, the 'supporting FIGS. 20, 21, 22, and 23' will be discussed in order to define the blocks of FIGS. 24A-24C which represent the 'Other Data' step 80*a*, the 'Build Model' step 80*b*, the 'Tune Model' step 80*c*, and the 'Predict Reservoir Response' step 80*d* of FIG. 18. A complete functional description of FIGS. 24A-24C will then be discussed.

Referring to FIGS. 24A-24C, a detailed construction of the SWPM-MDT Workflow 80 of FIG. 18 is illustrated. In FIG. 24A, beginning with the 'initiate model' step 82, we start by 'selecting REW MDT Workflow' step 84. The 'select MDT Workflow' step 84 of FIG. 24A refers back to FIG. 10 wherein, in the 'User Objective' step 24, the User would input a user objective which would cause the selection of a Workflow from among a plurality of Workflows stored in the 'custom workflow storage' step 40, and, as a result, a selected Workflow would be generated during the 'selected workflow' step 42 in FIG. 10. As a result of the 'select Workflow' step 84 in FIG. 24A, the steps of the SWPM-MDT Workflow 80 as shown in FIGS. 24A-24C would be ready for execution by the processor 20*a* illustrated in FIG. 1. In FIG. 24, the 'Other Data' 80*a* which is used to build the model during the 'Build Model' step 80*b* would include the following blocks or steps in FIG. 24A: 'Load Petrophysics GEO data' 80*a*1, 'Load Test Data' 80*a*2, 'Load Other Data' 80*a*3, 'Fluid Type' 80*a*4, 'Execute PVT Preparation' 80*a*5, 'Execute Data Conditioner' 80*a*6, 'Sedimentology Information' 80*a*7, and 'Radius of Investigation' 80*a*8. Further data used to build the model (during the 'Build Model' step 80*b*) includes the following blocks in FIG. 24A: 'Load MDT IPTT Data & Config for all tests 1 . . . n' 86, 'Construct Rates' 88, and 'Load fluid contacts, test date, pretest survey, mud type' 90. From the 'Load other Data' 80*a*3 step in FIG. 24A, the following further steps in FIG. 24A are implemented: 'Define control wells or OBC (with rate & time data)' 92, 'Production pressure test' 94, 'Available tubing sizes' 96, and 'Operational Economics data' 98. The 'Build Model' step 80*b* of FIG. 18, which uses the 'Other Data' 80*a* to build or construct a 'simulation model', would include the following blocks or steps in FIGS. 24A-24B: the '1D Reservoir Petrophysical Model with Tests Display' step 80*b*1, the 'Execute Property Distribution' step 80*b*2, and the '3D Reservoir Petrophysical Model with Tests Display' 80*b*3. The 'Tune Model' step 80*c*, which will tune or calibrate the 'simulation model' which is built during the 'Build Model' step 80*b*, includes the following step in FIG. 24B: 'SIMOPT–Solve for kv & kh, All IPTT, simultaneously+pressure survey' step 80*c*1. In FIGS. 24B-24C, the following additional steps will support the 'build model' SIMOPT step 80*c*1 in FIG. 24B: the 'Execute Trans. Analysis Edit & Analyze all IPTT' step 100, the 'Initialize 3D Flow Model' step 102, the 'Layering OK' step 104, the 'Select data to be matched' step 106, the 'Execute Upscaling' step 108, and the 'Model OK?' step 110. After the 'Execute Trans. Analysis Edit & Analyze all IPTT' step 100 is executed, ASCII transient data for each test will be generated via the following step: the 'OUTPUT ASCII transient data for each test for further analysis' step 126. After the 'simulation model' has been 'tuned' or calibrated during the 'Tune Model' step 80*c*, a final tuned and calibrated 'simulation model' will be generated during the following step in FIG. 24C: the '3D Representative Reservoir Model' step 112 in FIG. 24C. Now that a final tuned and calibrated 'simulation model' has been generated in step 24 of FIG. 24C ('3D Representative Reservoir Model'), reservoir response forecasts can now be generated during the 'Predict Reservoir Response' step 80*d* of FIG. 18. In FIG. 24C, the following blocks or steps represent the 'Predict Reservoir Response' step 80*d* of FIG. 18: the 'Execute Flow prediction for each interval' step 80*d*1, the 'Production forecasts for each tested interval' step 80*d*2, the NPV forecasts for each tested interval' step 80*d*3, the 'Ranking intervals' step 80*d*4, and the 'In place reserve Oil/Gas/Wtr Tuned Property Distribution' step 80*d*5. In FIG. 24C, the following additional blocks or steps of FIG. 24 will support the 'Predict Reservoir Response' steps 80*d*1-80*d*5: the 'Decide Completion intervals' step 114, the 'Set interval depths' step 116, the 'Flowing well' step 118, and the 'Create VFP Tables for select THP' step 120. When the 'Predict Reservoir Response' step 80*d* in FIG. 18 (i.e., steps 80*d*1-80*d*4 in FIG. 24) is completed, a 'reservoir response', associated with a 'new oil or gas reservoir', is generated; and that 'reservoir response' is illustrated by the following block or step in FIG. 24C: '3D Representative Reservoir Model with Suggested Completion Interval' 122. In addition to the 'reservoir response' represented by the '3D Representative Reservoir Model with Suggested Completion Interval' step 122, the following 'report' will be generated: the 'REPORT Best NVP Interval' step 124.

Refer now to FIGS. 20, 21, 22, and 23. FIGS. 20-23 clearly define the steps of FIG. 24 which represent the 'Other Data' step 80*a*, the 'Build Model' step 80*b*, the 'Tune Model' step 80*c*, and the 'Predict Reservoir Response' step 80*d* of FIG. 18.

Figure 20:
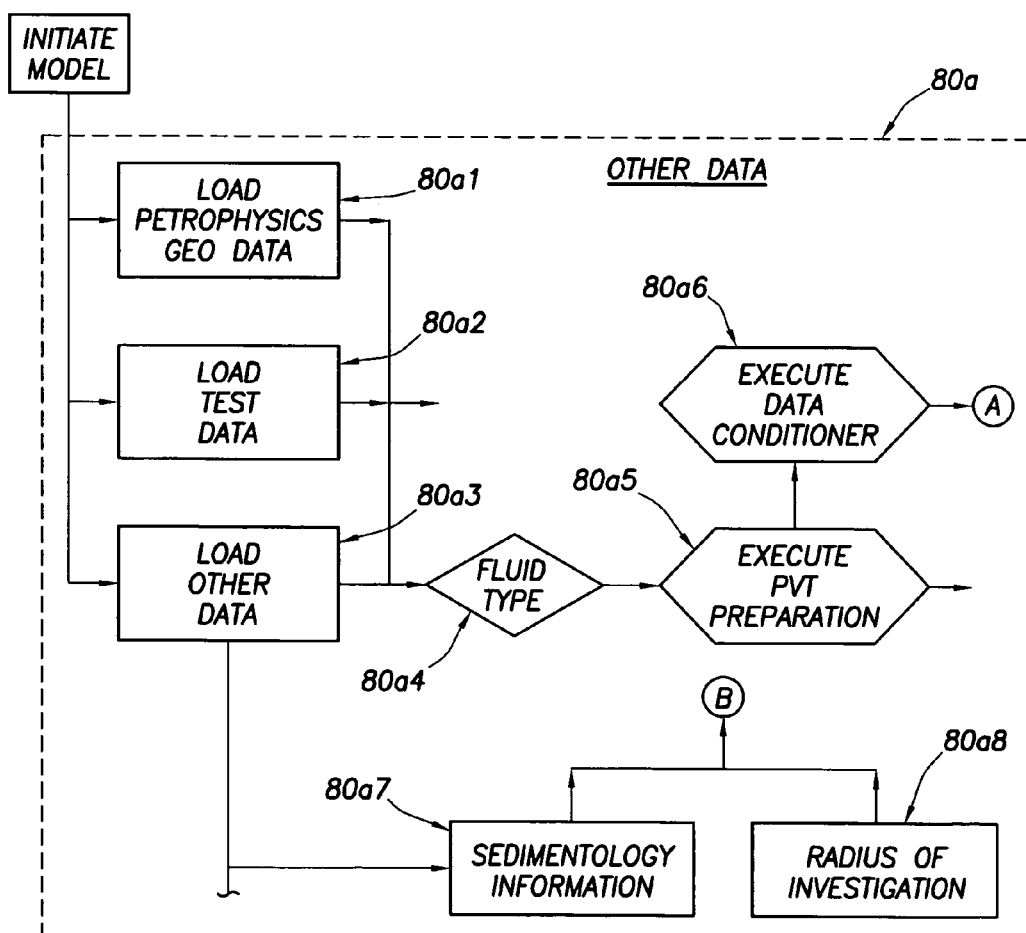
FIG. 20 illustrates a more detailed construction of the 'other data' step of the SWPM-MDT Workflow of FIG. 18, the workflow of FIG. 20 forming a part of the Workflow of FIGS. 24A-24C.

In FIG. 20, the steps of FIGS. 24A-24C which comprise the 'Other Data' step 80*a* of FIG. 18 includes the 'Load Petrophysics GEO Data' step 80*a*1, the 'Load Test Data' step 80*a*2, the 'Load Other Data' step 80*a*3, the 'Fluid Type' step 80*a*4, the 'Execute PVT Preparation' step 80*a*5, the 'Execute Data Conditioner' step 80*a*6, the 'Sedimentology Information' step 80*a*7, and the 'Radius of Investigation' step 80*a*8. These steps will be discussed below in the following functional description of the operation of the present invention.

Figure 21:
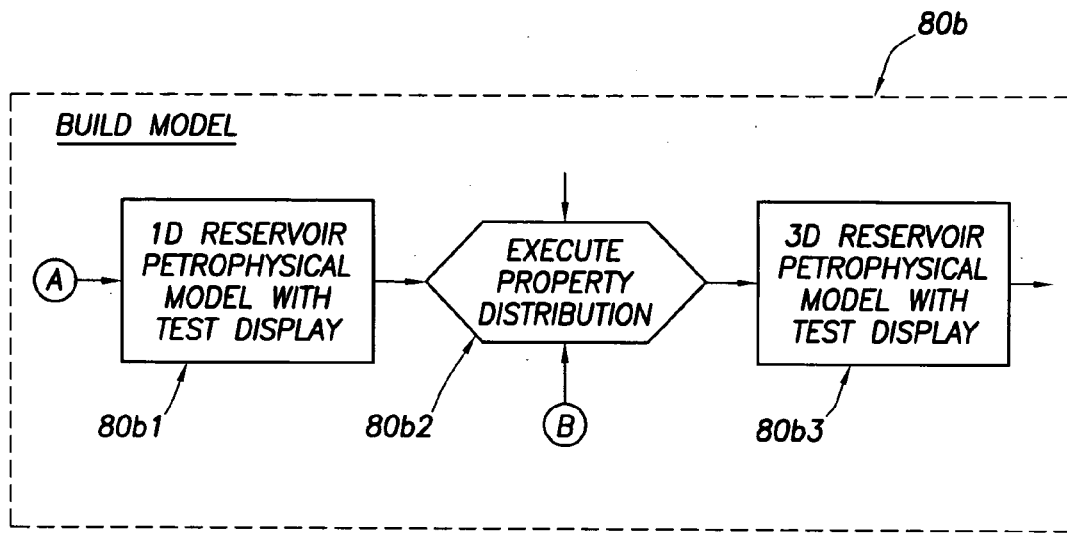
FIG. 21 illustrates a construction of the 'build model' step of the SWPM-MDT Workflow of FIG. 18, the workflow of FIG. 21 forming a part of the Workflow of FIGS. 24A-24C.

In FIG. 21, the steps of FIGS. 24A-24C which comprise the 'Build Model' step 80*b* of FIG. 18 includes the '1D Reservoir Petrophysical Model with Tests Display' step 80*b*1, the 'Execute Property Distribution' step 80*b*2, and the '3D Reservoir Petrophysical Model with Tests Display' step 80*b*3. These steps will be discussed below in the following functional description of the operation of the present invention.

In FIG. 22, the steps of FIGS. 24A-24C which comprise the 'Tune Model' step 80*c* of FIG. 18 includes the 'SIMOPT— Solve for kv & kh–All IPTT Simultaneously+pressure survey' step 80*c*1. The terms 'kv' and 'kh' represent the vertical permeability and the horizontal permeability, respectively. These steps will be discussed below in the following functional description of the operation of the present invention.

In FIG. 23, the steps of FIGS. 24A-24C which comprise the 'Predict Reservoir Response' step 80*d* of FIG. 18 includes the 'EXECUTE Flow Predictions for each Interval' step 80*d*1, the 'Production Forecasts for each Tested Interval' step 80*d*2, the 'NPV Forecasts for each Tested Interval' step 80*d*3, the 'Ranking Intervals' step 80*d*4, and the 'In Place Reserve Oil/Gas/Wtr Tune Property Distribution' step 80*d*5. These steps will be discussed below in the following functional description of the operation of the present invention.

A functional description of the operation of the SWPM-MDT Workflow 80, in the context of a workflow generated in the manner described above by the 'Single Well Predictive Model' 20*c*1 of FIG. 1, such as the 'Specific Workflow 1' of FIG. 13 or the 'Specific Workflow 2' of FIG. 15 or the 'Specific Workflow 3' of FIG. 17, will be set forth in the following paragraphs with reference to FIGS. 1 through 24C, with particular reference to FIGS. 24A-24C.

In FIGS. 16 and 17, recall that a user will input a 'user objective 3' 24*c* and, based on that user objective, a 'specific workflow 3' 42*c* will be retrieved from the 'workflow storage' 40. Software modules 7, 4, 1, 2, and 3 will be retrieved from the Data Conditioner 46 and software modules 18, 17, 14, 15, and 12 will be retrieved from the Decision Tool 50. The result will be the 'Specific Workflow 3' illustrated in FIG. 17. The 'Specific Workflow 3' of FIG. 17 will be executed by the processor 20*a* of the workstation 20 of FIG. 1; and, as a result, the 'Decision Tool Product for User Objective 3' a shown in FIG. 17 will be generated by the processor 20*a* for display or recordation on the 'Recorder or Display Device' 20*b* of the workstation 20 of FIG. 1.

Assume, by way of example, that the 'Specific Workflow 3', as illustrated in FIG. 17, is the 'SWPM-MDT Workflow' 80 shown in FIGS. 18 and 24A-24C. A functional description of the operation of the 'SWPM-MDT Workflow' 80 of FIGS. 18 and 24A-24C will be set forth in the following paragraphs.

Firstly, during a first Modular Dynamic Tester (MDT) test in an Earth formation using a Modular Dynamic Tester (MDT) tool, wherein a dual packer and a dual probe and an observation probe is placed in a wellbore, underground deposits of hydrocarbon (e.g., oil, water) are produced from the formation. The pressure response and rate of production are measured at the probes. At the dual packer interval, draw down and build up are measured and, at the probe, a pressure pulse is measured. We analyze (in software) a first set of received data in order to determine the Vertical Permeability (Kv) and the Horizontal Permeability (Kh) and other properties of each of the layers in the formation. At this point, we move the MDT tool in the wellbore, including the dual probe and the observation probe, for the purpose of performing a second MDT test. We analyze a second set of received data in order to determine the Vertical Permeability (Kv) and the Horizontal Permeability (Kh) and other properties of each of the layers in the formation. However, the tool settings could be overlapping. That is, during the first MDT test, we tested a first zone in the formation thereby determining a first Vertical Permeability (Kv1) and a first Horizontal Permeability (Kh1), and, during the second MDT test, we tested a second zone in the formation thereby determining a second Vertical Permeability (Kv2) and a second Horizontal Permeability (Kh2). However, the first zone and the second zone could be overlapping. As a result, during the analysis of the second MDT test, the properties of the first MDT test are changed. This is not good since one cannot report, for the same layer in the formation, different properties. At this point, we go back to perform the first MDT test again and analyze the received again; then, go back to perform the second MDT test again and analyze the received data once again. This process is a very time consuming process; that is, the iterations in the software can be a very time consuming iterative process. However, in order to solve this problem, the SWPM-MDT Workflow 80 software will analyze all of the multiple MDT test data simultaneously; that is, the first set of received data that is received during the first MDT test is analyzed, by the SWPM-MDT Workflow 80 software, simultaneously with the analysis of second set of received data that is received during the second MDT test thereby producing a single set of consistent results. The simultaneous analysis of the first set of received data (obtained during the first MDT test) and the second set of received data (obtained during the second MDT test) by the SWPM-MDT Workflow 80 is very beneficial when the aforementioned simultaneous analysis process is compared to the prior time consuming iterative process. Secondly, when the MDT tests are performed, the casing or formation is perforated and a well test is performed in the formation penetrated by the wellbore thereby producing well test data. It would be desirable to analyze the well test data in addition to the MDT test data. The SWPM-MDT Workflow 80 software can analyze all of the multiple MDT test data simultaneously and, in addition, the SWPM-MDT Workflow 80 will also analyze all of the well test data simultaneously. That is, the SWPM-MDT Workflow 80 can simultaneously analyze: (1) all the multiple MDT test data, and (2) all of the well test data, at the same time, in order to obtain an even better description of the formation penetrated by the wellbore. Thirdly, with respect to a reservoir that has layers that have been producing, pressure points in the wellbore wall, where the probes were placed, indicate that the reservoir has been depleted. If a well has been producing for several years, one can observe (among the various zones throughout the various layers in the wellbore) a 'differential pressure depletion'. That is, the different zones in the wellbore will exhibit different pressures, and, as a result, the data obtained from these different zones must be analyzed by a workstation software. The SWPM-MDT Workflow 80 will also analyze the pressure depletion among the various zones throughout the various layers in the wellbore, and the SWPM-MDT Workflow 80 will try to match the pressure depletion (at each of the pressure points) associated with each of the layers in the formation penetrated by the wellbore. Fourth, the SWPM-MDT Workflow 80 can also analyze other things; that is, if we place an 'invasion section' before the 'history matching' portion of the SWPM-MDT Workflow 80, we can use the SWPM-MDT Workflow 80 to study or analyze data acquired during sampling (i.e., how much oil based mud we have).

In FIGS. 24A-24C, the functional description of the operation of the SWPM-MDT Workflow 80 of FIGS. 24A-24C begins by initiating the model, step 82 in FIG. 24A. Then, indicate that we will be performing or executing the SWPM-MDT Workflow 80 by performing the 'Select REW MDT Workflow' step 84 in FIG. 24A. At this point, we must construct our conceptual model. In FIG. 24A, in steps 80a1, 80a2, and 80a3 (which relates to the Data Conditioning 46 of FIG. 10), we will be reading our layering, our porosities, and our saturations from the open hole logs. Therefore, in the 'Load Petrophysics GEO Data' step 80a1, we load our petrophysical data, the petrophysical data being layer thicknesses that we have observed. In addition, in the 'Load Test Data' step 80a2 and the 'Load Other Data' step 80a3, we load our initial estimates of Horizontal Permeability (Kh) and Vertical Permeability (Kh) [since a 'history matching' iterative process will take place later in the Workflow 80, and initial estimates of Kv and Kh are necessary to get the iterative process started]. In step 86 of the SWPM-MDT Workflow 80 of FIG. 24A, entitled 'Load MDT IPTT Data & config for all tests 1 . . . n', this step 86 will load Modular Dynamic Tester (MDT) Interval Pressure Transient Test (IPTT) data. These are the tests mentioned previously involving packers and probes wherein the pressures at the packers and the pressures at the probes are measured. As a result, the term 'config' [in 'Load MDT IPTT Data & config for all tests 1 . . . n'] refers to the number of packers and the number of probes; and recall that data is acquired in connection with each of the packers and each of the probes. Therefore, in this step 86 ('Load MDT IPTT Data & config for all tests 1 . . . n'), we are 'reading-in' all of the data that has been acquired in the reservoir field for all of the multiple tests. In step 88 of FIG. 24A (entitled 'Construct Rate(s)'), we construct flowrate information. In step 90 of FIG. 24A (entitled 'Load: fluid contacts, test date, pretest survey, mud type), we load the fluid contacts, the test date, the pretest survey, the mud type. Here, we are reading 'pressure versus depth plots'. In step 80a3 of FIG. 24A (entitled 'Load Other Data'), we also load 'production pressure tests', as indicated in step 94 of FIG. 24A (involving well tests or a drill stem test). In step 80a4 (entitled 'Fluid Type'), we must define some sort of fluid or fluid type; for example, is this an oil reservoir, or is this a gas reservoir. In this step 80a4, we must define what we are simulating (e.g., an oil or gas reservoir). In step 80a6 (entitled 'Execute Data Conditioner'), now that all of the aforementioned data that has been loaded, we 'execute data conditioner'. When we 'execute data conditioner', this means that we have all of the layers set up, all the saturations are known, the thicknesses of the layers are known, and the initial estimates of permeability are known. In step 80a5 (entitled 'Execute PVT Preparation'), since we have specified the fluid type (in step 80a4), we also execute a PVT and assign viscosities, gas oil ratios. In FIG. 24A, among all of the steps of the Workflow 80 mentioned thus far, the one step that is especially useful to the SWPM-MDT Workflow 80 is step 86 entitled 'Load MDT IPTT Data & config for all tests 1 . . . n' where we load Modular Dynamic Tester (MDT) Interval Pressure Transient Test (IPTT) data for all tests. In step 80b1 (entitled '1D Reservoir Petrophysical Model with Tests Display'), the following are known: we have a wellbore sketch and, at the wellbore, we have all the layers of the formation, we have initial estimates of permeabilites, porosities, saturations, and thicknesses. In step 80b2 (entitled 'Execute Property Distribution'), we must now 'populate our reservoir model' by distributing reservoir properties in 3D in order to generate a '3D' Petrophysical Model in step 80b3. Therefore, in step 80b2, in order to 'execute property distribution' and 'populate our reservoir model', two other inputs are required: (1) step 80a7 (entitled 'Sedimentology Information'), and (2) step 80a8 (entitled 'Radius of Investigation'). The 'Radius of Investigation' provides information pertaining to the size of the model (i.e. how big is your model?). In response to step 80b1 which generates a '1D Reservoir Petrophysical Model' and step 80b2 which will 'Execute Property Distribution' with the assistance of the 'Sedimentology Information' from step 80a7 and the 'Radius of Investigation' from step 80a8, in step 80b3 of FIG. 24B, we have now generated a '3D Reservoir Petrophysical Model with Tests Display'. In step 80b3 entitled '3D Reservoir Petrophysical Model with Tests Display', we have now generated our '3D Reservoir Model'. In step 100 (entitled 'Execute Trans. Analysis Edit and Analyze all IPTT'), we select which transients to analyze, and, in step 126 ('Output ASCII Transient Data for each test for further analysis'), we output ASCII transient data for each test for further analysis. At this point, fluid properties have been assigned, all MDT test data has been loaded, and well test data has been loaded. At this point, we must now start running this '3D Reservoir Model' which is now represented by step 80b3. In order to run the '3D Reservoir Model', step 100 of FIG. 24B (entitled 'Execute Trans. Analysis Edit & Analyze all IPTT') is executed. Then, in step 102 (entitled 'Initialize 3D Flow Model'), it is necessary to initialize the '3D Reservoir Model'. In step 104 (entitled 'Layering OK'), we must ensure that all the layers and the reservoir description is acceptable. Then, in step 108 (entitled 'Execute Upscaling'), if necessary, we go upscaling in step 108. Upscaling is necessary when some of the layers in the '3D Reservoir Model' are too 'fine'; in which case, it would be necessary to combine some of the layers into thicker layers. In step 106 (entitled 'Select Data to be matched'), we select data to be 'history matched'; that is, in step 106, we will determine if the 3D Reservoir Model will 'honor' the selected data. For example, previously known MDT test data and/or well test data may be selected for the purpose of performing a 'history match' to determine if the 3D Reservoir Model will honor the selected data in the manner discussed above with reference to FIG. 18 (i.e., recall that 'previously known measured or observed data', which corresponds to a 'previously known reservoir response', will interrogate the model and, responsive thereto, the model will generate an 'output reservoir response' which is then compared with the 'previously known reservoir response'; if the 'output reservoir response' is not substantially the same as 'previously known reservoir response', the model is 'tuned' or calibrated and the process repeats until the 'output reservoir response' is substantially the same as 'previously known reservoir response'). Recall, from FIG. 18, that the 'previously known measured or observed data' includes: the Modular Dynamic Tester (MDT) Transient Tests 86, the Well Test Data 94, and the Pressure Gradients 90. In step 80c1 (entitled 'SIMOPT–solve for Kv and Kh–all IPTT simultaneously+ pressure survey'), this step 80c1 will simultaneously and iteratively solve for 'Horizontal Permeability (Kh)' and 'Vertical Permeability (Kh)' in connection with all Interval Pressure Transient Tests (IPTT) plus, in addition, the 'pressure survey', which represents the production pressure tests and, in addition, the 'gradient data' (i.e., pressure vs. depth). The 'SIMOPT' step 80c1 will iteratively solve for Kv and Kh in the SWPM-MDT Workflow 80 of FIGS. 24A-24C. In step 110 (entitled 'Model OK?'), this is a test for convergence; that is, when convergence occurs, we have good data (i.e., the 'output reservoir response' is substantially the same as 'previously known reservoir response'). If the output of step 110 ('Model OK?') is 'yes', the 'output reservoir response' is substantially the same as 'previously known reservoir response' and, as a result, there will be no additional iterations. However, if the output of step 110 ('Model OK?') is 'no', the 'output reservoir response' is not substantially the same as 'previously known reservoir response' and, as a result, the 'SIMOPT' step 80c1 must be repeated for the purpose of solving for a 'new value of Kv and Kh'. The 3D Reservoir Model 80b3 is changed or tuned or calibrated, the process of tuning or calibrating involving changing the 'old value of Kv and Kh' in the 3D reservoir model to the 'new value of Kv and Kh', and then repeating the step 110 ('Model OK?') by asking if the 3D reservoir model is OK. The 'SIMOPT' step 80c1 is a 'history matching' step which attempts to minimize the error between observed data and your model properties by adjusting the Vertical Permeability (Kv) and Horizontal Permeability (Kh) of the 3D reservoir petrophysical model 80b3 in order to perform a subsequent MDT analysis. In the 'SIMOPT' step 80c1, what we are trying to 'history match' is: Production Well Tests (in step 94), several MDT tests, and Pressure vs. Depth plots. However, in addition, in step 106 ('Select Data to be Matched'), if we have modeled an 'invasion' (of mud into the wellbore wall) before running our optimization (in the 'SIMOPT' step 80c1), we can also match our 'oil based mud contamination' with time. In fact, in step 106 ('Select Data to be Matched'), we can define any data that we want to be 'history matched'. When the 3D reservoir model 80b3 is 'OK' (i.e., the output of the 'Model OK' step 110 is 'yes'), a 'tuned or calibrated 3D reservoir model' is the result, the 'tuned or calibrated 3D reservoir model' being represented by step 112 of FIG. 24 (entitled '3D Representative Reservoir Model'). In step 112 (the '3D Representative Reservoir Model'), we have produced a reservoir model which honors all of the multiple MDT tests, well tests, pressure gradients, etc. At this point, we are ready to do further work. The further work involves generating 'flow predictions'. In FIG. 24C, referring to step 80d1, recalling that we have 'Available Tubing Sizes' in step 96, 'Operational Economics Data' in step 98, and a '3D Representative Reservoir Model' in step 112, at this point, we are ready to generate the 'flow predictions' by executing step 80d1 (entitled 'EXECUTE flow predictions for each interval'). For example, we can now generate certain scenarios. That is, when perforating a wellbore, we can generate 'Production Forecasts' for each tested interval, step 80d2 in FIG. 24C. Since we have economic data ('Operational Economics Data' in step 98), we can generate Net Present Value (NPV) for each tested interval, step 80d3 in FIG. 24. In step 80d4 (entitled 'Ranking Intervals'), if we select 'several intervals' in a formation before perforating, we can rank the intervals in the 'Ranking Intervals' step 80d4 [e.g., the 'ranking' may indicate that a first interval is the best Net Present Value (NPV) interval]. In step 124, a 'report' can be generated for reporting the best NPV interval. In step 122 (entitled '3D Representative Reservoir Model with Suggested Completion Interval'), although the MDT analysis ends at step 112 ('3D Representative Reservoir Model'), a 'final outcome' is generated at the end of step 122 because, at the end of step 122, we now have a 3D Representative Reservoir Model with Suggested Completion Intervals. As a final result, we have performed a 'simultaneous analysis' of all of the multiple Modular Dynamic Tester (MDT) Transient Test data (see step 86 entitled 'Load MDT IPTT Data . . . '), where the 'simultaneously analysis' of the 'MDT Transient Test data' has never been heretofore achieved or accomplished. The aforementioned 'simultaneous analysis' of all of the multiple MDT Transient Test data saves a substantial amount of worktime (e.g., about 10 or 15 days of worktime). Therefore, the SWPM-MDT Workflow 80 of FIG. 24 will 'honor' all of the 'MDT Transient Test data' (see step 86: 'Load MDT IPTT Data . . . ') during the aforementioned 'simultaneous analysis' (where the term 'honor' means that the 'MDT Transient Test Data' would comprise part of the 'previously known measured or observed data'). In addition, the SWPM-MDT Workflow 80 of FIG. 24 will 'honor' the 'many well tests' (see step 94: 'Production Pressure Tests') during the aforementioned 'simultaneous analysis' (where the term 'honor' means that the 'many well tests' would comprise part of the 'previously known measured or observed data'). In addition, the SWPM-MDT Workflow 80 of FIG. 24 will 'honor' a 'pressure survey' involving 'pressure vs. depth' data (see step 90: 'Load fluid contacts, test data, pressure survey, mud type') during the aforementioned 'simultaneous analysis' (where the term 'honor' means that the 'pressure survey' would comprise part of the 'previously known measured or observed data'). All of the above referenced data has been honored, by the SWPM-MDT Workflow 80, simultaneously and consistently because step 112 ('3D Representative Reservoir Model') represents a '3D reservoir model' that will simultaneously and consistently honor all of the following data: (1) MDT Test data (loaded in step 86), (2) pressure gradient 'pressure vs. depth' data (loaded in step 90), and (3) Drill Stem Test or well test data (loaded in step 94).

Refer now to FIGS. 25 through 49 which will be referenced in the following paragraphs.

Interval Pressure Transient Testing (IPTT) along the wellbore using multi-probe or packer-probe formation testers is increasingly used as a means of formation evaluation. These tests usually have durations in the order of hours and they investigate volumes within "tens of feet" radially and vertically along the well. Multiple transient tests with overlapping volumes of influence are common in a well. Currently, each of these transient tests is analyzed independent of each other using mainly analytical multi-layer models. When their volumes of influence overlap, it then becomes an iterative procedure. The whole interpretation process then takes considerable time and effort. Analysis of interval pressure transient tests using numerical simulation has also been pursued. Numerical modeling can be well suited for complex geometries (i.e. fractures intersecting packer zones) and multiphase flow but are usually more complex to set-up.

Following Interval Pressure Transient Testing (IPTT), the well may later be Drill Stem Tested (DST) and/or may have an Extended Well Test (EWT). Combined interpretation of interval pressures transient tests and conventional well tests is not common and poses another difficulty since conventional tests have extended radius of investigation. The reservoir model has to honor the increased vertical resolution near the wellbore defined by IPTT's and deeper lateral information inherent in long-term transient well tests.

It is also common to acquire 'pressure vs depth' data in open and cased hole with formation testers. In addition, pressure vs. depth surveys may come from other formation testers (e.g., XPT, FPWD, RFT, SRFT, and future advanced formation testers). In developed reservoirs, such data gives valuable information on differential depletion, compartmentalization and vertical communication. Incorporation of 'pressure vs depth' profiles within the analysis imposes a third level of difficulty (and scale) since pressure variations along a well usually reflects depletion of various zones combined with wider scale connectivity information.

In this specification, a Single Well Predictive Model (SWPM) is described where multiple IPTT's, conventional well tests (DST, EWT), and pressure vs depth profiles are analyzed simultaneously using a numerical model. A starting point of the single well model is the interpretation results originating from a reservoir petrophysics analysis along the borehole. This is reduced to a series of flow units with average petrophysical properties. These flow units with average properties are used to populate a numerical three-dimensional model. This starting model is updated (i.e., tuned and calibrated) to simultaneously honor all transient (IPTT, DST, EWT) data as well as pressure vs depth profiles. Our aim is to construct a single-well reservoir model which reflects and honors all measured data at different scales. The analysis method proposed will reduce the time and effort required to analyze multiple IPTT's and provides a means of integrating long term tests and pressure vs depth.

Interval Pressure Transient Testing

Figure 32:
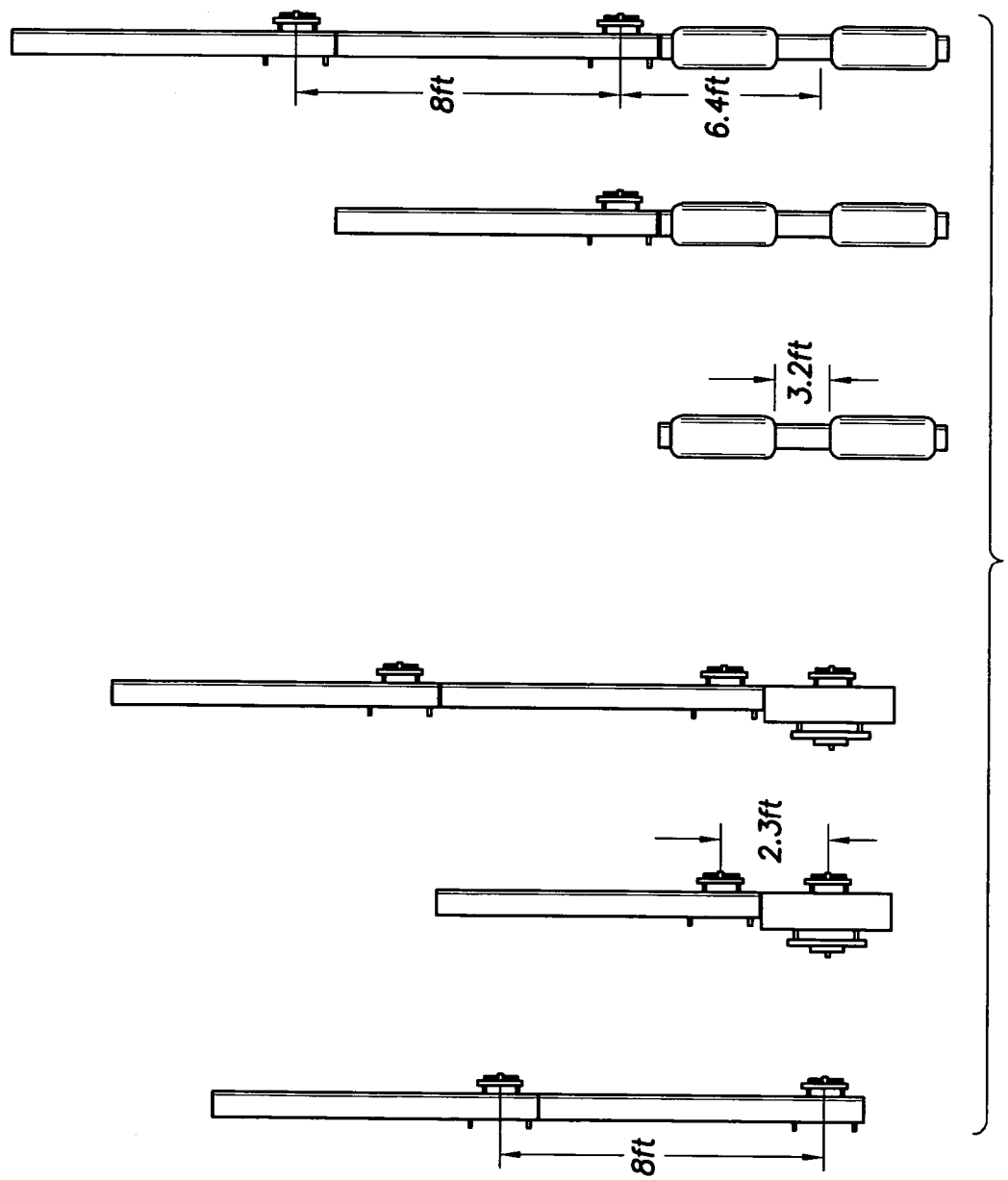
FIG. 32 illustrates Possible MDT* multi-probe and packer probe configurations for interval pressure transient testing.

FIG. 32 shows possible MDT multi-probe and packer-probe configurations used for Interval Pressure Transient Testing. The test string is positioned at the interval to be tested and flow is induced through the dual packer or from the dual probe sink probe while vertically displaced observation probes monitor the pressure response. The acquired flow and buildup transient data is used to obtain and analyze individual layer horizontal and vertical permeabilities. This testing technique yields formation properties well beyond the invaded zone, usually within "tens of feet" away from the wellbore in horizontal and vertical directions.

Integrated Well Model—Data Input and Conditioning

The workflow starts with the analysis results of open hole petrophysical logs from which hydraulic layers, porosity, net-to-gross ratio, log-derived horizontal and vertical permeabilities, and saturations are obtained. The petrophysical results can be conditioned to honor other measurements such as core plugs, or formation tester spot pretest mobilities. Multiphase transport properties are also computed and conditioned using MDT sampling data.

Figure 33:
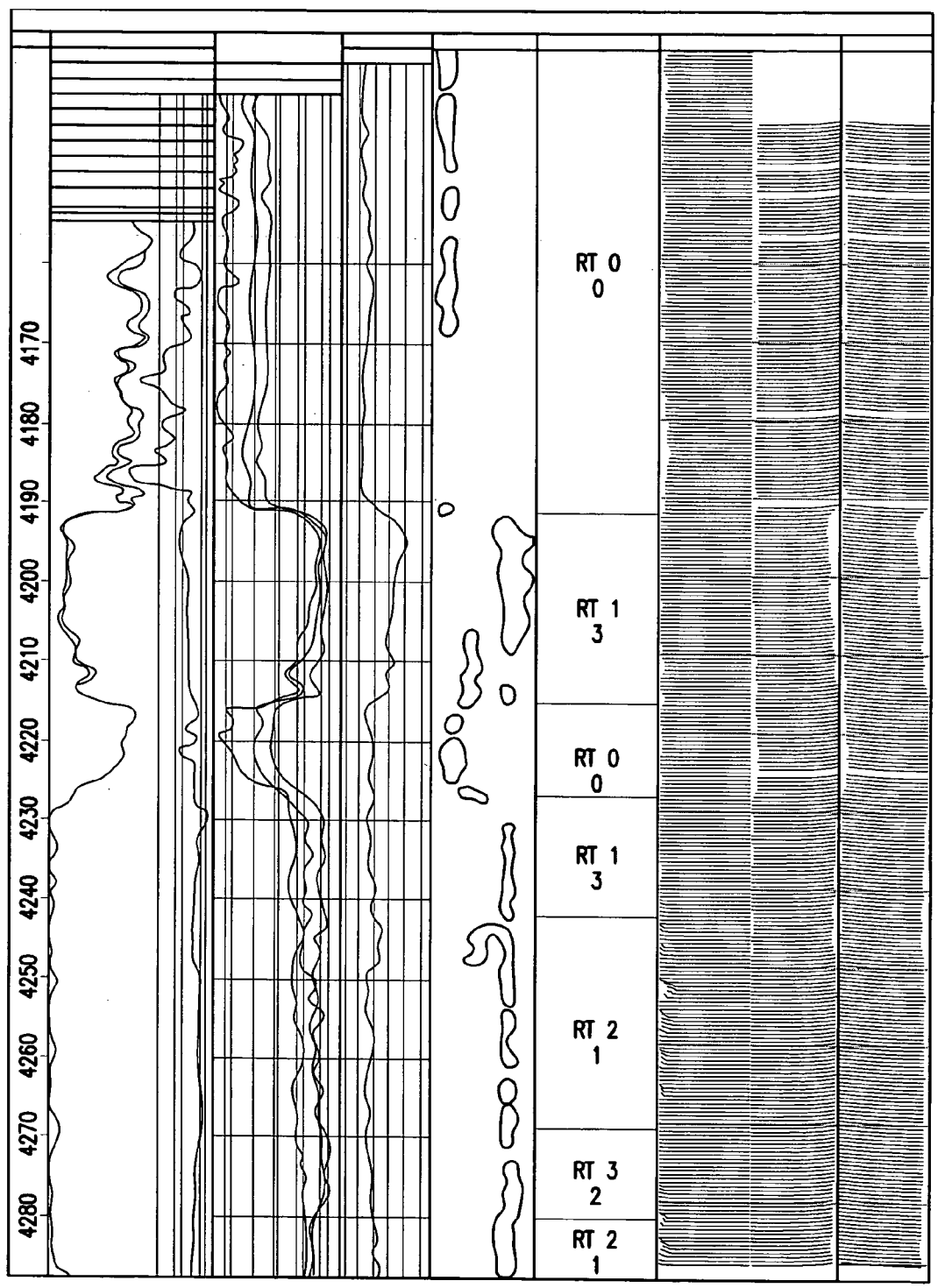
FIG. 33 illustrates Data conditioning results for one-dimensional model; Automatic identification of rock types (possible simulation layers) and assignment of layer properties are completed; Multiphase functions can be derived and tuned using MDT sampling data.

FIG. 33 shows an example, illustrating the results from the data conditioning phase. The user can override automatic layer and property definitions, assigning layers and properties manually, also incorporating formation images. Active and surrounding well's production/injection data are also input. Data errors for different dynamic data types are defined (rates, pressures). These steps are performed with relative ease and automation, which are traditionally quite time consuming and prerequisite for transient analysis, as well as studies involving single or multiple wells. Note that several of the layer petrophysical and transport properties are treated as the "initial guess" for further analysis. At the end of this step, a one-dimensional reservoir model along the wellbore is obtained with increased efficiency.

Three-Dimensional Property Distribution

A three-dimensional model ready for numerical simulation is the next objective. If the analysis of Interval Pressure Transient Tests (IPTT) is the only goal, then a layer-cake model is likely to be the common choice and will usually be sufficient. However, if extended well tests and pressure vs depth profiles are to be included in the analysis, one needs to consider different scales within the reservoir. The workflow makes use of geological interpretation and honors the depositional environment and structure maps while constructing the three-dimensional model. A geostatistical model can be used to populate a regular geocellular scale grid, which can later be upscaled to simulation grid. When combining multi-scale transient data for integrated analysis, the near wellbore region defined by the radius of investigation of IPTT's is treated as a different region then the rest of the reservoir. The vertical resolution near the wellbore region is honored and the properties of this nearby region are changed to match the IPTT response. To match long term well tests, the properties of the bulk of the system are considered, within the constraints of the geological setting.

Gridding and Numerical Model

Our reservoir model is a commercial compositional numerical simulator. (e.g., ECLIPSE-300 which is owned by Schlumberger Technology Corporation of Houston, Tex.). This enables us to model complex flow geometries, multiphase flow, complex flux boundary conditions, fluid compositional gradients, as well as oil-based mud filtrate cleanup. For this study, a vertical well was considered and a radial gridding scheme was used. Grid generation is automatic and honors all IPTT configurations utilized in the well. This makes the system accessible to non-simulation experts. Note that for horizontal and deviated wells, irregular gridding schemes are usually necessary.

Optimization and Numerical Simulation

History matching is a problem of minimization of an objective function. The gradient method has been successfully applied previously and was also utilized in this study. The SWPM-MDT Workflow 80 will: (1) 'honor' all Interval Pressure Transient Tests (IPTT), Drill Stem well tests (DST), and pressure vs depth data, in their real time line, and (2) iterate on selected parameters to history-match all observed data simultaneously. Note that the observed data can also include, in addition to pressure, other quantities such as flow rates and phase ratios (e.g. Gas Oil Ratio (GOR) or Condensate Gas Ratio (CGR), water-cut, Gas Fraction, Produced fluid: density, viscosity, composition, oil based mud filtrate components, bubble or dew point, asphaltene onset pressure and fluid compositional variations with depth). The simulator can also be run using the pressure from one of the probes or packer to match the response at the other observation probes without utilizing flow rates.

A 'history matching' application was used for optimization. The software uses a refinement of the Levenberg-Marquardt algorithm. The gradients required for the optimization are obtained concurrently from the reservoir simulator, significantly increasing computational efficiency. The objective function, f, which is minimized, is a modified form of the commonly used sum-of-squares. The general form of this equation is given by $$f = \frac{\alpha}{2} r^T r + \frac{\beta}{2} s^T C_s^{-1} s + \gamma \cdot f_{prior} \quad (1)$$

Here, the three terms in the right hand side refer to production data, survey data and prior information. In our work, the survey data term is not relevant; f prior incorporates a-priori knowledge of the reservoir and r is a vector of residuals for the observed pressure data. Each element, ri, in the residual vector is defined as $$r_i = w_d w_i \frac{(o_i - c_i)}{\sigma_d} \quad (2)$$

where, d references one set of observed data of a given type, i references an individual data point for the dth item of observed data, $o_i$ and $c_i$ are the observed and simulated values respectively, $\sigma_d$ is the measurement standard deviation for the dth dataset, $w_d$ is the overall weighting for the dth dataset and $w_i$ is a weighting factor for the ith data point of the dth data set.

From equation 2, we can see that the confidence given to each data type as a whole may be varied, in addition to the weight attached to a given data point. This way, the difference in scales with respect to different data types, viz., probe pressure, packer pressure, conventional test pressure can be reconciled. The overall data-type measurement error is accounted for by the term s, which is the standard deviation of the gauge measurement error. The prior term is essentially a penalty term, which makes it difficult for the solution to move away from the estimated mean.

A modified form of Levenberg-Marquardt algorithm is used to optimize the objective function given in equation 1. The optimization scheme requires first and second derivatives of the objective function with respect to the parameters (permeability, skin, etc). Using the Gauss-Newton approximation, we can ignore the second derivative term. This means that the problem can be solved by only considering the first derivative of the simulated quantity with respect to the parameters. These derivatives are obtained from our reservoir simulator at the same time as the simulated quantities themselves in a single run, thus saving a considerable amount of time. Note that estimating the weights and the data type error standard deviation is often very difficult. Our method can easily be adapted to take advantage of alternate schemes.

Figure 34:
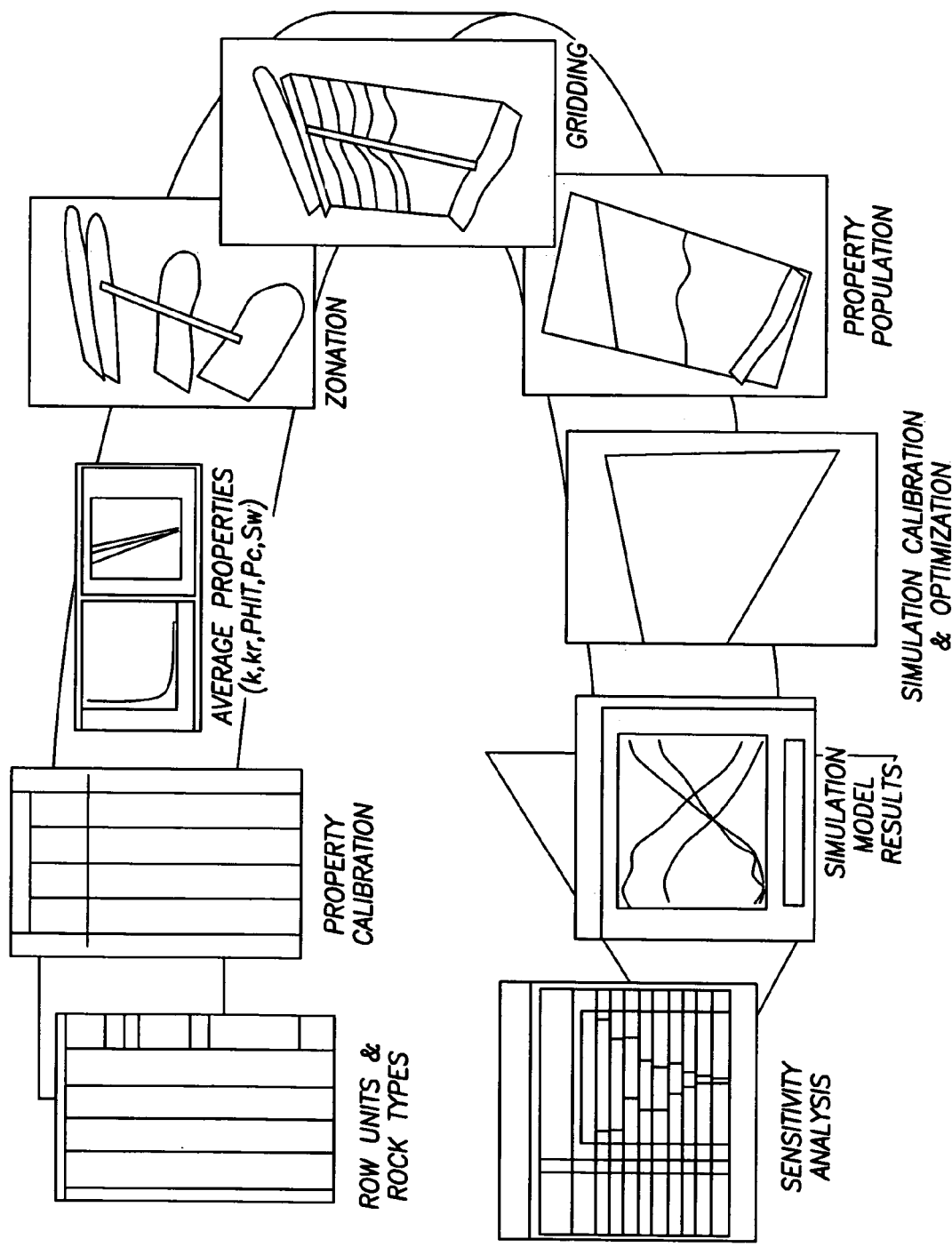
FIG. 34 illustrates the single well predictive modeling workflow; once the simulation model honors the dynamic data (optimization), it can be used to compare different production and/or completion scenarios.
Figure 35:
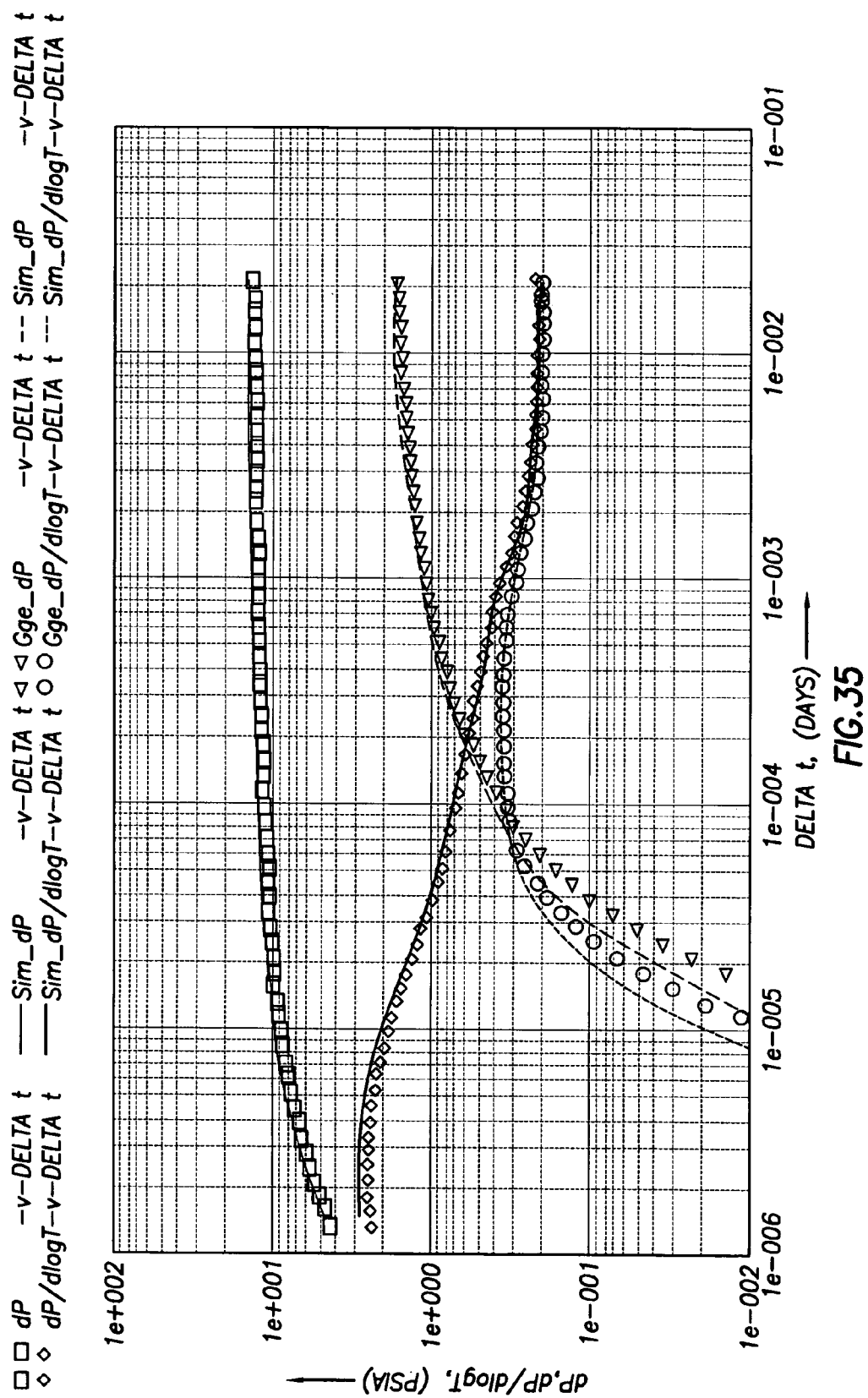
FIG. 35 illustrates Log-log plot of IPTT test 1; Discrete points are from analytical model; Continuous lines are from numerical model.
Figure 36:
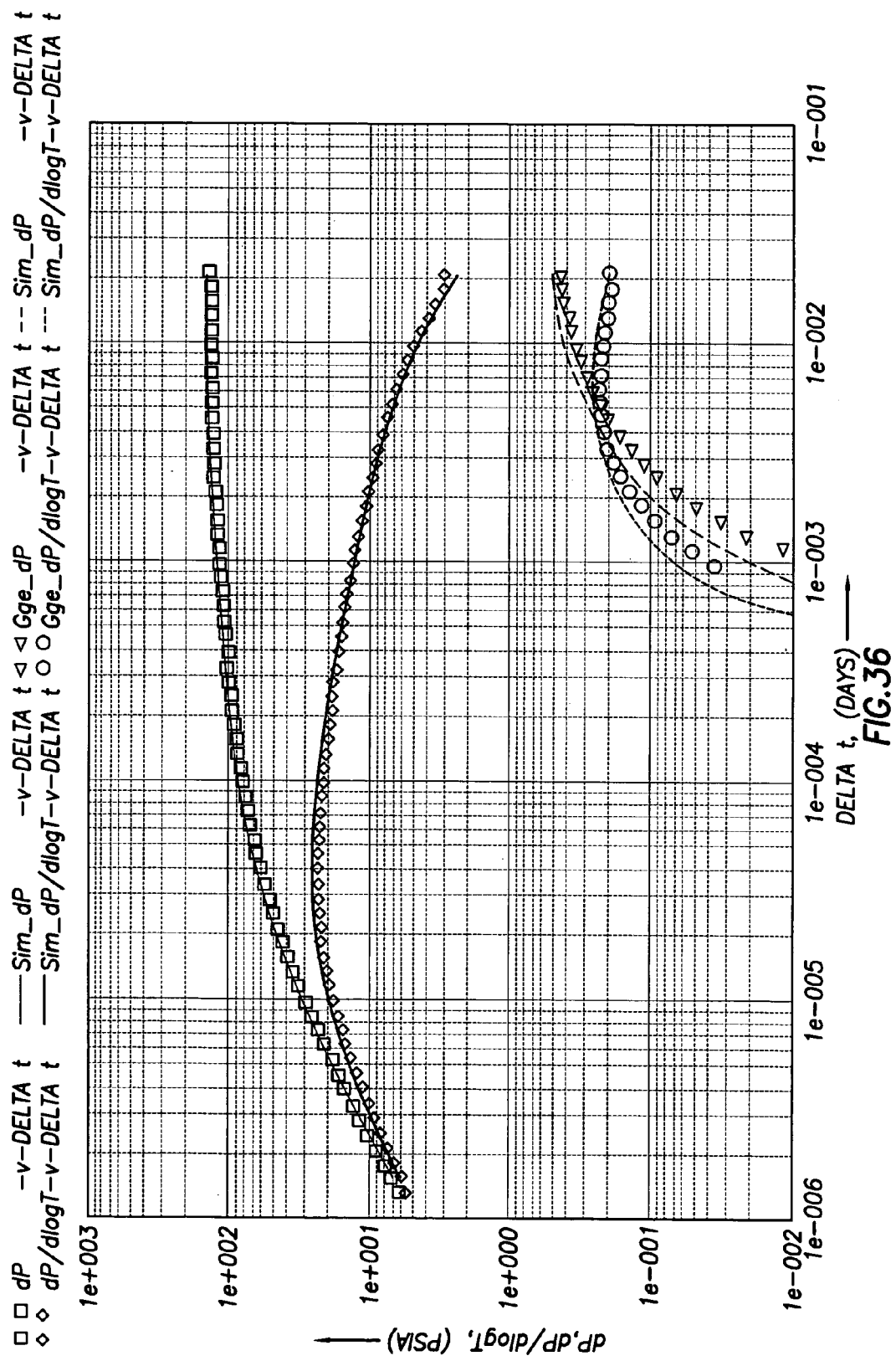
FIG. 36 illustrates Log-log plot of IPTT test 2; Discrete points are from analytical model; Continuous lines are from numerical model.

FIG. 34 shows the whole single well modeling workflow, starting with data conditioning, followed by zonation, gridding and property population. The IPTT and well test analysis phase is covered within the optimization phase. The results can be graphically visualized. Once the model honors dynamic data, it can be used for 'what if' scenarios studying different completions options and production scenarios.

SYNTHETIC EXAMPLE

To illustrate the concept and test the methodology, a simulated case was studied. Two overlapping IPTT tests were first simulated using analytical models which include real gauge characteristics such as resolution and accuracy. The reservoir top was at 10000 f which has two layers as specified in Table-1 of FIG. 25. An undersaturated oil reservoir was considered with fluid properties summarized in Table-2 of FIG. 26. Two MDT interval pressure transient tests using dual packer-single probe combination were considered. During the first IPTT, both the dual packer and probe were placed in the first layer. Packer mid point was at 10035 ft. During the second IPTT, the dual packer was in Layer 2 and single probe was set in Layer 1. The dual packer mid point was at 10045 ft. For both tests, the probe was 6.4 ft above the dual packer as shown in FIG. 32. Following the MDT-IPTT's, a DST was also analytically modeled. This is a much longer duration well test. A 20 ft interval at the middle of Layer 1 was perforated. A drawdown and a buildup sequence were simulated. The skin factor for all tests was considered as zero. Note that the skin factor can actually change from test to test, since the tested interval is changing along the wellbore.

Figure 37:
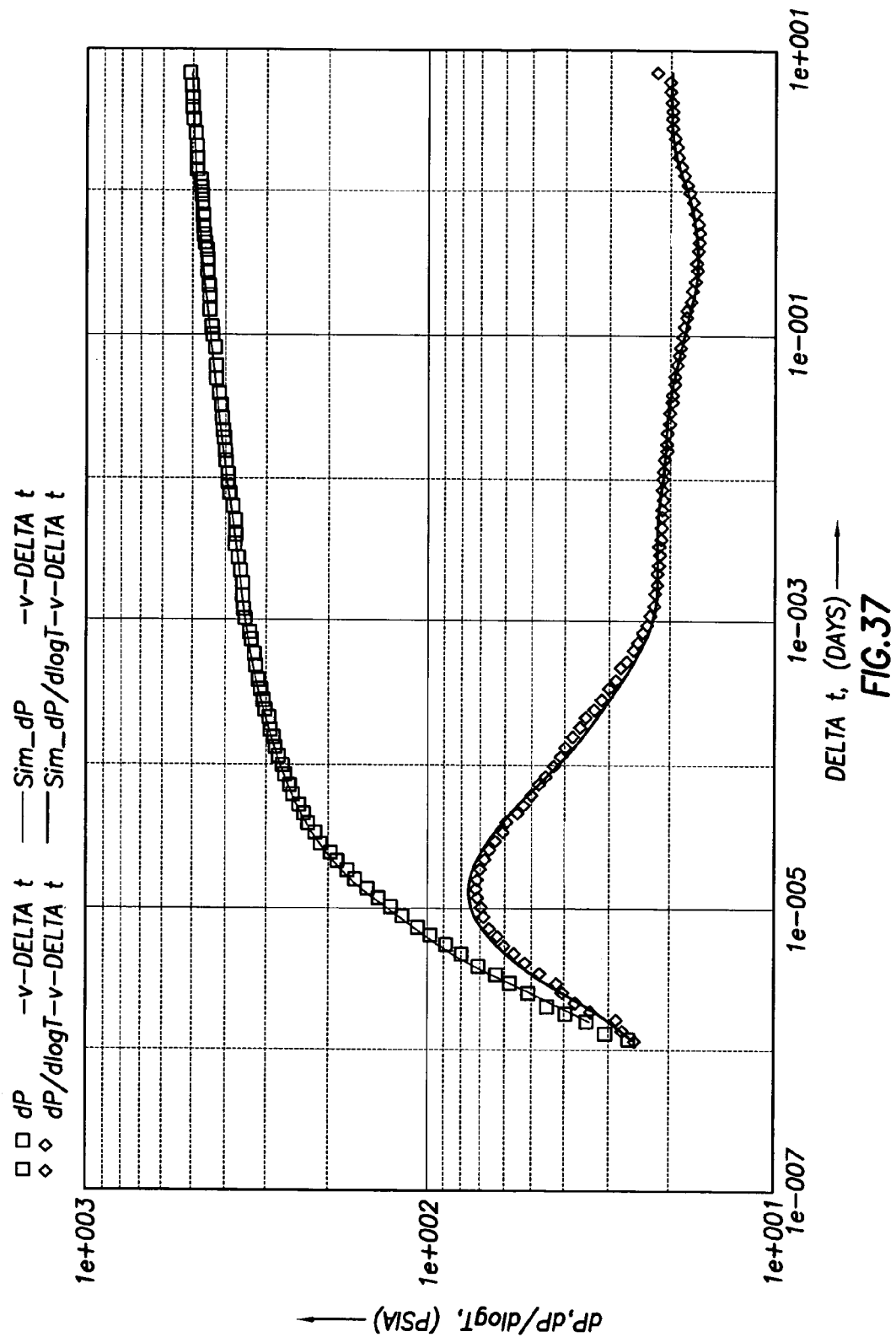
FIG. 37 illustrates a Log-log plot of extended well test; Discrete points are from analytical model; Continuous lines are from numerical model.
Figure 38:
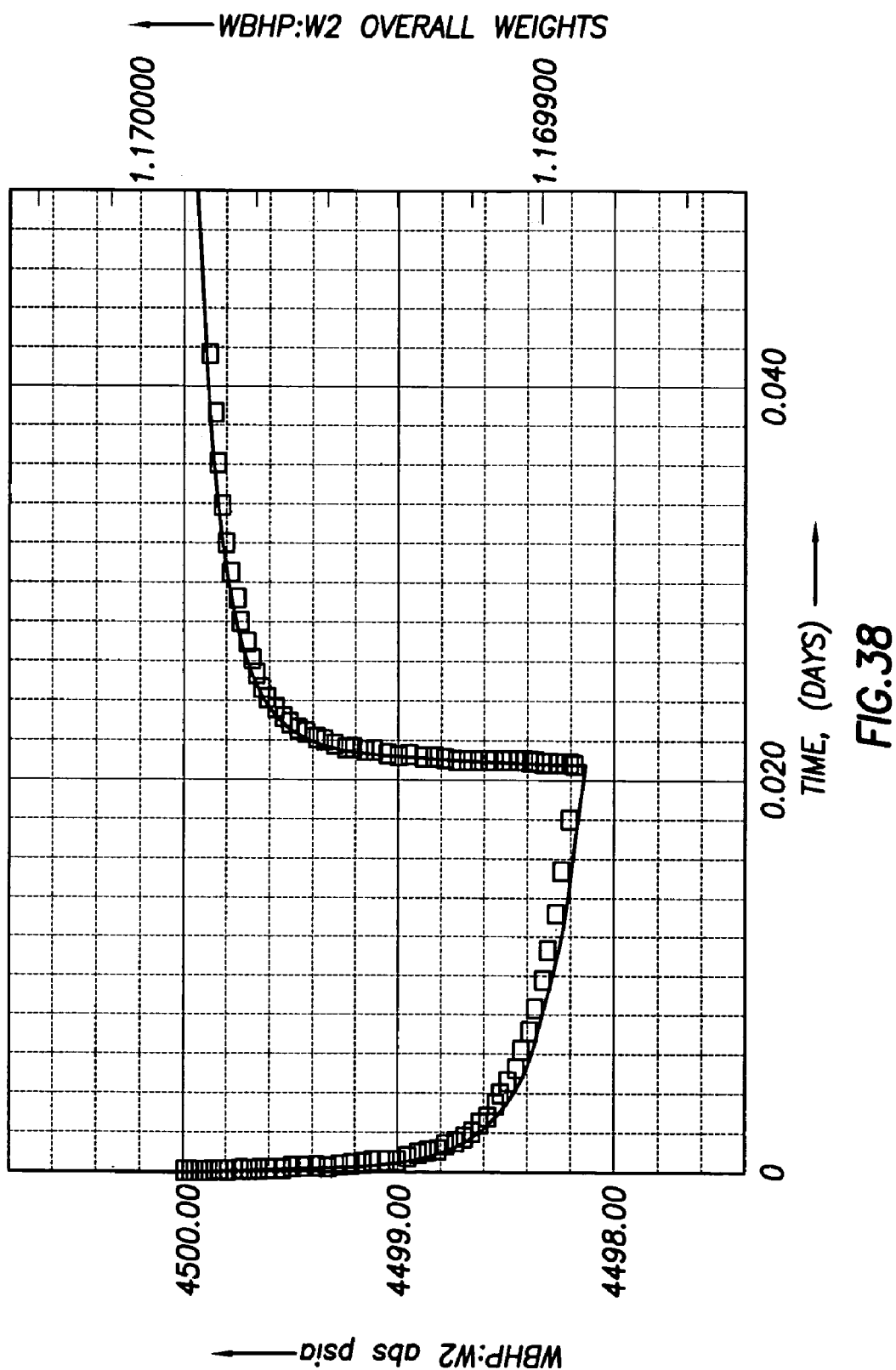
FIG. 38 illustrates a Pressure response at the observation probe, IPTT test 1; Discrete points are from analytical model; Continuous lines are from numerical model.

The first step was to verify the grid and numerical scheme. The test data generated analytically were then simulated using the same reservoir properties. FIGS. 35 to 38 show the pressure behavior of both the analytical and numerical models. The numerical model had 2750 grid blocks. Run time for this model, given the small time steps to model pressure transients was 1.5 minutes. Models with finer grids were tried to study the possible grid effects. In those cases, run times increased to 3 to 4 minutes without discernable benefits. Log-log plots for packer and probe for both MDT tests are presented in FIGS. 35 and 36. Some divergence is expected in the early time for the probe, due to the very small pressure differences, approaching gauge resolution. It is possible to fine tune, but not completely remove this divergence. FIG. 37 gives the log-log plot for the well test build-up. The pressure plots were also good; the probe pressure agreement for the first MDT test is illustrated in FIG. 38.

Figure 39:
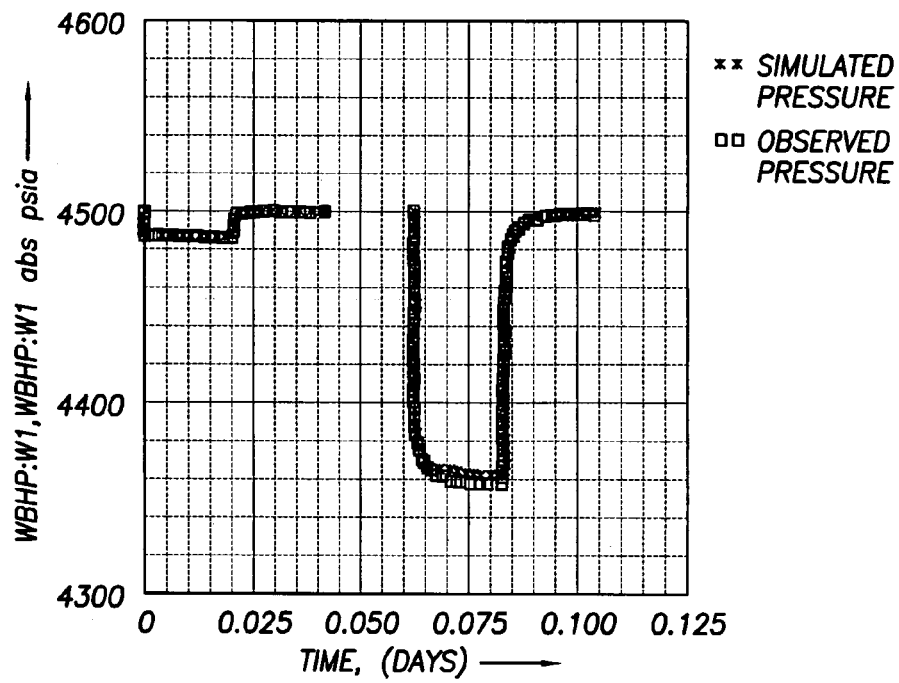
FIG. 39 illustrates a Pressure match at the packer for the two MDT-IPTT tests analyzed simultaneously.
Figure 40:
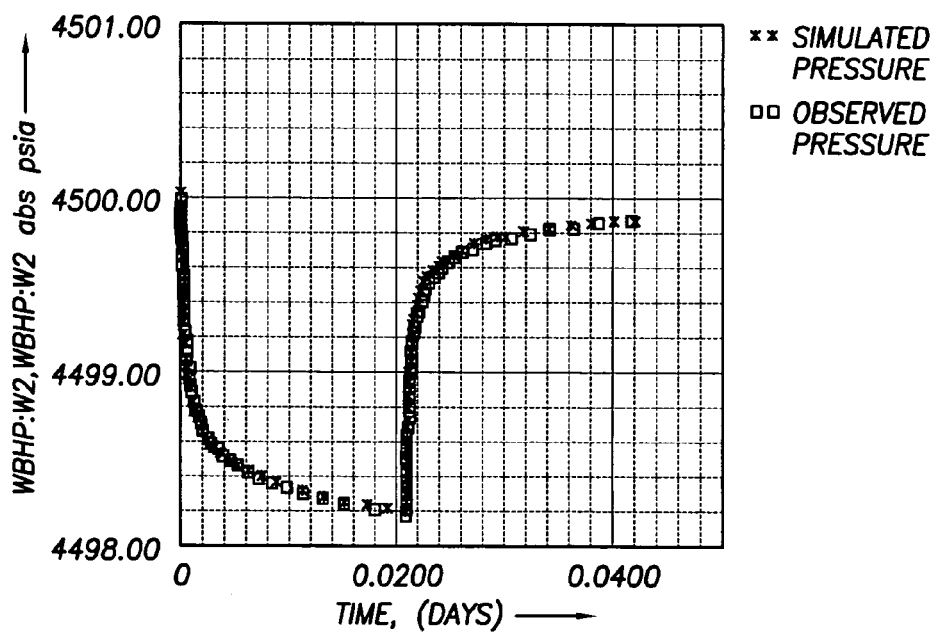
FIG. 40 illustrates a Pressure match at the probe for IPTT test 1; the two MDT-IPTT tests were analyzed simultaneously.
Figure 41:
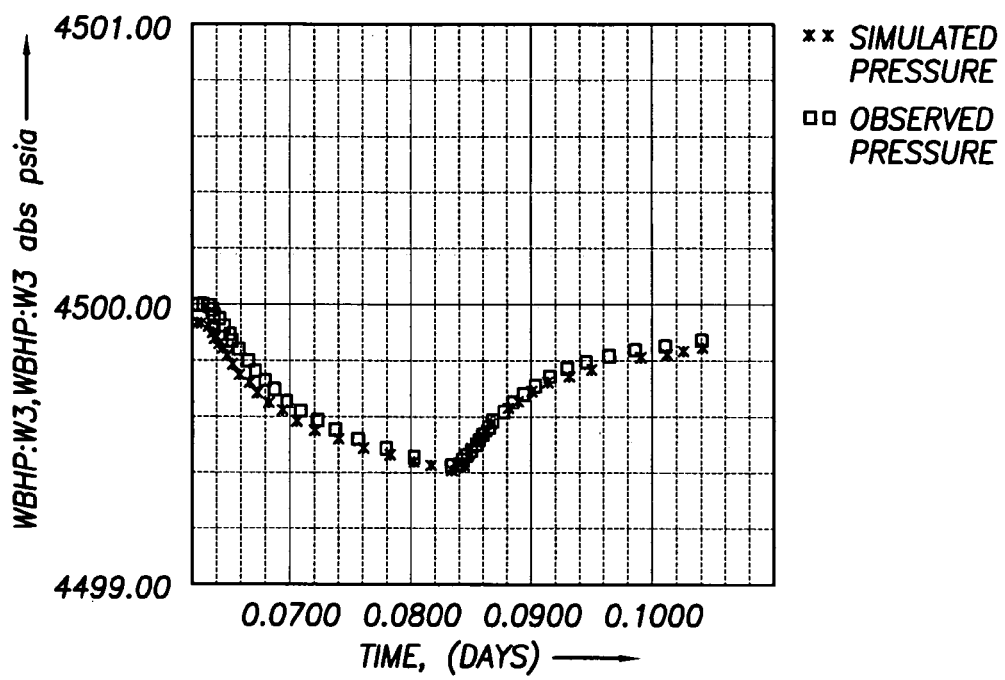
FIG. 41 illustrates a Pressure match at the probe for IPTT test 2; the two MDT-IPTT tests were analyzed.

Following grid verification, the reservoir properties were perturbed, treating the perturbed values as "best estimates" from data input/conditioning section of the workflow. Here, we match the pressure behavior for two IPTT's simultaneously, treating the analytical model results as "observed" behavior. During this exercise, the aim is to come as close as possible to the real reservoir properties shown in Table-1 of FIG. 25, starting with the perturbed values. All properties were perturbed simultaneously, which is a particularly difficult case. We acknowledge that initial values for the parameters have some influence on the convergence of the results and local minima may exist. Table-3 of FIG. 27 shows the initial, perturbed and final values of the parameters used during the optimization, which was achieved using only four iterations. Theses parameters were the horizontal and vertical permeabilities for all layers. FIG. 39 shows the pressure match at the dual packer from both MDT IPTT's using the final parameters obtained from the non-linear optimization. FIGS. 40 and 41 show the pressure match at the observation probes. The figures and the results in Table 3 of FIG. 27 show that it is possible to come very close the true parameters when both IPTT's analyzed simultaneously. Note that during this synthetic exercise, flow rate errors are not present. To achieve a better match at the probes, the weights for observation probes were five times higher than that of the packer. As noted in previous studies, we also observed the need to follow a WLS (weighted least squares) approach to compensate for the bias in the magnitude of the measured response at the packer and probes. Note that knowing the weights a-priori may be difficult, thus a different minimization approach might be pursued for the analysis.

Figure 42:
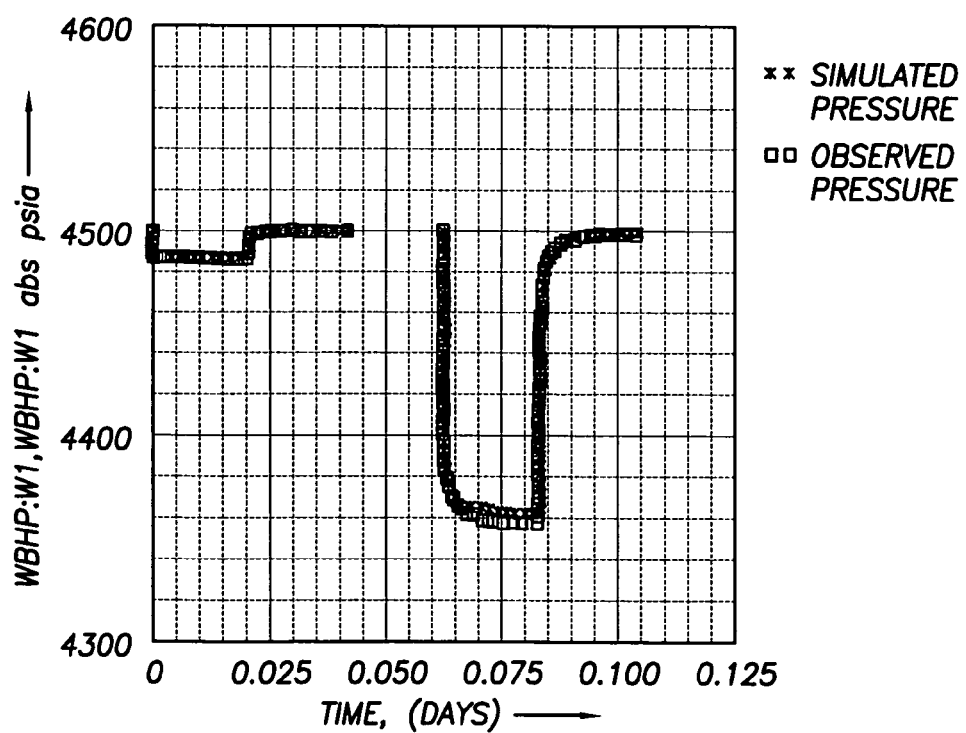
FIG. 42 illustrates a Pressure match at the packer for the tow IPTT tests without considering probe or extended well test data.
Figure 43:
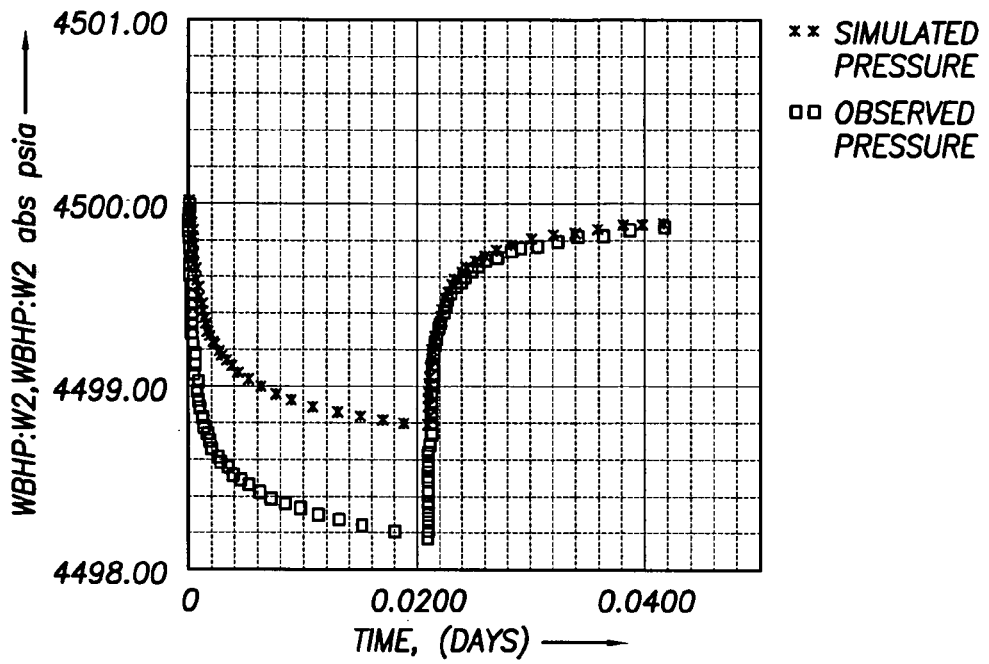
FIG. 43 illustrates a Pressure match at the probe for IPTT test 1, only pressures at the packer were considered during the analysis.
Figure 44:
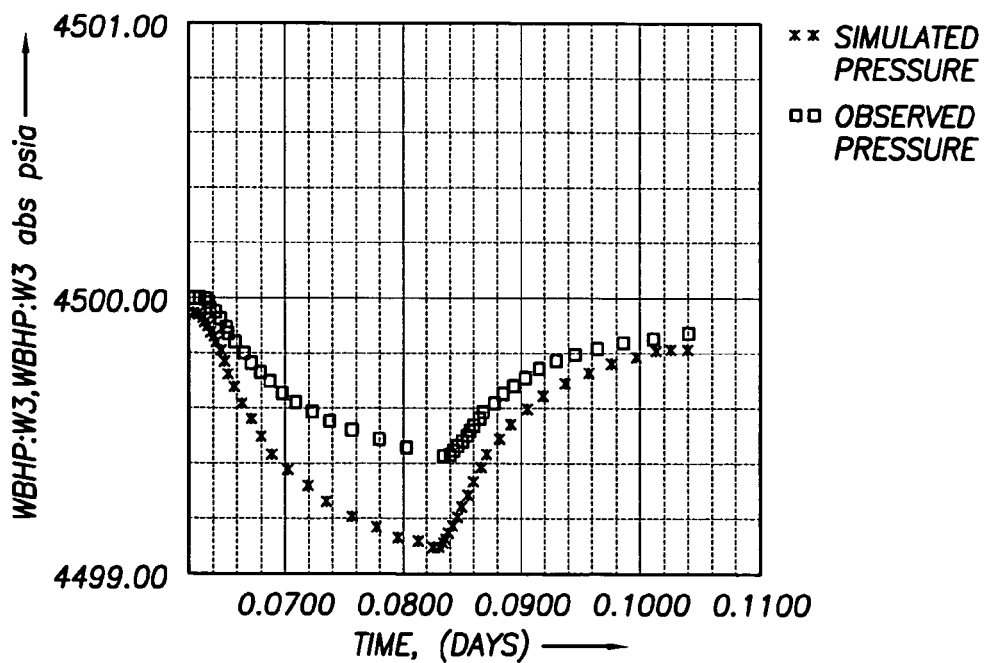
FIG. 44 illustrates a Pressure match at the probe for IPTT test 2, only pressures at the packer were considered during the analysis.
Figure 45:
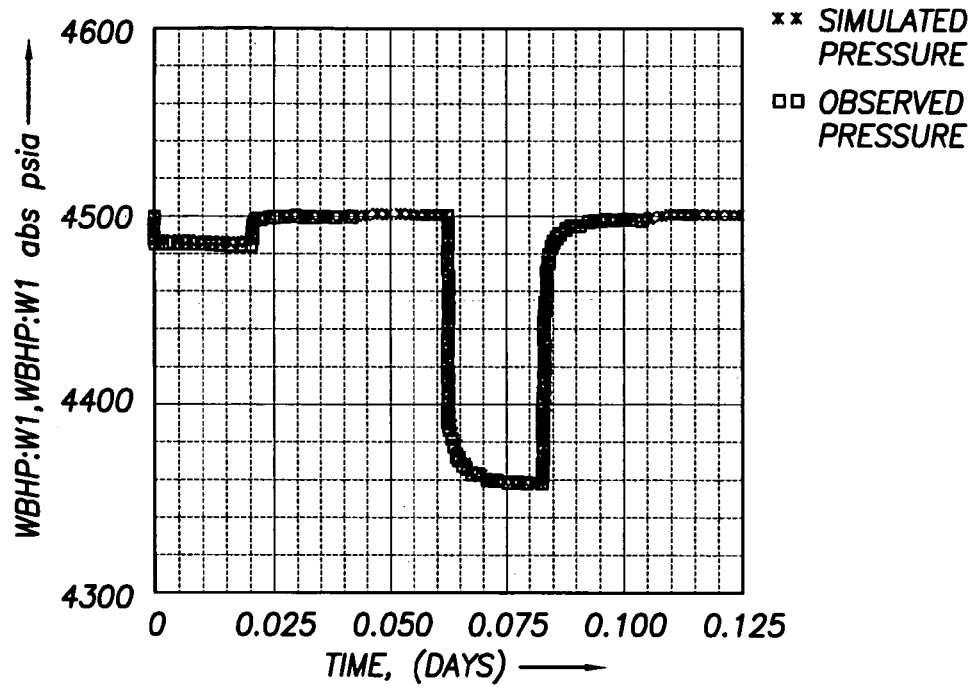
FIG. 45 illustrates a Pressure match at the packer for two MDT IPTT's using properties obtained from optimization; Optimization was performed using pressures at the packer and probes from both IPTT's and on the pressures from the extended well test.
Figure 46:
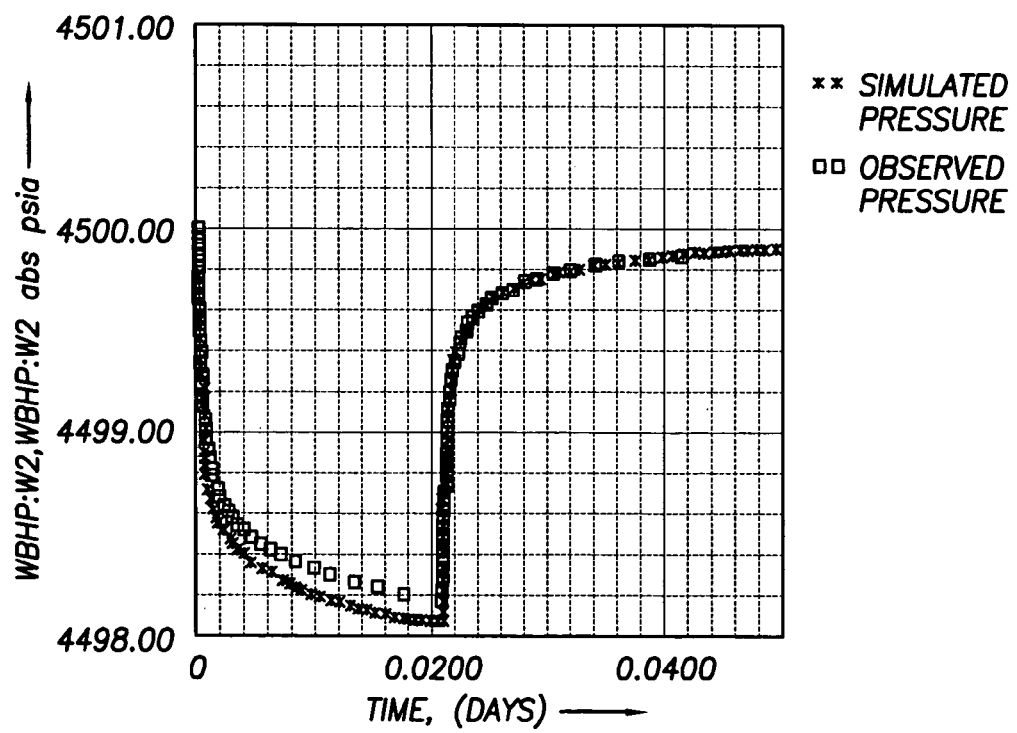
FIG. 46 illustrates a Pressure match at the probe for IPTT-1, using properties obtained from optimization; Optimization was performed using pressures at the packer and probes from both IPTT's and on the pressures from the extended well test.
Figure 47:
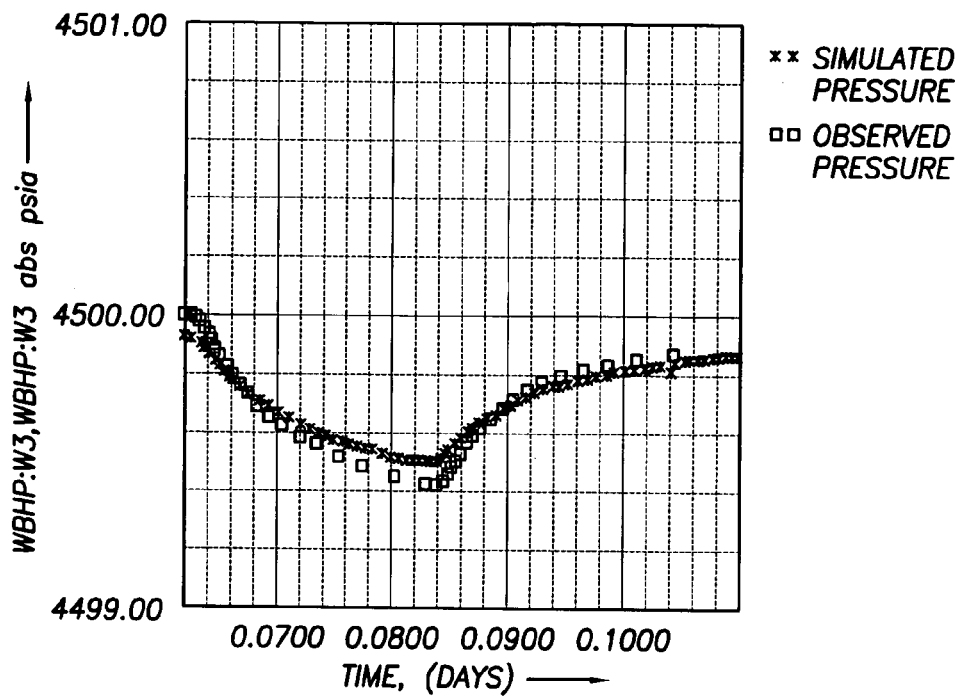
FIG. 47 illustrates a Pressure match at the probe for IPTT-2, using properties obtained from optimization; Optimization was performed using pressures at the packer and probes from both IPTT's and on the pressures from the extended well test.
Figure 48:
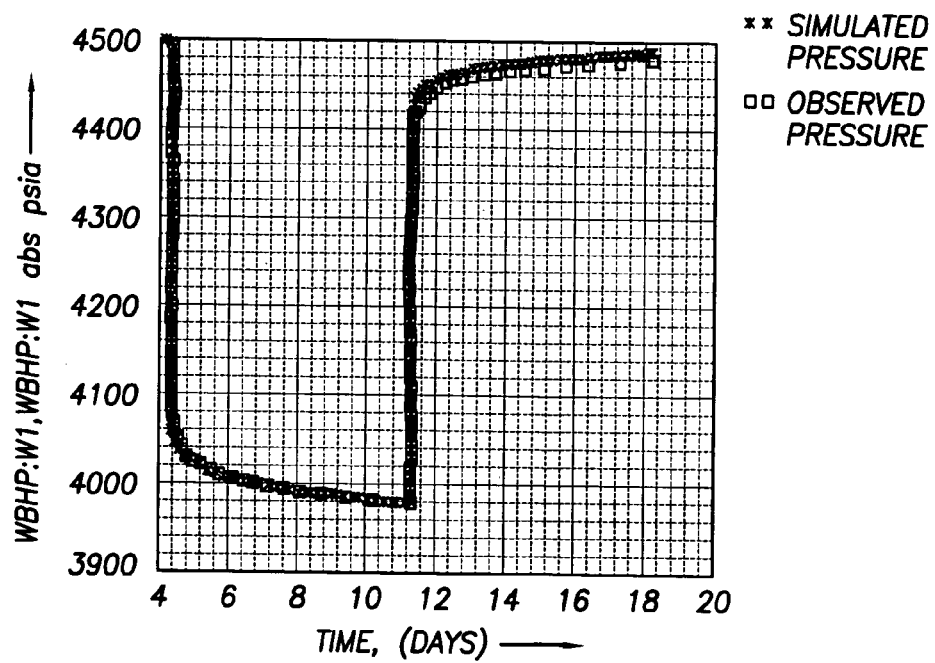
FIG. 48 illustrates a Pressure match for the extended well test using properties obtained from optimization; Optimization was performed using pressures at the packer and probes from both IPTT's and on the pressures from the extended well test.
Figure 49:
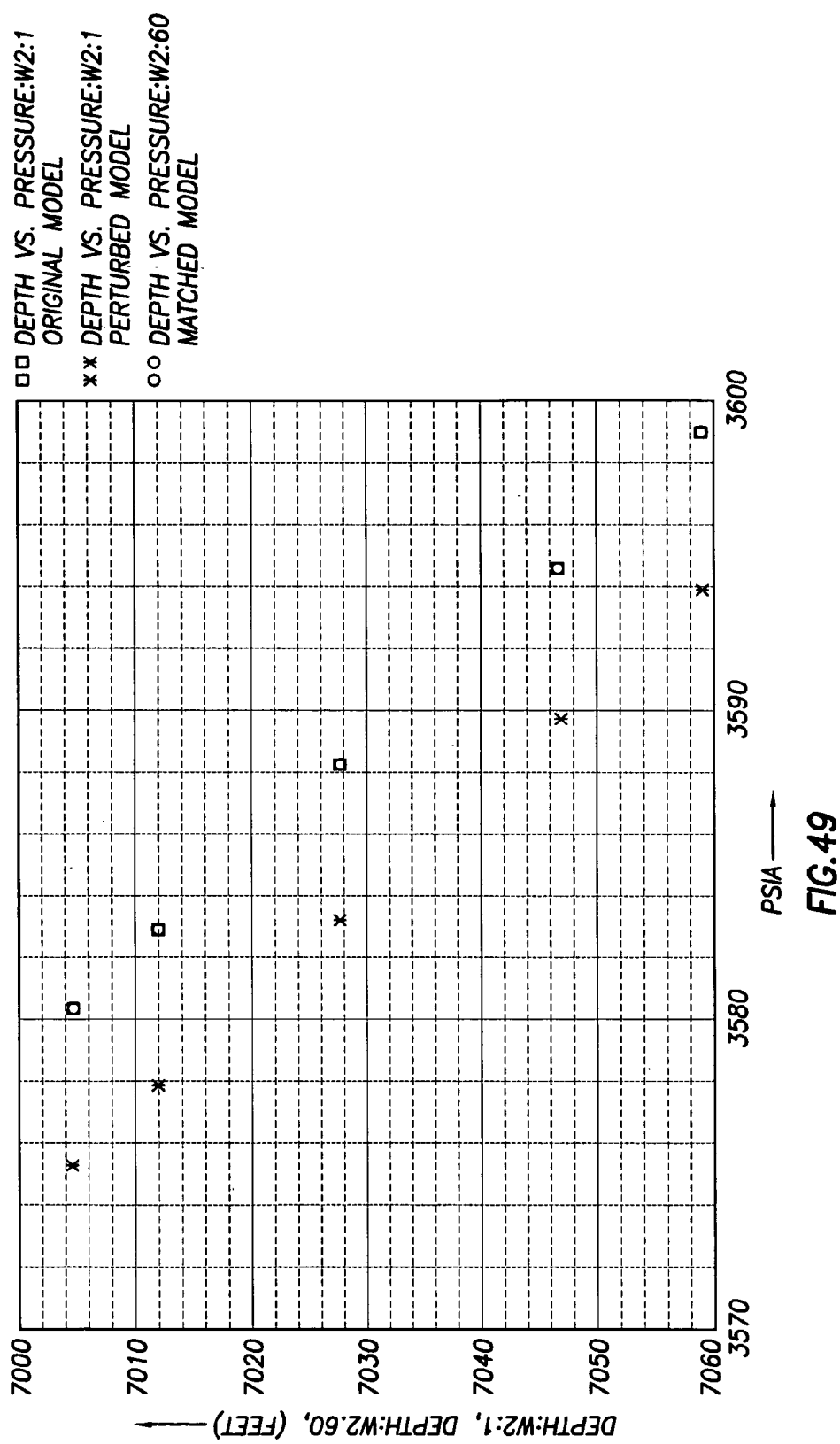
FIG. 49 illustrates a Pressure vs depth match using original, perturbed and regressed model properties.

Optimization was then performed considering other scenarios. During the second scenario, only packer data from the MDT tests were considered, ignoring probes and the extended well test. The results of the match are given in Table-4 of FIG. 28, which are quite different from the input values. FIG. 42 shows the match at the packer interval. The match looks acceptable if one considers only the packer pressures. Though not considered during the optimization, probe responses were also generated with the final model and given in FIGS. 43 and 44. As expected, the model fails to follow the pressure disturbance caused by the packer at the location of the observation probes.

In the third scenario, both MDT test data as well as the extended well test data was used during the optimization. Table-5 of FIG. 29 shows the final results. FIGS. 45 to 48 show the pressure match obtained using the final model. The pressure match at the dual packer and extended well test data is quite satisfactory. The match the probes are fair, which can further be improved by fine tuning and constraining some parameters as opposed to optimizing on all unknowns. A better match is obtained particularly for the first layer where the DST was conducted. Even though the probes have a higher weight, the DST is of a much longer duration and thus has an effect over greater time and distance. Note that since a layer-cake model was considered, the addition of extended well test does not affect the results significantly. In a heterogeneous reservoir, the extended test information will be quite valuable. In such cases, fine-tuning of the regression results can also be achieved by dividing the reservoir into property regions.

Incorporation of Pressure Versus Depth Information

In addition to transient test data, the approach can also incorporate pressure vs depth plots during the analysis. A 10000 ft×10000 ft reservoir model with five 5 layers were considered. The top of the first layer is at 7000 ft. The layer characteristics are given in Table-6 of FIG. 30. A well at the centre of the reservoir was produced at 200 STB/day from the high permeability layers. The initial pressure distribution at this well was known. After 1800 days, another well was drilled 1000 ft away. MDT pressure vs depth profile for this new well was obtained at the centre of each layer. The model was then perturbed changing the horizontal permeability. Optimization on horizontal permeabilities was performed using the perturbed properties as initial guess. A match on horizontal permeability was obtained after six iterations. A comparison of the probe pressure vs depth profile of the original model and the perturbed and regressed model is given in FIG. 49. Even though the probe pressures show a constant gradient, in certain situations this may not be the case. Note that in this example, a single production well was used to model reservoir depletion. Since depletion is of importance, in case of multiple producers/injectors, total production/injection from all the wells can be allocated to a dummy well(s) or imposed at the outer boundaries to reproduce the same effect.

In this specification, a Workflow 80 which uses a Single Well Predictive Model or SWPM (heretofore known as the SWPM-MDT Workflow 80) will:

(1) allow easy execution of data preparation and model property population steps, increasing overall efficiency; the workflow involves automation in several steps, including numerical model gridding and optimization, making it easier for the user with limited simulation expertise;

(2) enable simultaneous analysis of multiple and overlapping Modular Dynamic Tester (MDT) Interval Pressure Transient Tests (IPTT), Extended Well Tests, and pressure vs depth information; this translates to significant efficiency in interpretation effort since current techniques require each test to be analyzed separately then combined as a consistent whole iteratively; and (3) match results from IPTT'S, well tests, and historical production performance when the model is constructed using dynamic data; it can also be used to study alternative completion and productions scenarios.

The above referenced embodiments being thus described, it will be obvious that the same may be varied in many ways. Such variations are not to be regarded as a departure from the spirit and scope of such embodiments, and all such modifications as would be obvious to one skilled in the art are intended to be included within the scope of the following claims.

We claim:

1. A method for performing an oil field operation on a reservoir, comprising: obtaining a first user objective identifying the oilfield operation; obtaining a first set of input data for performing the oilfield operation; selecting a first workflow for performing the oilfield operation based on the first user objective, wherein the first workflow is configured to build at least a 3D model of the reservoir for the first user objective and comprises a build model module and a tune model module; generating, using a processor of a computer system, a 1D petrophysical model of the reservoir by executing the build model module, wherein the 1D petrophysical model comprises a plurality of per unit of depth properties of the reservoir including porosity, rock type, saturation, lithology, and layering; generating, using the processor, the 3D model of the reservoir using the build model module to distribute the plurality of per unit of depth properties of the 1D petrophysical model in a 3D space defined by a first radius of investigation, the first radius of investigation defining the size of the 3D model; calibrating, using the processor, the 3D model using the tune model module, a plurality of modular dynamic tester (MDT) transient test data, and a historical response of the reservoir associated with the plurality of MDT transient test data by iteratively solving for a new value of horizontal permeability and a new value of vertical permeability, wherein iteratively solving for the new value of horizontal permeability and the new value of vertical permeability comprises: determining a plurality of residuals using the following equation:

$$r_i = w_d w_i \frac{(o_i - c_i)}{\sigma_d},$$

wherein d is a set of observed data of a given type, i is a data point of the set of observed data, $o_i$ is an observed value of the data point, ci is a simulated value, $\sigma_d$ is a measurement standard deviation for the set of observed data, wd is an overall weighting for the set of observed data, and wi is a weighting factor for the data point; and optimizing an objective function including the plurality of residuals for observed pressure data;

iteratively adjusting a horizontal permeability parameter and a vertical permeability parameter in the 3D model using the new value of horizontal permeability and the new value of vertical permeability;

iteratively determining a new reservoir model response by applying the plurality of MDT transient test data to the 3D model; and comparing the new reservoir model response to the historical response, wherein a difference between the new reservoir model response and the historical response is within a predetermined tolerance;

storing the adjusted 3D model of the reservoir, wherein the adjusted 3D model reconciles differences in a plurality of different scales each corresponding to one of the plurality of MDT transient test data;

forecasting a response of the reservoir to the first set of input data by applying the first set of input data to the 3D model of the reservoir;

and using the response to perform the oilfield operation.

2. The method of claim 1, wherein the oilfield operation comprises at least one selected from a group consisting of completion optimization, stimulation optimization, well reserve estimation, and well recovery estimation.

3. The method of claim 1, further comprising:
obtaining a second user objective;
obtaining a second set of input data;
selecting a second workflow in response to the second user objective;
selecting an additional module in response to said second workflow; and
executing said additional module in response to said second set of input data.

4. The method of claim 1, wherein the new reservoir model response is further determined by applying production pressure test data and pressure gradient data to said 3D model.

5. A computer readable medium storing instructions for performing an oilfield operation on a reservoir, the instructions comprising functionality to:
obtain a first user objective identifying the oilfield operation;
obtain a first set of input data for performing the oilfield operation;
select a first workflow comprising a build model module and a tune model module based on the first user objective and for performing the oilfield operation, wherein the first workflow is configured to build at least a 3D model of the reservoir for the first user objective;
generate a 1D petrophysical model of the reservoir by executing the build model module, wherein the 1D petrophysical model comprises a plurality of per unit of depth properties of the reservoir including porosity, rock type, saturation, lithology, and layering;
generate the 3D model of the reservoir using the build model module to distribute the plurality of per unit of depth properties of the 1D petrophysical model in a 3D space defined by a first radius of investigation, the first radius of investigation defining the size of the 3D model;
calibrate the 3D model using the tune model module, a plurality of modular dynamic tester (MDT) transient test data, and a historical response of the reservoir associated with the plurality of MDT transient test data by:
iteratively solving for a new value of horizontal permeability and a new value of vertical permeability, wherein iteratively solving for the new value of horizontal permeability and the new value of vertical permeability comprises:
determining a plurality of residuals using the following equation:

$$r_i = w_d w_i \frac{(o_i - c_i)}{\sigma_d},$$

wherein d is a set of observed data of a given type, i is a data point of the set of observed data, $o_i$ is an observed value of the data point, $c_i$ is a simulated value, $\sigma_d$ is a measurement standard deviation for the set of observed data, $w_d$ is an overall weighting for the set of observed data, and $w_i$ is a weighting factor for the data point; and
optimizing an objective function including the plurality of residuals for observed pressure data;
iteratively adjusting a horizontal permeability parameter and a vertical permeability parameter in the 3D model using the new value of horizontal permeability and the new value of vertical permeability;
iteratively determining a new reservoir model response by applying the plurality of MDT transient test data to the 3D model; and
comparing the new reservoir model response to the historical response, wherein a difference between the new reservoir model response and the historical response is within a predetermined tolerance;

store the 3D model of the reservoir;
forecast a response of the reservoir to the first set of input data by applying the first set of input data to the 3D model of the reservoir; and
perform the oilfield operation using the response.

6. The computer readable medium of claim 5, wherein the oilfield operation comprises at least one selected from a group consisting of completion optimization, stimulation optimization, well reserve estimation, and well recovery estimation.

7. The computer readable medium of claim 5, the instructions further comprising functionality to:
obtain a second user objective;
obtain a second set of input data;
select a second workflow in response to the second user objective;
select an additional module in response to said second workflow; and
execute said additional module in response to said second set of input data.

8. The computer readable medium of claim 5, wherein the new reservoir model response is further determined by applying production pressure test data and pressure gradient data to said 3D model.

9. A computer system for performing an oilfield operation on a reservoir, comprising:
a processor configured to execute:
a data entry module for execution by the processor and configured to:
receive a first user objective identifying the oilfield operation and a first set of input data for performing the oilfield operation, and
receive a selection of a first workflow comprising a plurality of modules based on the first user objective, wherein the first workflow is configured to build at least a 3D model of the reservoir for the first user objective;
a build module for execution by the processor and configured to:
generate a 1D petrophysical model of the reservoir comprising a plurality of per unit of depth properties, wherein the plurality of per unit of depth properties includes porosity, rock type, saturation, lithology, and layering, and
generate the 3D model of the reservoir by distributing the plurality of per unit of depth properties of the 1D petrophysical model in a 3D space define by a first radius of investigation, the first radius of investigation defining the size of the 3D model,
wherein the plurality of modules includes the build model module;
a tune model module for execution by the processor and configured to:
calibrate the 3D model of using a plurality of modular dynamic tester (MDT) transient test data, and a historical response of the reservoir associated with the plurality of MDT transient test data,
wherein the plurality of modules includes the tune model module;
a history matching module operatively connected to the tune model module and configured to:
iteratively solve for a new value of horizontal permeability and a new value of vertical permeability, wherein iteratively solving for the new value of horizontal permeability and the new value of vertical permeability comprises: determining a plurality of residuals using the following equation:

$$r_i = w_d w_i \frac{(o_i - c_i)}{\sigma_d},$$

wherein d is a set of observed data of a given type, i is a data point of the set of observed data, $o_i$ is an observed value of the data point, ci is a simulated value, $\sigma_d$ is a measurement standard deviation for the set of observed data, wd is an overall weighting for the set of observed data, and wi is a weighting factor for the data point; and
optimizing an objective function including the plurality of residuals for observed pressure data;
iteratively adjust a horizontal permeability parameter and a vertical permeability parameter in the 3D model using the new value of horizontal permeability and the new value of vertical permeability;
iteratively determine a new reservoir model response by applying the plurality of MDT transient test data to the 3D model, and compare the new reservoir model response to the historical response, wherein a difference between the new reservoir model response and the historical response is within a predetermined tolerance, wherein the plurality of modules includes the history matching module; and
a predict reservoir response module operatively connected to the tune model module and configured to:
forecast a response of the reservoir to the first set of input data by applying the first set of input data to the 3D model of the reservoir,
wherein the plurality of modules includes the predict reservoir response module;
a storage device configured to store the 3D model of the reservoir; and
an apparatus operatively connected to the predict reservoir response module and configured to perform the oilfield operation using the response.

10. The computer system of claim 9, wherein the oilfield operation comprises at least one selected from a group consisting of completion optimization, stimulation optimization, well reserve estimation, and well recovery estimation.

11. The computer system of claim 9, wherein:
said data entry module receives a second user objective and a second set of input data causing generation of a second workflow comprising an additional module in response to the second user objective.

12. The computer system of claim 9, wherein the new reservoir model response is further determined by applying production pressure test data and pressure gradient data to said 3D model.

13. A method of generating a 3D model of a reservoir, comprising:
obtaining a user objective and input data, wherein the user objective includes generating the 3D model;
selecting a workflow comprising a build model and a tune model based on said user objective;
generating, using a processor of a computer system, a 1D petrophysical model of the reservoir by executing the build module, wherein the 1D petrophysical model comprises a plurality of per unit of depth properties of the reservoir including at least porosity, rock types, saturation, lithology, and layering;
generating, using the processor, the 3D model of the reservoir using the build model module to distribute the plurality of per unit depth properties of the 1D petrophysical model in a 3D space defined by a first radius of investigation, the first radius of investigation defining the size of the 3D model;

calibrating, using the processor, the 3D model using the tune model module, a plurality of modular dynamic tester (MDT) transient test data, and a historical response of the reservoir associated with the plurality of MDT transient test data by:

iteratively solving for a new value of horizontal permeability and a new value of vertical permeability, wherein iteratively solving for the new value of horizontal permeability and the new value of vertical permeability comprises:

determining a plurality of residuals using the following equation:

$$r_i = w_d w_i \frac{(o_i - c_i)}{\sigma_d},$$

wherein d is a set of observed data of a given type, i is a data point of the set of observed data, $o_i$ is an observed value of the data point, $c_i$ is a simulated value, $\sigma_d$ is a measurement standard deviation for the set of observed data, $w_d$ is an overall weighting for the set of observed data, and $w_i$ is a weighting factor for the data point; and optimizing an objective function including the plurality of residuals for observed pressure data;

iteratively adjusting a horizontal permeability parameter and a vertical permeability parameter in the 3D model using the new value of horizontal permeability and the new value of vertical permeability;

iteratively determining a new reservoir model response by applying the plurality of MDT transient test data to the 3D model; and comparing the new reservoir model response to the historical response, wherein a difference between the new reservoir model response and the historical response is within a predetermined tolerance; and storing the 3D model after calibrating the 3D model.

14. The method of claim 13, wherein the new reservoir model response is further determined by applying production pressure test data and pressure gradient data to said 3D model.

15. A method of predicting a response from a hydrocarbon reservoir to a plurality of data items, comprising:

generating a 1D petrophysical model of the hydrocarbon reservoir, wherein the 1D petrophysical model comprises a plurality of per unit of depth properties of the hydrocarbon reservoir including at least porosity, rock types, saturation, lithology, and layering;

building a simulator model of the hydrocarbon reservoir by distributing the plurality of per unit depth properties of the 1D petrophysical model in a 3D space define by a first radius of investigation, the first radius of investigation defining the size of the 3D model;

calibrating the simulator model using a plurality of modular dynamic tester (MDT) transient test data and a historical response of the reservoir associated with the plurality of MDT transient test data, the calibrating step including:

iteratively solving for a new value of horizontal permeability and a new value of vertical permeability, wherein iteratively solving for the new value of horizontal permeability and the new value of vertical permeability comprises:

determining a plurality of residuals using the following equation:

$$r_i = w_d w_i \frac{(o_i - c_i)}{\sigma_d},$$

wherein d is a set of observed data of a given type, i is a data point of the set of observed data, $o_i$ is an observed value of the data point, $c_i$ is a simulated value, $\sigma_d$ is a measurement standard deviation for the set of observed data, $w_d$ is an overall weighting for the set of observed data, and $w_i$ is a weighting factor for the data point; and optimizing an objective function including the plurality of residuals for observed pressure data;

iteratively adjusting a horizontal permeability parameter and a vertical permeability parameter in the simulator model using the new value of horizontal permeability and the new value of vertical permeability;

iteratively determining a new reservoir model response by applying the plurality of MDT transient test data to the simulator model; and comparing the new reservoir model response to the historical response, wherein a difference between the new reservoir model response and the historical response is within a predetermined tolerance;

storing the simulator model of the reservoir; and predicting the response from the hydrocarbon reservoir by applying the plurality of data items to the simulator model after calibrating the simulator model, wherein the plurality of data items comprises transient test data, well test data, and pressure gradient data.

16. The method of claim 15, wherein the calibrating step further includes:

changing a parameter of said simulator model, re-applying said plurality of MDT transient test data to the simulator model thereby generating a second test response from the simulator model for each of said plurality of MDT transient test data, and re-comparing the second test response from the simulator model with said historical response.

17. The method of claim 15, wherein the calibrating step further includes:

applying production pressure test data and pressure gradient data to said simulation model, wherein the first test response is based on said production pressure test data and said pressure gradient data.

18. A computer readable medium storing instructions to predict a response from a hydrocarbon reservoir to a plurality of data items, the instructions comprising functionality to:

generate a 1D petrophysical model of the hydrocarbon reservoir, wherein the 1D petrophysical model comprises a plurality of per unit of depth properties of the hydrocarbon reservoir including at least porosity, rock types, saturation, lithology, and layering;

build a simulator model of the hydrocarbon reservoir by distributing the plurality of per unit depth properties of the 1D petrophysical model in a 3D space define by a first radius of investigation, the first radius of investigation defining the size of the 3D model;

calibrate the simulator model using a plurality of modular dynamic tester (MDT) transient test data and a historical response of the reservoir associated with the plurality of MDT transient test data by:

iteratively solving for a new value of horizontal permeability and a new value of vertical permeability, wherein iteratively solving for the new value of horizontal permeability and the new value of vertical permeability comprises:
determining a plurality of residuals using the following equation:

$$r_i = w_d w_i \frac{(o_i - c_i)}{\sigma_d},$$

wherein d is a set of observed data of a given type, i is a data point of the set of observed data, $o_i$ is an observed value of the data point, $c_i$ is a simulated value, $\sigma_d$ is a measurement standard deviation for the set of observed data, $w_d$ is an overall weighting for the set of observed data, and $w_i$, is a weighting factor for the data point; and
optimizing an objective function including the plurality of residuals for observed pressure data;
iteratively adjusting a horizontal permeability parameter and a vertical permeability parameter in the simulator model using the new value of horizontal permeability and the new value of vertical permeability;
iteratively determining a new reservoir model response by applying the plurality of MDT transient test data to the simulator model; and
comparing the new reservoir model response to the historical response, wherein a difference between the new reservoir model response and the historical response is within a predetermined tolerance;
store the simulator model of the reservoir; and
predict the response by applying the plurality of data items to the simulator model after calibrating the simulator model, wherein the plurality of data items comprises transient test data, well test data, and pressure gradient data,
wherein the first radius of investigation comprises the second radius of investigation.

19. The computer readable medium of claim 18, where the instructions to calibrate the simulator model comprise functionality to:
change a parameter of said simulator model,
re-apply said plurality of MDT transient test data to the simulator model after changing the parameter thereby generating a second test response from the simulator model, and
re-comparing the second test response from the simulator model with said historical response.

20. The computer readable medium of claim 18, wherein the instructions to calibrate the simulator model comprise functionality to:
apply production pressure test data and pressure gradient data to said simulation model, wherein the first particular response is based on said production pressure test data and said pressure gradient data.

* * * * *